(12) United States Patent
Nagao

(10) Patent No.: US 6,466,229 B1
(45) Date of Patent: Oct. 15, 2002

(54) GRAPHICS PROCESSING APPARATUS AND GRAPHICS PROCESSING METHOD

(75) Inventor: Takashi Nagao, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/454,861

(22) Filed: Dec. 7, 1999

(30) Foreign Application Priority Data

Jan. 26, 1999 (JP) .......................................... 11-016844

(51) Int. Cl.$^7$ ................................................. G09G 5/00
(52) U.S. Cl. ..................................................... 345/621
(58) Field of Search ................................. 345/620, 624, 345/621

(56) References Cited

U.S. PATENT DOCUMENTS

| | | | | |
|---|---|---|---|---|
| 4,885,703 A | * | 12/1989 | Deering | 345/419 |
| 5,388,166 A | * | 2/1995 | Onozawa | 345/17 |
| 5,396,585 A | * | 3/1995 | Fujii et al. | 345/621 |
| 5,606,651 A | * | 2/1997 | Brown et al. | 345/621 |
| 5,748,202 A | * | 5/1998 | Nakatsuka et al. | 345/441 |
| 5,877,773 A | * | 3/1999 | Rossin et al. | 345/621 |
| 6,005,574 A | * | 12/1999 | Herrod | 345/620 |
| 6,005,586 A | * | 12/1999 | Morita et al. | 345/624 |
| 6,219,149 B1 | * | 4/2001 | Kawata et al. | 358/1.11 |
| 6,229,545 B1 | * | 5/2001 | Satoh | 345/419 |
| 6,246,415 B1 | * | 6/2001 | Grossman et al. | 345/421 |
| 6,288,724 B1 | * | 9/2001 | Kumar et al. | 345/621 |

FOREIGN PATENT DOCUMENTS

| | | |
|---|---|---|
| JP | 60-74086 | 4/1985 |
| JP | 61-248176 | 11/1986 |
| JP | 62-271186 | 11/1987 |
| JP | 8-279050 | 10/1996 |
| JP | 9-62851 | 3/1997 |
| JP | 9-171563 | 6/1997 |
| JP | 9-281953 | 10/1997 |
| JP | 11-144066 | 5/1999 |

* cited by examiner

Primary Examiner—Michael Razavi
Assistant Examiner—Ryan Yang
(74) Attorney, Agent, or Firm—Oliff & Berridge, PLC

(57) ABSTRACT

Disclosed is a graphics processing apparatus capable of drawing graphics at high speed with a small memory capacity even in the case of drawing graphics in which a drawing element and a clip element exist mixedly or which has many overlaps. A drawing command is interpreted by a command interpretation unit and data is converted to linear vectors by a vector data generation unit. A display list generation unit generates a display list. With respect to graphics in which a clip element and a drawing element exist mixedly, display lists of both elements are merged and a clipping process is performed at the level of the display lists while executing predetermined determination. In the case of graphics having many overlaps, the overlaps are similarly removed at the level of the display lists. A display list drawing unit has a processing unit of 2N and performs drawing while executing a DDA operation in parallel. When the number of straight lines exceeds 2N, the process is divided so that the number is equal to or smaller than 2N.

20 Claims, 43 Drawing Sheets

- ● CONTROL POINTS OF ORIGINAL BEZIER CURVE
- ■ CONTROL POINTS OF TWO DIVIDED BEZIER CURVES
- ‖ DIVISION BY MIDDLE POINTS

GRAPHICS PROCESSING APPARATUS AND GRAPHICS PROCESSING METHOD

BACKGROUND OF THE INVENTION

1. Field of the Invention

The present invention relates to a graphics processing apparatus for drawing graphics, text expressed in outline data, or the like in order to output the data to a printer, a display apparatus, or the like.

2. Description of the Related Art

In an editor, a CAD/CAM system, or the like which uses graphics or text expressed by outline data, in order to output the graphics or text to a printer or a display apparatus, a process of drawing the graphics is executed. The drawing process is performed by using, for example, blocks as shown in FIG. 2.

In FIG. 2, when a command of drawing the graphics or text is inputted by the-user or from the outside, the command is interpreted by a command interpretation unit 1 and is supplied to a vector data generation unit 2. In the case of the text, the vector data generation unit 2 sends a request to a font management unit 3 and acquires vector data expressing the outline of the text. A stroke (line) figure is converted to vector data, for example, as shown in FIG. 3 on the basis of the thickness and the shape of a connecting part. The text, stroke figure, or filled (painted) graphics converted as mentioned above is inputted to a display list generation unit 4.

The display list generation unit 4 first approximates a curved part expressed by a Bezier curve, spline, or the like to short straight lines and converts it into vector data of a polygon as shown in FIG. 4. Then, the display list generation unit 4 converts the vector data into an expression in a display list form as shown in FIG. 7. As an example of data regarding the vectors constructing a polygon, the display list has four pieces of element data of Dir: a direction flag (+1 in the case of upward orientation and −1 in the case of downward) Xs: X coordinate of the vector start point, Ye: Y coordinate of the vector end point, and Dx: a change amount (gradient) of X with respect to increase of +1 in the Y coordinate. The conversion from the polygon to the display list will be further described in detail hereinafter.

The display list data generated as described above is supplied to a display list drawing unit 13. The display list drawing unit 13 calculates the coordinates of an intersecting point of each of the sides in the inputted display list and each scan line of an output device by a method of a DDA (Digital Differential Analyzer) or the like, sorts the data on the basis of the X coordinate values every scan line, obtains the correspondence between the start point and end point of a fill part, and draws a line segment parallel to the scan line corresponding to the interval on a memory unit 14. The memory data drawn as mentioned above is transferred to an output device 15 such as a printer or display apparatus, thereby performing printing or display.

In such a graphics drawing process, the operation of the display list drawing unit 13 is "heavy" since DDA, sorting, drawing on the memory, and the like of each side are included. Especially, in the case of drawing complicated graphics including overlaps such as gradation, overwriting occurs many times in the same memory area and it is a main factor of deterioration in processing speed as a whole. Further, like a printer of recent years, in the case of reducing a page memory by accumulating a drawing command at the level of a polygon, a display list, an edge list, or the like and outputting the data while forming an image in a real time manner in accordance with the printing speed of the printer, there is a problem (hereinbelow, also called a first problem) such that an image formation is not performed in time in a complicated part where there are many overlaps and a picture dropout may occur.

Since the operation of the display list drawing unit 13 is heavy, a high-speed process is intended by dedicated hardware. Although the process is relatively simple in the case of a polygon having projected parts as shown in FIG. 5A, in the case where recessed parts are included as shown in FIG. 5B or in the case where the intersections of sides as illustrated in FIG. 5C are included, plural pairs of the start and end points exist in each scan line. Consequently, a process of sorting the intersections obtained as mentioned above and finding the correspondence is necessary. In the case where there is no restriction in the complication of the graphics inputted, however, the number of intersections is not limited, so that a problem (hereinbelow, also called a second problem) such that it is very difficult to construct a sorting circuit by hardware arises.

As an attempt of solving the first problem, a method of increasing the speed of the process and performing a realtime drawing by eliminating overlapped parts from the drawing elements has been conventionally proposed. Japanese Published Unexamined Patent Application Nos. Hei 8-279050, Hei 9-62851, Hei 9-171563, Hei 9-281953, and the like are conventional arts based on the idea.

As an attempt of solving the second problem, there is a method of dividing a polygon into figures such as trapezoids (including square and triangle) each having the bottom side parallel to the X axis in which no sorting occurs and processing each of the figures. Japanese Published Unexamined Patent Application Nos. Sho 60-74086, Sho 61-248176, Sho 62-271186, and the like are conventional arts based on the idea.

According to the methods of the Japanese Published Unexamined Patent Application Nos. Hei 8-279050 and Hei 9-62851, the drawing element is stored in the form of the edge list, and when the edge information of drawing for the same scan line is compared with each other and there is an overlap, the overlap is removed. The data amount of the drawing elements to be stored in the edge list is enormous when the resolution is high as in the printer of recent years, so that there is a drawback such that the cost of the memory increases.

According to the methods of Japanese Published Unexamined Patent Application Nos. Hei 9-171563 and Hei 9-281953, the drawing element is stored in the form of polygon data and an overlap of two polygons is checked. When there is an overlap, it is removed. In order to remove the overlap at the polygon level, however, the polygon has to have simple projected parts. For a polygon including a recessed part and an intersection of sides, a preliminary process of dividing the polygon into figures having projections is necessary. Although the object is narrowed down by the overlap determination, overlay graph, or the like, since a method of basically removing an overlap of two polygons is used, processes of N! (factorial of N) times are necessary to completely remove the overlaps of N process targets.

SUMMARY OF THE INVENTION

The present invention has been achieved in consideration of the problems of the conventional arts as mentioned above. The present invention provides a high speed graphics processing apparatus having an overlap removal part for removing an overlap of drawing elements expressed in a display list format, capable of storing data in a small memory amount even when the resolution is higher as compared with an edge list and removing an overlap by a small amount of process without performing a special preliminarily process.

In the Japanese Published Unexamined Patent Application Nos. Sho 60-74086 and Sho 61-248176, a polygon is divided into trapezoids (including square and triangle) each having the bottom side parallel to the X axis and the trapezoids are sequentially processed, thereby making a sorting circuit at the time of a filling process unnecessary. According to the method, however, since a number of trapezoids are generated when a complicated polygon is divided, it is difficult to control or temporarily store the trapezoids and there is also a problem that the processing speed is low since the process is performed every trapezoid.

In the Japanese Published Unexamined Patent Application No. Sho 62-271186, an inputted figure including a curve is divided into partial figures so as to have one drawing line segment at each scan line, the partial figures are inputted to plural DDA circuits and line segment drawing circuits, and processes are performed in parallel. According to the method, however, the number of divided figures changes according to the complexity of the inputted figure, so that the necessary number of DDA circuits/line segment drawing circuits cannot be regulated. Since the partial figures are drawn on different scan lines, it can be presumed that competition occurs at the time of writing data into a memory and the processing speed is not raised.

In order to solve such problems, the inventors of the present invention have proposed in Japanese Patent Published Unexamined Patent Application No. Hei 11-144066a graphics processing apparatus having 2N (N is 1 or larger) DDA parts, a sorting part capable sorting 2N inputs, and a division part for dividing an inputted arbitrary display list into plural display lists so that the number of drawing line segments in each scan line becomes N or smaller, which can execute a process at high speed and can control and store divided graphics in an area as small as possible by dividing a display list expressing a polygon inputted into partial polygons which can be subjected to the DDA and sorting.

In the method proposed in Japanese Published Unexamined Patent Application No. Hei 11-144066, the part corresponding to the display list drawing unit can draw only the drawing element. In a drawing command, however, a clip element for regulating the area in which the drawing element is drawn on a memory is also included. In this case, the drawing element has to be clipped by the clip element until it is inputted to the display list drawing unit, so that there is a case that the speed is decreased.

As a countermeasure against the problem, it can be considered that the construction of the display list drawing unit is changed so that the display list information in which the drawing element and the clip element mixedly exist can be inputted and the drawing operation can be performed while clipping the drawing element. The method of dividing the display list has been proposed in Japanese Published Unexamined Patent Application No. Hei 11-144066, however, cannot deal with mixed elements. When a scan line on which the number of sides is larger than 2N exists, a complicated process of once separating the clip element and the drawing element from each other, performing the dividing process described in Japanese Published Unexamined Patent Application No. Hei 11-144066separately to the clip element and the drawing element, and allowing the clip and drawing elements to exist mixedly is necessary. There is consequently a drawback such that the whole performance deteriorates.

The present invention has been achieved in consideration of the above points. The present invention also provides a graphics processing apparatus which can control and store a divided figure in an area as small as possible even when a clip element and a drawing element mixedly exist and can execute a process at high speed.

According to the present invention, the graphics processing apparatus for drawing graphics has a display list generation part that converts vector information (for example, which designates the shape and a drawing color of the drawing element and the clip element and the type of the figure such as a stroke figure or fill figure and expresses attributes such as the line width and the kind of the line when the figure is the stroke figure) describing a drawing element or a clip element of graphics into straight line vector information obtained by approximating a polygon to a shape of vectors constructing the drawing element or clip element, sorts the straight line vectors included in the straight line vector information on the basis of vector start scan line coordinate values, and generates a display list constructed of information including the direction and gradient of each of the straight line vectors and the number of scan lines crossed or data equivalent to those information, a merge process part which merges a display list indicative of the drawing element with a display list indicative of the clip element for restricting a drawing area of the drawing element which are generated by the display list generation part, thereby generating a display list in which the drawing element and the clip element mixedly exist, a display list storage part for storing the display list, a determination part for checking to see whether or not the number of straight line vectors which cross a scan line is equal to or smaller than 2N (N is an integer of 1 or larger) in all of scan lines on the basis of the display list, a clip process part for clipping the drawing element by the clip element with respect to the display list in which the clip element and the drawing element mixedly exist, thereby converting the display list to a display list having only drawing elements, a division process part for dividing the display list having only the drawing elements converted by the clip process part so that the number of straight line vectors which cross all of the scan lines becomes equal to or smaller than 2N, thereby generating plural display lists, an overlap removal part for generating a new display list obtained by removing an overlap of drawing areas from plural display lists having the overlap in the drawing areas, a display list drawing part having 2N DDA parts each for calculating the coordinate value of an intersection between each scan line and the straight line vector on the basis of the display list, a sorting part for sorting output values from the DDA parts, and a memory drawing part that obtains position information of a start point and an end point of a drawing line segment from the data sorted by the sorting part and fills a memory area between the start and end points, and an overlap removal determination part for estimating processing time of drawing the display list by the display list drawing part and determines an effect of executing the overlap removing process by the overlap removal part on the basis of the estimated drawing processing time.

According to the construction, the high-speed graphics processing apparatus having the overlap removal part of removing an overlap of drawing elements expressed in the display list format, which can store data in a small memory amount even when the resolution is higher as compared with an edge list and can remove an overlap by a small amount of process without performing a special preliminary process can be realized. Further, the high-speed graphics processing apparatus in which the overlap removing process is minimized by containing the determination part for determining whether the overlap removing process is necessary or not and the clip process part for clipping the display list in which the clip element and the drawing element mixedly exist and converting the display list into a display list having only drawing elements, and which can deal with the case where the clip element and the drawing mixedly exist can be realized. Further, the high-speed graphics processing apparatus can be realized which can divide the display list when the number of drawing elements to be drawn finally exceeds 2N (N is a positive integer), control and store drawing data in a small area, and control and store divided figures in an area as small as possible even when the clip element and the drawing element mixedly exists.

Further, according to the present invention, there is also provided a graphics processing apparatus for drawing graphics having a display list generation part that converts vector information describing a drawing element or a clip element of graphics into straight line vector information obtained by approximating a polygon to a shape of vectors constructing the drawing element or clip element, sorts straight line vectors included in the straight line vector information on the basis of vector start scan line coordinate values, and generates a display list constructed of information including the direction and gradient of each of the straight line vectors and the number of scan lines which are crossed or data equivalent to those information, a merge process part which merges a display list indicative of the drawing element with a display list indicative of the clip element for restricting a drawing area of the drawing element which are generated by the display list generation part, thereby generating a display list in which the drawing element and the clip element mixedly exist, a determination part for checking to see whether or not the number of straight line vectors which cross a scan line is equal to or smaller than 2N (N is an integer of 1 or larger) in all of scan lines on the basis of the display list, a clip process part for clipping the drawing element by the clip element with respect to the display list in which the clip element and the drawing element mixedly exist, thereby converting the display list to a display list having only drawing elements, a division process part for dividing the display list having only the drawing elements converted by the clip process part so that the number of straight line vectors which cross all of the scan lines becomes equal to or smaller than 2N, thereby generating plural display lists, and a display list drawing part having 2N DDA parts each for calculating the coordinate value of an intersection between each scan line and the straight line vector on the basis of the display list, a sorting part for sorting output values from the DDA parts, and a memory drawing part that obtains position information of a start point and an end point of a drawing line segment from the data sorted by the sorting part and fills a memory area between the start and end points.

According to the construction as well, the high-speed graphics processing apparatus which can deal with the case where the clip element and the drawing mixedly exist by having the clip process part for clipping the display list in which the clip element and the drawing element mixedly exist, thereby converting the display list to a display list having only drawing elements can be realized. Further, the high-speed graphics processing apparatus can be realized which can divide the display list when the number of drawing elements to be drawn finally exceeds 2N (N is a positive integer), control and store drawing data in a small area, and control and store divided figures in an area as small as possible even when the clip element and the drawing element mixedly exists.

Further, according to the present invention, a graphics processing apparatus for drawing graphics has a display list generation part that converts vector information describing a drawing element or a clip element of graphics into straight line vector information obtained by approximating a polygon to a shape of vectors constructing the drawing element or clip element, sorts the straight line vectors included in the straight line vector information on the basis of vector start scan line coordinate values, and generates a display list constructed of information including the direction and gradient of each of the linear vectors and the number of scan lines crossed or data equivalent to those information, a merge process part which merges a display list indicative of the drawing element with a display list indicative of the clip element for restricting a drawing area of the drawing element which are generated by the display list generation part, thereby generating a display list in which the drawing element and the clip element mixedly exist, a display list storage part for storing the display list, a clip process part for clipping the drawing element by the clip element with respect to the display list in which the clip element and the drawing element mixedly exist, thereby converting the display list to a display list having only drawing elements, an overlap removal part for generating a new display list by removing an overlap of drawing areas from plural display lists having the overlap in the drawing areas, a display list drawing part for drawing graphics expressed by the display lists, and an overlap removal determination part for estimating processing time of drawing the display list by the display list drawing part and determining the execution effect of the overlap removing process by the overlap removal part on the basis of the estimated drawing processing time.

According to the construction, the high-speed graphics processing apparatus having the overlap removal part for removing an overlap in drawing elements expressed in the display list format, capable of storing data in a small memory amount even when the resolution is higher as compared with an edge list and removing an overlap with a small amount of process without performing a special preliminary process can be realized. Further, the high-speed graphics processing apparatus can be realized which minimizes the overlap removing process and can deal with the case where the clip element and the drawing element mixedly exist by having the determination part for determining whether the overlap removing process is necessary or not and the clip process part for clipping the display list in which the clip element and the drawing element mixedly exist to thereby convert the display list into a display list having only the drawing elements.

Further, according to the present invention, a graphics processing apparatus for drawing graphics has a display list generation part that converts vector information describing a drawing element or a clip element of graphics into straight line vector information obtained by approximating a polygon to a shape of vectors constructing the drawing element or clip element, sorts the straight line vectors included in the straight line vector information on the basis of vector start scan line coordinate values, and generates a display list constructed of information including the direction and gradient of each of the straight line vectors and the number of scan lines crossed or data equivalent to the above information, a display list storage part for storing the display list, a clip process part for clipping the drawing element by the clip element with respect to the display list which expresses the clip element and the drawing element, an overlap removal part that generates a new display list by removing an overlap of drawing areas from plural display lists having the overlap in the drawing areas, and a display list drawing part for drawing graphics expressed by the display lists.

According to the construction as well, the high-speed graphics processing apparatus having the overlap removal part for removing an overlap in drawing elements expressed in the display list format, capable of storing data in a small memory amount even when the resolution is higher as compared with an edge list and removing an overlap with a small amount of process without performing a special preliminary process can be realized. Further, the high-speed graphics processing apparatus can be realized which can deal with the case where the clip element and the drawing element mixedly exist by having the clip process part for clipping the display list in which the clip element and the drawing element mixedly exist to thereby convert the display list into a display list having only the drawing elements.

Further, according to the present invention, a graphics processing apparatus for drawing graphics has a display list generation part that converts vector information describing a drawing element of graphics into straight line vector information obtained by approximating a polygon to a shape of vectors constructing the drawing element, sorts the straight line vectors included in the straight line vector information on the basis of vector start scan line coordinate values, and generates a display list constructed of information including the direction and gradient of each straight line vector and the number of scan lines crossed or data equivalent to the above information, a display list storage part for storing the display list, an overlap removal part that generates a new display list by removing an overlap of drawing areas from plural display lists having the overlap in the drawing areas, and a display list drawing part for drawing graphics expressed by the display lists.

According to the construction, the high-speed graphics processing apparatus having the overlap removal part for removing an overlap in drawing elements expressed in the display list format, capable of storing data in a small memory amount even when the resolution is higher as compared with an edge list and removing an overlap with a small amount of process without performing a special preliminary process can be realized.

Further, the graphics processing apparatus of the present invention may have an overlap removal determination part which estimates processing time of a process of drawing the display list by the display list drawing part and determines an effect of executing the overlap removing process by the overlap removal part on the basis of the estimated drawing processing time.

The graphics processing apparatus of the present invention may have an area division process part for dividing an output area of the display list into partial areas and performs a process for every partial area.

In the graphics processing apparatus of the present invention, the merge process part may set a value indicative of a vector direction in a display list related to a straight line vector constructing the drawing element and a value indicative of a vector direction in a display list related to a straight line vector constructing the clip element so as to be different from each other in the mixed display list to be generated.

Further, in the graphics processing apparatus of the present invention, the merge process part can obtain at least one of or both of a common Y coordinate range and a common X coordinate range from circumscribed rectangles of the display list indicative of the drawing element and the display list indicative of the clip element and generate a mixed display list constructed by a straight line vector restricted within the common coordinate range.

According to the graphics processing apparatus of the present invention, the determination part reads the straight line vectors included in the display list in accordance with the order from the smaller start scan line coordinate value, holds an end scan line coordinate value of the straight line vector, discards the end scan line coordinate value held when the start scan line coordinate value of the read straight line vector is larger than the end scan line coordinate value which has already been held, outputs a determination result that the number of end scan line coordinate values is not equal to or smaller than 2N at the time point when the number of end scan line coordinate values held becomes larger than 2N and outputs a determination result that the number of end scan line coordinate values is equal to or smaller than 2N at the time point when the sum of the number of straight line vectors which are not yet read and the number of end scan line coordinate values held becomes equal to or smaller than 2N.

In the graphics processing apparatus of the present invention, a converting process into a display list having only the drawing elements by the clipping process by the clip process part may be executed to the mixed display list to be subjected to the overlap removing process when it is determined by the overlap removal determination part that the overlap removing process is necessary.

Further, in the graphics processing apparatus of the present invention, the converting process into a display list having only the drawing elements by the clipping process by the clip process part may be executed under the conditions that a) the display list is determined by the determination part that a scan line which is crossed by the straight line vectors larger than N2 exists and b) the display list is a display list in which the drawing element and the clip element mixedly exist.

Further, in the graphics processing apparatus of the present invention, a process of dividing a display list so that the number of straight line vectors which cross all of scan lines becomes equal to or smaller than 2N and thereby generating plural display lists in the division process part may be executed under the conditions that c) the display list is determined by the determination part that a scan line which is crossed by the straight line vectors larger than N2 exists and d) the display list has only drawing elements.

In the graphics processing apparatus of the present invention, the overlap removal part may sequentially take a display list corresponding to a drawing element in an upper layer to be displayed or printed on the most front face and then a display list corresponding to a drawing element in a lower layer from the display list storage part and perform the overlap removing process on the basis of the taken display lists corresponding to the plural drawing elements.

Further, in the graphics processing apparatus of the present invention, the overlap removal part may generate a merged area display list indicative of the whole drawing area of plural drawing elements to be subjected to the overlap removing process and perform a new overlap removing process on a display list newly taken from the display list storage part.

In the graphics processing apparatus of the present invention, the determination by the overlap removal process determination part may be performed for every partial area obtained by the dividing operation of the area division process part and whether the overlap removing process is performed or not may be changed for every partial area.

In the graphics processing apparatus of the present invention, the overlap removal determination part may obtain an estimated value of drawing time in the display list drawing part by using information of at least one of the drawing area of the display list, a circumscribed rectangle area, or the height.

Further, in the graphics processing apparatus of the present invention, an estimated value of drawing time in the display list drawing part obtained by the overlap removal determination part may be derived by a drawing process time estimation calculating method according to drawing element attributes including information indicating that the drawing element is text, graphics, or an image.

Further, in the graphics processing apparatus of the present invention, the overlap removal determination part obtains the estimated value of the drawing process time in the display list drawing part on the basis of the result of the process by the overlap removal part, when the estimated value of the drawing process time based on the obtained process result is equal to or smaller than a predetermined threshold value, a new overlap removing process by the overlap removal part may not be executed.

In the graphics processing apparatus of the present invention, the process by the overlap removal part may be executed for every divided group obtained by dividing the display list corresponding to plural drawing elements to be processed into plural groups.

In the graphics processing apparatus of the present invention, the process by the overlap removal part may be executed every partial area in plural partial areas obtained by dividing a drawing area to be processed.

In the graphics processing apparatus of the present invention, the memory drawing part may change a method of calculating position information of a start point and an end point of a line segment to be drawn from the sorted data on the basis of conditions that the display list to be processed is a display list having only drawing elements or a mixed display list in which the drawing element and the clip element mixedly exist and a fill rule of the drawing element and the clip element in the display list to be processed is an even-odd rule or non-zero winding number rule.

In the graphics processing apparatus of the present invention, the 2N DDA parts have a construction such that processes can be performed in parallel and a process of calculating the coordinate value of the intersection between each scan line and a straight line vector may be executed by a parallel process.

In the graphics processing apparatus, the process by the overlap removal part can be performed in such a manner that plural drawing elements to be processed are actually drawn in accordance with the order from the lower layer so as to be converted to image drawing elements, the processing time of drawing the image drawing elements and the remaining drawing elements by the display list drawing part is estimated by the overlap removal determination part, and the conversion to the image drawing element can be performed until it is determined that the overlap removing process is unnecessary.

Further, in the graphics processing apparatus of the present invention, the process by the overlap removal part can be performed in such a manner that a drawing area to be processed is divided into plural partial areas, some partial areas divided are actually drawn so as to be converted to image drawing elements, the processing time of drawing the image drawing elements and the drawing elements included in the remaining partial areas by the display list drawing part is estimated by the overlap removal determination part, and the sequential conversion from the plural partial areas to the image drawing elements can be performed until it is determined that the overlap removing process is unnecessary.

Further, in the graphics processing apparatus of the present invention, the estimated value of drawing processing time by the display list drawing part obtained by the overlap removal determination part can also be derived by using area approximation value information obtained by performing a process corresponding to a display list drawing process at resolution lower than required resolution.

In the graphics processing apparatus of the present invention, when a figure is a stroke figure, the display list generation part obtains an approximation value of the drawing area on the basis of information such as the stroke length, line width, and kind of line of each vector and may add the approximation value information of the drawing area to the display list generated from the stroke figure.

In the graphics processing apparatus of the present invention, when a figure is a fill figure, the display list generation part at least determines whether the fill figure has a self intersection or not and whether the fill figure is constructed of plural separated graphics elements. When the fill figure does not have a self intersection and is constructed of single graphics elements, an approximation value of the drawing area is obtained on the basis of straight line vectors constructing the figure and approximation value information of the drawing area may be added to the display list generated from the fill figure.

In the graphics processing apparatus of the present invention, the clip process part has a part for determining at least whether the shape of a graphics element is a rectangle or not, and may change the clipping method on the basis of the result of the determination by the determination part.

BRIEF DESCRIPTION OF THE DRAWINGS

A preferred embodiment of a graphics processing apparatus according to the present invention will be described in detail based on the drawings.

DETAILED DESCRIPTION OF PREFERRED EMBODIMENT

An embodiment of a graphics processing apparatus according to the present invention will be described hereinbelow with reference to the drawings.

Figure 1:
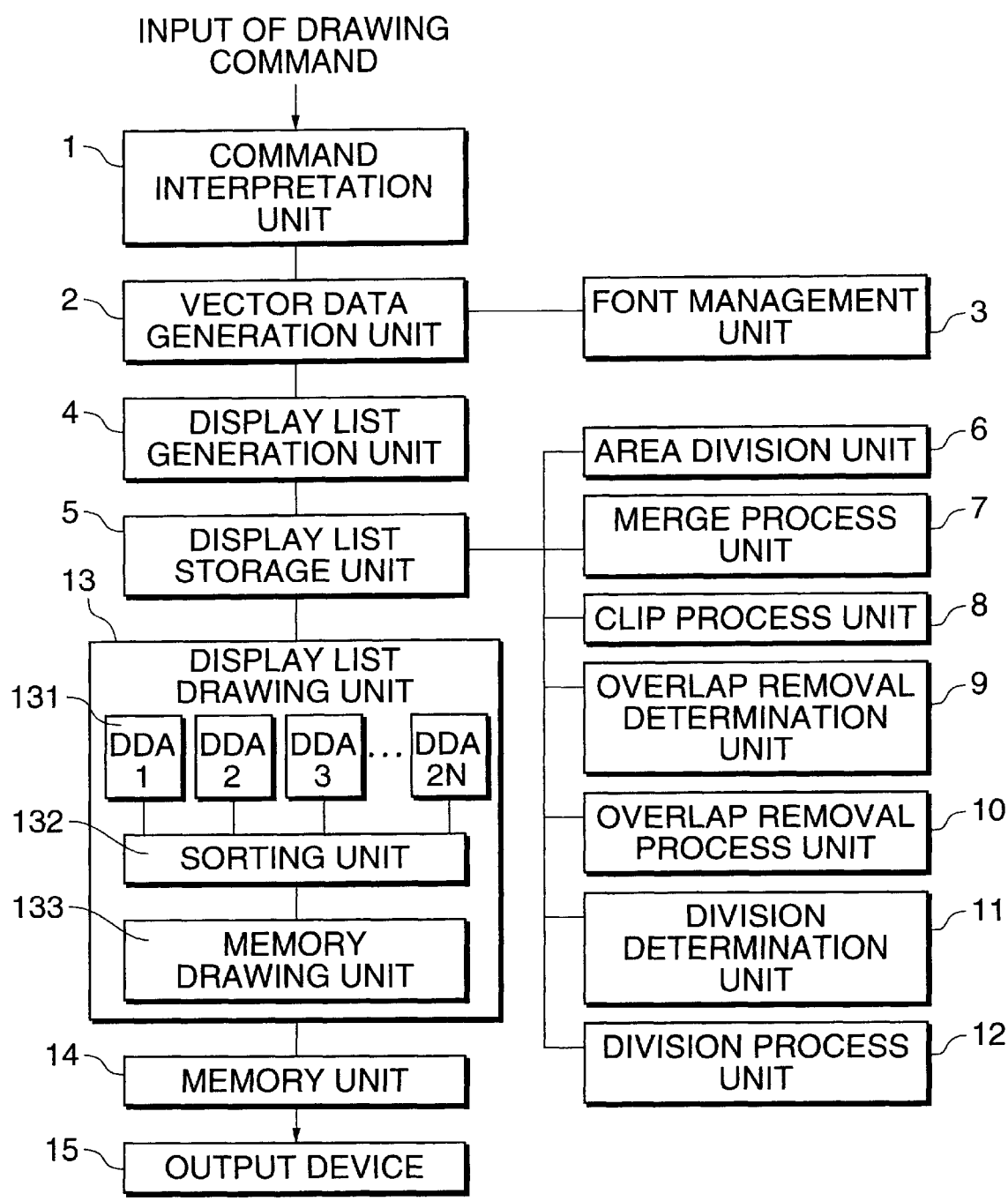
FIG. 1 is a block diagram showing an embodiment of a graphics processing apparatus of the present invention.
Figure 2:
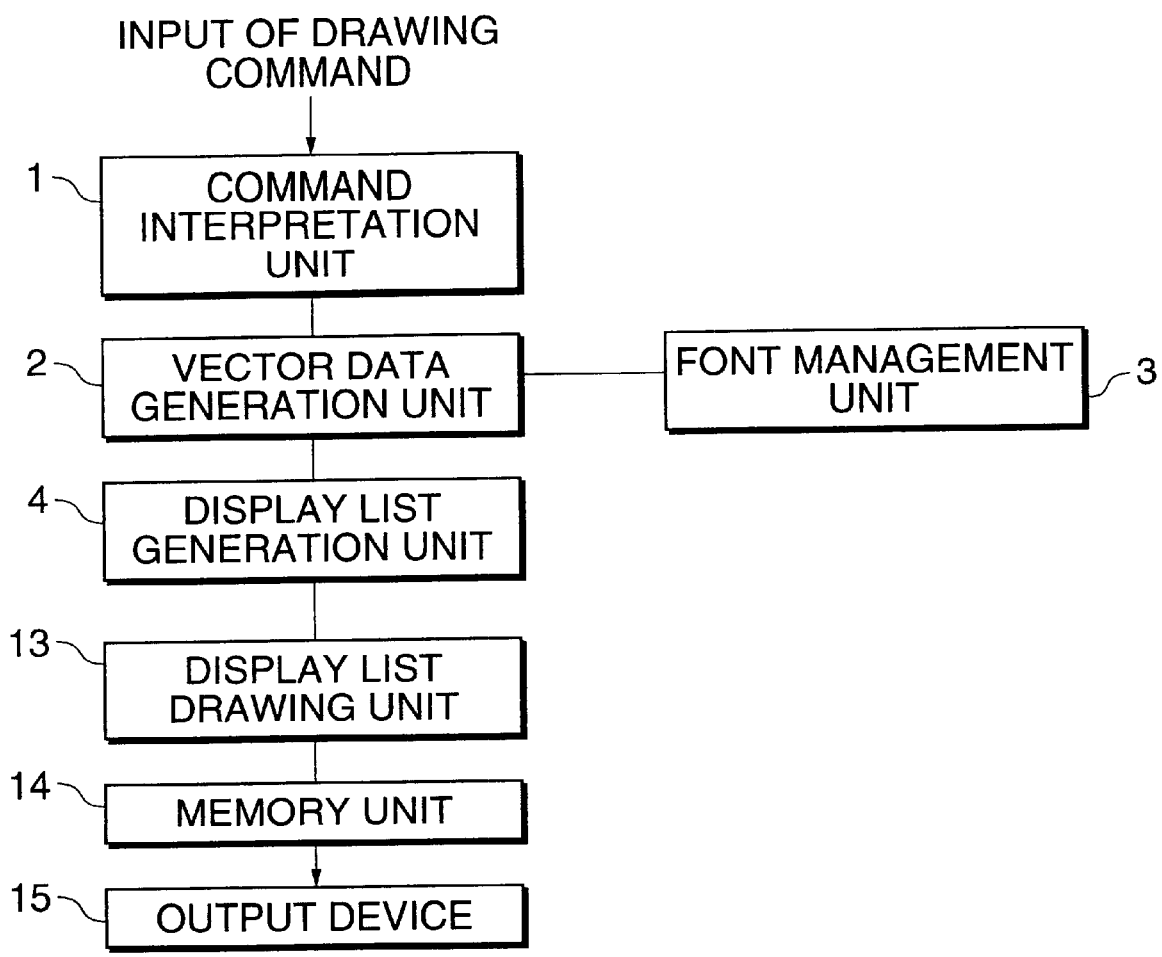
FIG. 2 is a block diagram showing an example of an existing graphics processing apparatus.

FIG. 1 is a block diagram showing an embodiment of a graphics processing apparatus of the present invention. In the diagram, the graphics processing apparatus has a command interpretation unit 1, a vector data generation unit 2, a font management unit 3, a display list generation unit 4, a display list storage unit 5, an area division unit 6, a merge process unit 7, a clip process unit 8, an overlap removal determination unit 9, an overlap removal process unit 10, a division determination unit 11, a division process unit 12, a display list drawing unit 13, a memory unit 14, and an output device 15. Further, the display list drawing unit 13 has 2N (N is a positive integer) DDAs 131, a sorting unit 132, and a memory drawing unit 133.

The general outline and operation of each of the elements of the embodiment will now be described.

The command interpretation unit 1 interprets a drawing command of inputted graphics or text and converts it into a format which can be understood by the vector data generation unit 2. In a page description language such as PostScript (trade mark of Adobe Systems, U.S.A.) or Interpress (trade mark of Xerox, U.S.A.), the drawing command is given as a character train or a binary train. In such a case, the command interpretation unit 1 takes a token out, interprets the token or the like, and converts the command into an internal drawing command.

Figure 3:
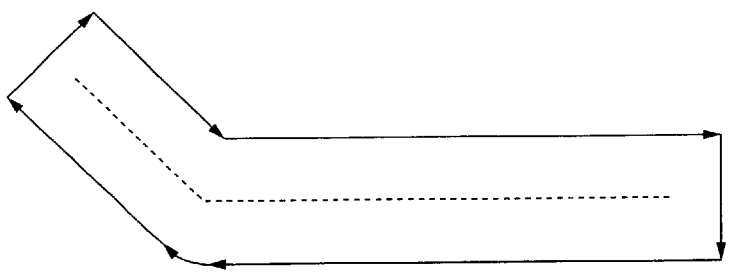
FIG. 3 is a diagram for explaining conversion from a stroke figure to a fill figure.
Figures 4A, 4B:
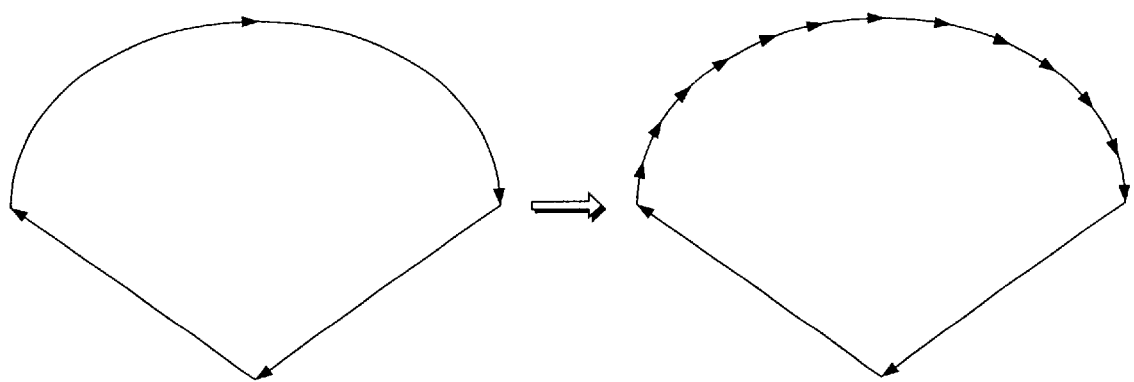
FIG. 4 is a diagram for explaining approximation of a curve by short straight lines.

The vector data generation unit 2 receives an input from the command interpretation unit 1 and generates vector data. In the case where the input is a filled (painted) figure, since vectors expressing the outline of the figure, a fill rule such as an even-odd rule or a non-zero winding number rule, a flatness value instructing the accuracy when a curve is approximated to a straight line, a drawing color, and the like are given from the command interpretation unit 1, the vector data generation unit 2 outputs the information as it is. In the case where the input is a stroke (line) figure, vectors expressing lines, line attributes such as line width, kind of line, shape of the end, and connection shape, a flatness value instructing the accuracy when a curve is approximated to a straight line, drawing colors and the like are given. Among them, the information of the vectors and the line attributes are used, and outline vectors as shown in FIG. 3 are generated and outputted together with the other information. When the input is a character, the information such as character code, font ID, drawing position and drawing color is given. Among them, the information of the character code, font ID, and drawing position is sent to the font management unit 3 and the outline vector of the character is obtained and outputted with the rest of the information.

The font management unit 3 stores the outline vector data for various fonts and provides the outline vector data of the character according to the given character code and the font ID.

Figure 6:
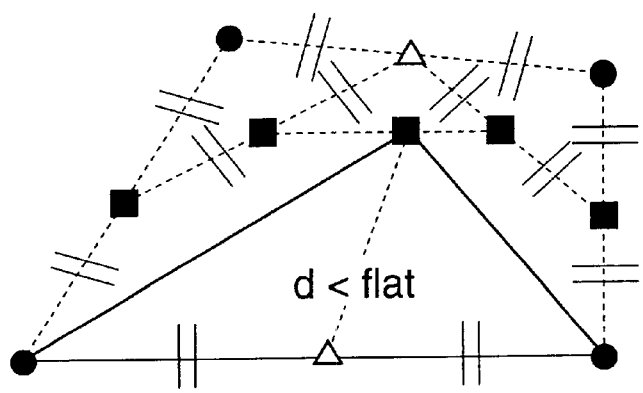
FIG. 6 is a diagram for explaining recursive division of a Bezier curve.

By the process, each of all graphics or text inputted is converted to information of vector data expressing the outline, drawing color, flatness value, and fill rule. When a curve is included in the inputted vector data, the display list generation unit 4 performs a process to approximate the curve by short straight line vectors so that an error is reduced and the accuracy designated by the flatness value is obtained. For example, a Bezier curve expressed by four control points shown in FIG. 6 is used for the vector of the curve. In this case, the process of converting the curve to line vectors is performed in such a manner that the Bezier curve is divided recursively as shown in FIG. 6 and the dividing operation is finished when the height (distance d) becomes smaller than the flatness value. By sequentially connecting the start points and the end points of divided Bezier curves, the process of converting the curve to line vectors is completed.

Figure 7:
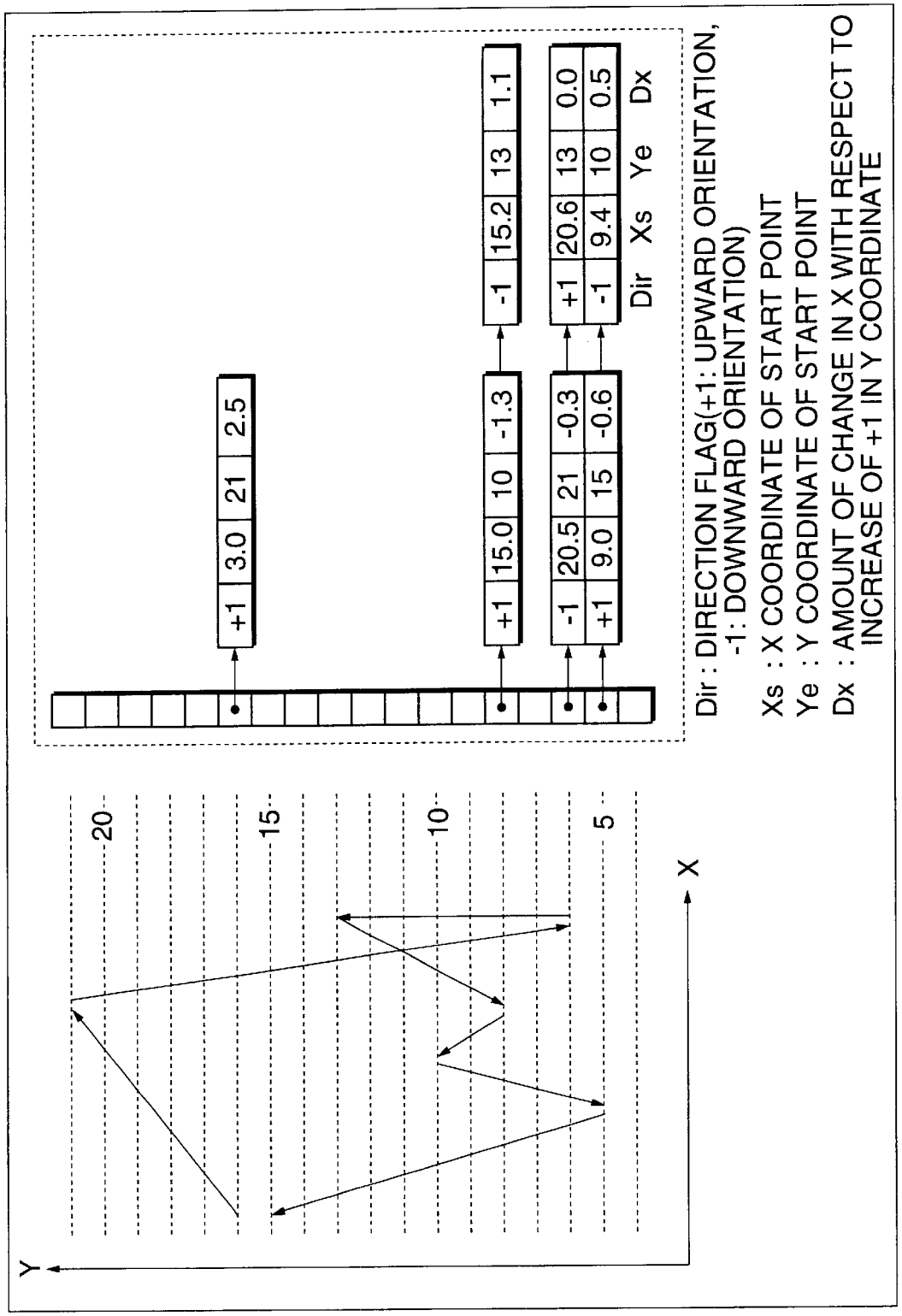
FIG. 7 is a diagram for explaining a display list.

On the basis of the vector data which is obtained by the approximation to straight lines, the display list generation unit 4 converts it into expression in a display list format. The display list is, for example, as shown in FIG. 7. An inputted polygonal vector is first converted so that the Y coordinate at each vertex becomes an integer. Specifically, with respect to each side, the vertex of a smaller Y coordinate is rounded up, the vertex of a larger Y coordinate is rounded down, and an error which is caused by the rounding operation is corrected by the X coordinate value so that the gradient of each side is not changed. After rounding the Y coordinate value, sides having the same Y coordinate as the start point are collected and connected in the list. As elements of the list, a direction flag Dir indicating whether the direction of a side is upward or downward by +1 or −1, an X coordinate value Xs at the start point Ys, an Y coordinate value Ye at the end point, and a gradient Dx of the side expressed by a change amount of the X coordinate value with respect to the increase of +1 of the Y coordinate value are stored. Sides such as an almost horizontal side, which do not cross any scan line are not registered as elements of the display list.

The display list generated as mentioned above is stored in the display list storage unit 5.

Although the description has been given with respect to the drawing elements, a similar process (except that a color or the like is not included) is performed to a clip element indicative of a clip area and a display list is generated. In the display list storage unit 5, the display list of clip elements generated prior to the drawing element is temporarily held. When the drawing element to be drawn in the clipped area is inputted and a display list is created, the display list is merged with the display list of the clip area by the merge process unit 7 and a resultant display list is again outputted to the display list storage unit 5.

Figure 8:
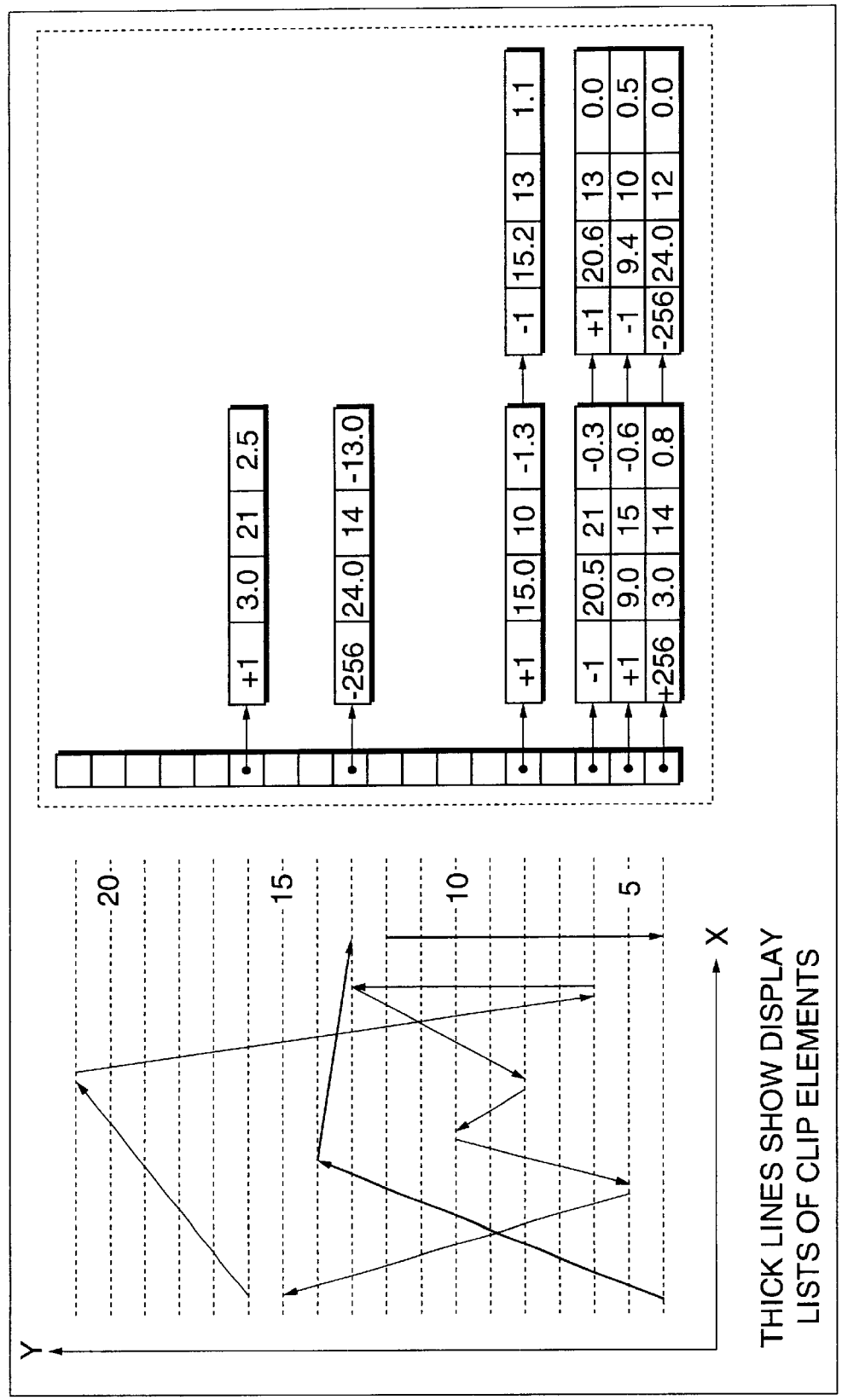
FIG. 8 is a diagram for explaining a display list in which drawing elements and clipping elements mixedly exist.
Figure 9:
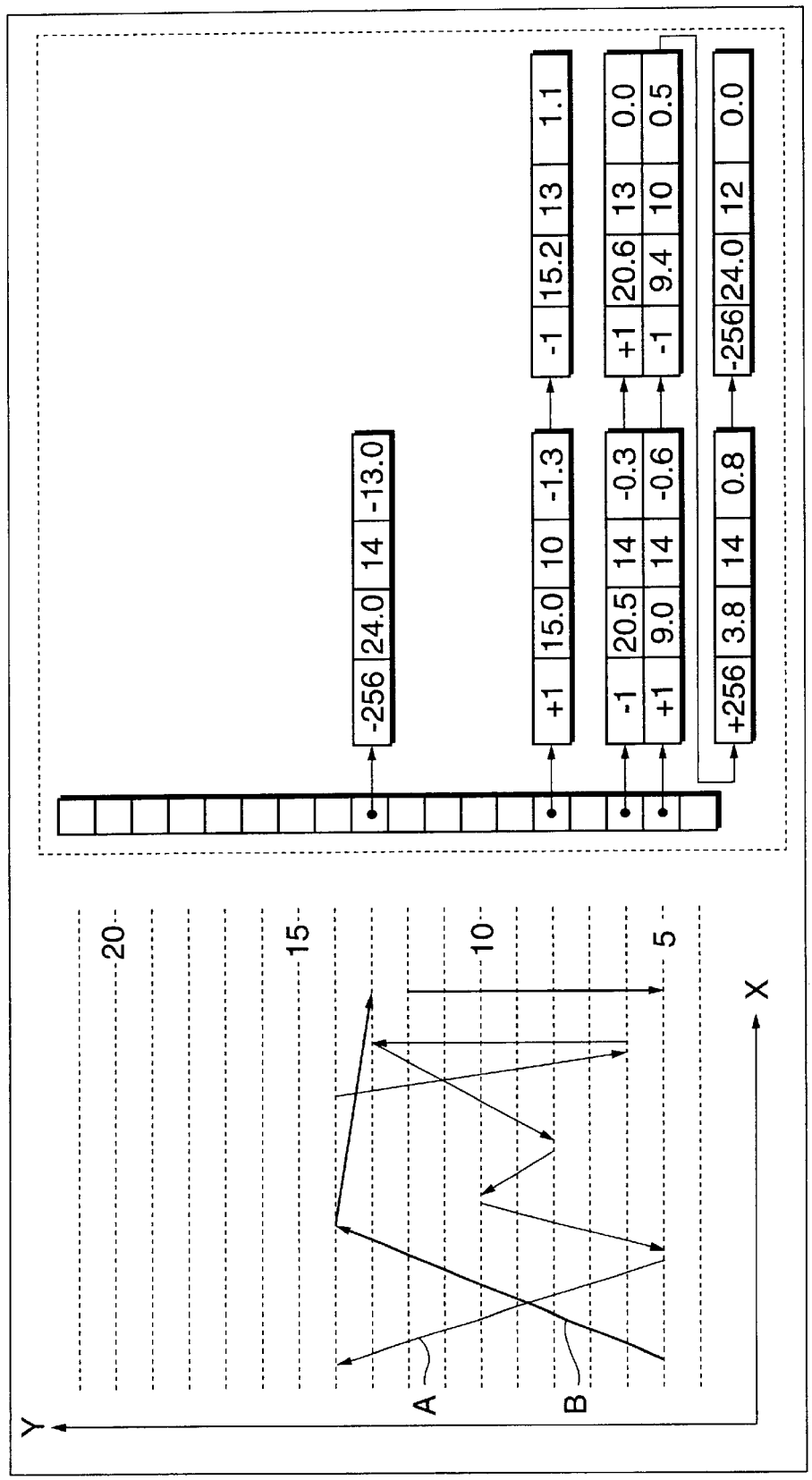
FIG. 9 is a diagram for explaining clipping in the Y direction of the mixed display list.

According to the merging process, as shown in FIG. 8, sides in the display list of the clip elements (thick lines in FIG. 8) temporarily held in the display list storage unit 5 and sides in the display list of the drawing elements (thin lines in FIG. 8) are mixed in ascending order of the start scan lines. At that time, with respect to a side included in the clip element, Dir is changed to a specific value (±256 in FIG. 8). It is sufficient that the Dir value is twice of the maximum number of sides which cross one scan line or larger. In the case where the upper limit is unknown, a larger value can also be used by including allowance. In the following, on assumption that more than 128 sides do not cross the same scan line, a case where the value is 256 will be described. When the display list is clipped within a rectangular area in which both elements exist, X coordinate area or Y coordinate area at the time of merging, the speed of the process can be slightly increased. An example of clipping and merging the display lists in the common Y coordinate area is shown in FIG. 9.

By the above processes, the drawing element is converted to a display list in which a display list expressing the drawing element and a display list, if any, of a clip element expressing a clipping area of the drawing element mixedly exist.

Figure 10A:
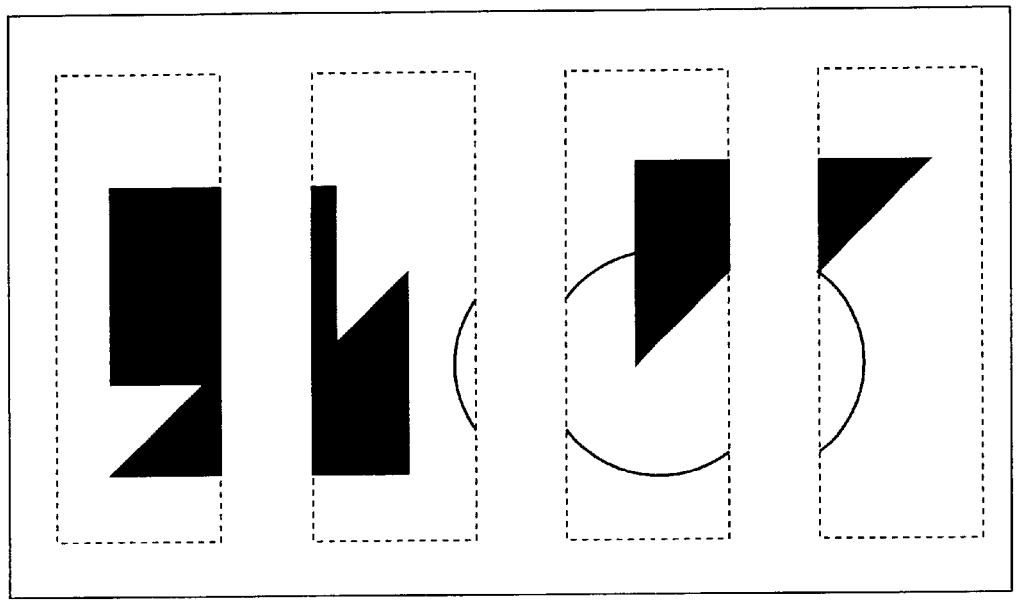
FIG. 10 is a diagram for explaining division into partial areas in a graphics processing apparatus of the present invention.
Figure 10B:
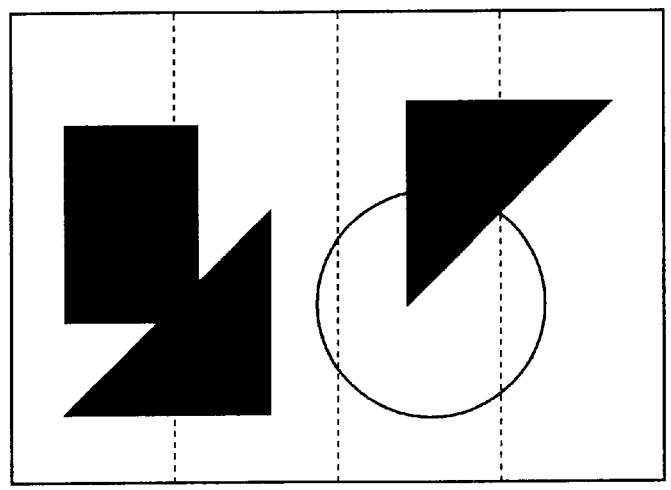

As illustrated in FIG. 10, the display list generated and stored as described above is divided into partial areas (called bands hereinbelow) obtained by dividing a page every predetermined width and stored in the display list storage unit 5 on the band unit basis.

The purpose of dividing the page into bands is to reduce the capacity of the memory unit 14 to two bands by drawing and outputting data by a double buffer method. The memory unit 14 has the capacity of two areas obtained by dividing the page as shown in FIG. 10 into horizontal strips. The drawing and the transfer to the output device 15 are alternately performed. Although the page is divided into four bands in the example illustrated in FIG. 10, the number of division can be arbitrarily set on the basis of the capacity of the memory unit 14, the construction of the processing apparatus, and the like.

Although the processes are executed according to the order of generation of the display list, the merging process, and the area division in the above description, there is no problem to perform the processes in accordance with the order of generation of the display list, the area division, and the merging process.

The overlap removal determination unit 9 reads the display list of each band accumulated in the display list storage unit 5, estimates the processing time when the band is drawn by the display list drawing unit 13, and checks to see whether the processing time is short enough for the printing speed of the output device 15.

When the band of which processing time is determined to be too long for the printing speed includes a mixed display list in which the drawing element and the clip element are merged, the mixed display list is processed by the clip process unit 8 so as to be converted to the display list having only drawing elements. Then the overlap removing process is performed by the overlap removal process unit 10 and the resultant display list is stored again into the display list storage unit 5. The overlap determining process, clipping process, and overlap removing process will be described in detail hereinafter.

The division determination unit 11 sequentially reads the display lists stored in the display list storage unit 5 and checks to see whether or not a part in which the number of sides which cross the scan line exceeds 2N (equal to the number 2N of the DDAs 131) exists in the inputted display list. The determining method will be described in detail hereinafter.

When it is determined that the number of sides exceeds 2N with respect to a certain scan line in a certain display list, in the case where the display list is not a mixed display list, the display list is outputted to the division process unit 12 and divided into plural display lists in which the number of sides which cross all of scan lines is 2N or smaller. The details of the dividing process will be described hereinafter. When there is the scan line which is crossed by more than 2N sides and the display list is a mixed display list, the mixed display list is first outputted to the clip process unit 8 and subjected to the clipping process, thereby converting the mixed display list into a display list of only drawing elements. The clipped display list is returned to the division determination unit 11 and the division determination is performed again. When a scan line which is crossed by more than 2N sides remains, it is divided by the division process unit 12.

The display lists generated and accumulated as mentioned above are inputted to the display list drawing unit 13 one by one. The display list drawing unit 13 has the 2N DDAs 131, the sorting unit 132 for sorting data of 2N or less outputted from the DDAs 131 in accordance with the X coordinate values, and the memory drawing unit 133 for obtaining the pair of the start and end points from the result of the sorting and drawing between the start and end points in a designated drawing color on a memory. A polygon expressed by the inputted display lists is developed and drawn in the memory area corresponding to the band in the memory unit 14. The process will also be explained in detail hereinafter.

When all of the drawing elements in the band are drawn in the memory unit 14, the result is outputted to the output device 15 and printed or displayed by the printer or the display or the like.

The general outline of the graphics processing apparatus of the present invention has been described above. The details of the main part of the graphics processing apparatus will now be described.

First, the clip process unit 8 will be explained.

Figure 11:
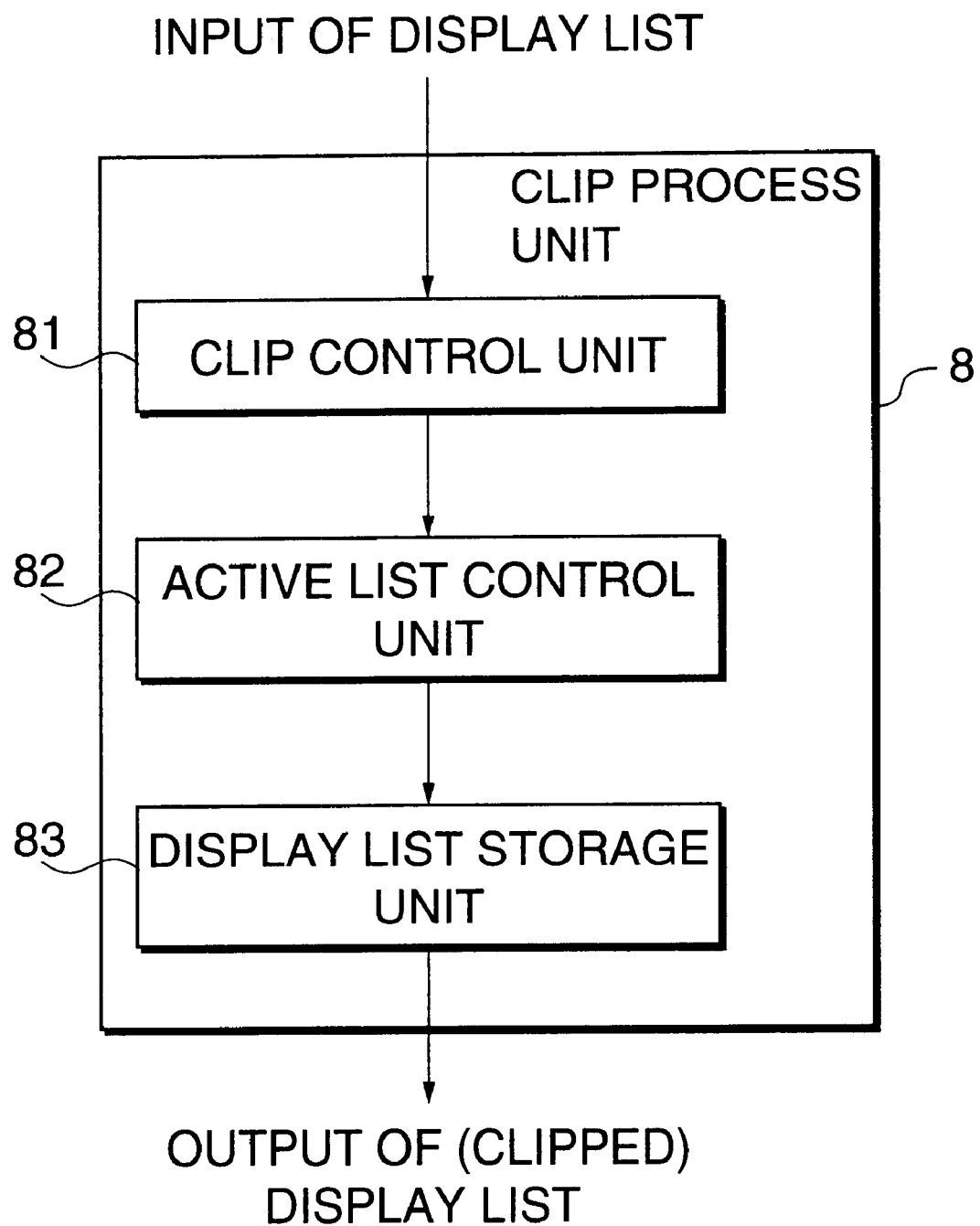
FIG. 11 is a block diagram showing an example of a clipping process unit in the graphics processing apparatus of the present invention.

As shown in FIG. 11, the clip process unit 8 has a clip control unit 81 for controlling the whole clipping process, an active list control unit 82, and a display list storage unit 83 for temporarily storing the display list.

The operation of the clip control unit 81 will be explained hereinbelow along the flowcharts shown in FIGS. 12 to 15.

First in step 1, Yc expressing a scan line to be processed is set to Ymin. Ymin is the minimum value of the Y coordinate of the start scan line of a side included in a target display list. For example, in the case of the display list shown in FIG. 9, Ymin=5.

In step 2, the X coordinate value at the intersection of each of sides in the active list control unit 82 and Y=Yc is calculated by a method of a DDA or the like. At the time point of Y=Ymin, no side is registered in the active list control unit 82, so that no operation is performed.

Figure 16:
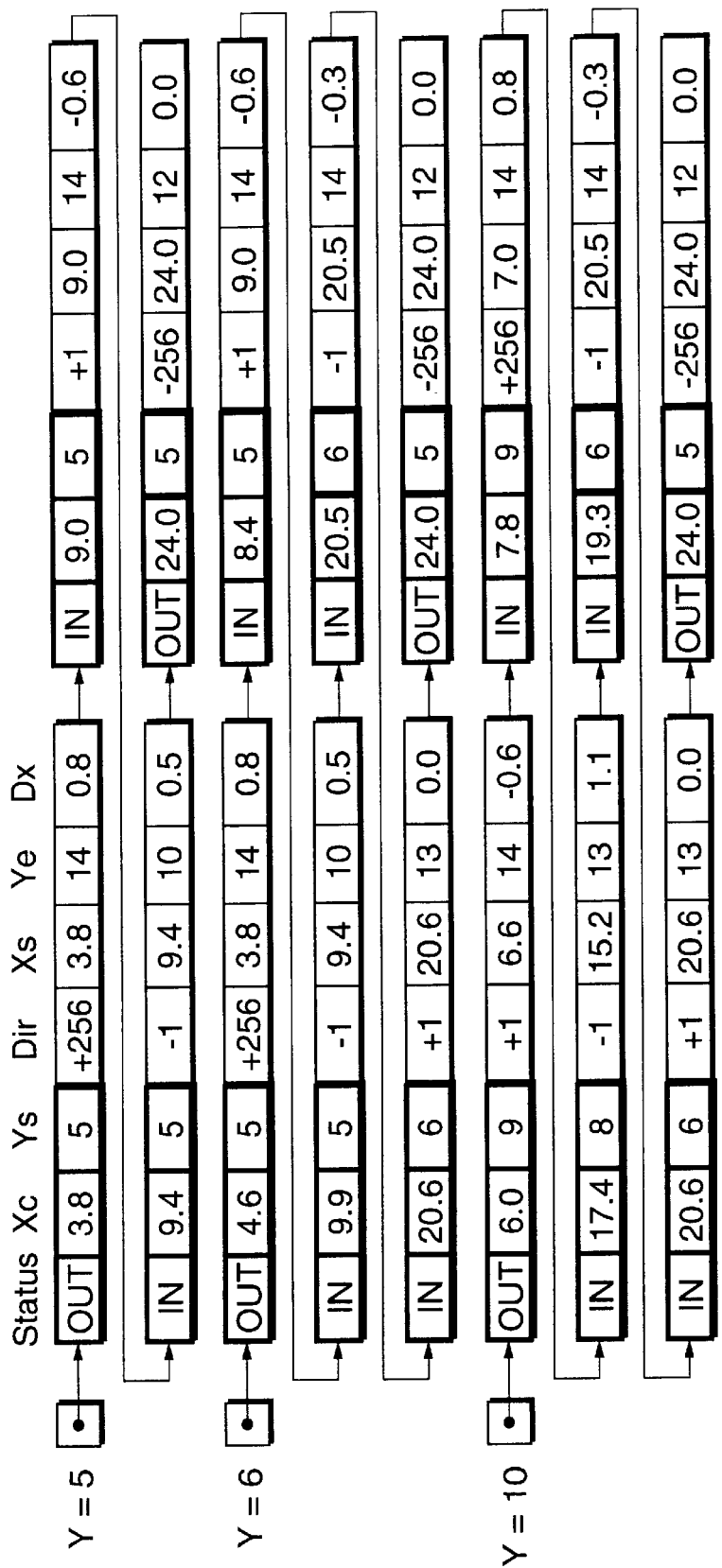
FIG. 16 is a diagram for explaining an active list.

In step 3, when there is a side having Yc as a start point, it is taken from the display list to be clipped and added to an active list in the active list control unit 82. The active list is a list constructed by only sides which cross the target scan line. For example, as shown in FIG. 16, other than Dir, Xs, Ye, and Dx, information such as status for storing status information of a side, an X coordinate value Xc of the intersection with the current scan line, and a start scan line Ys of a side is added. A side newly added has Status=INIT, Xc=Xs, and YS=Yc.

In step 4, the side data in the active list is sorted in ascending order of Xc.

Figure 13:
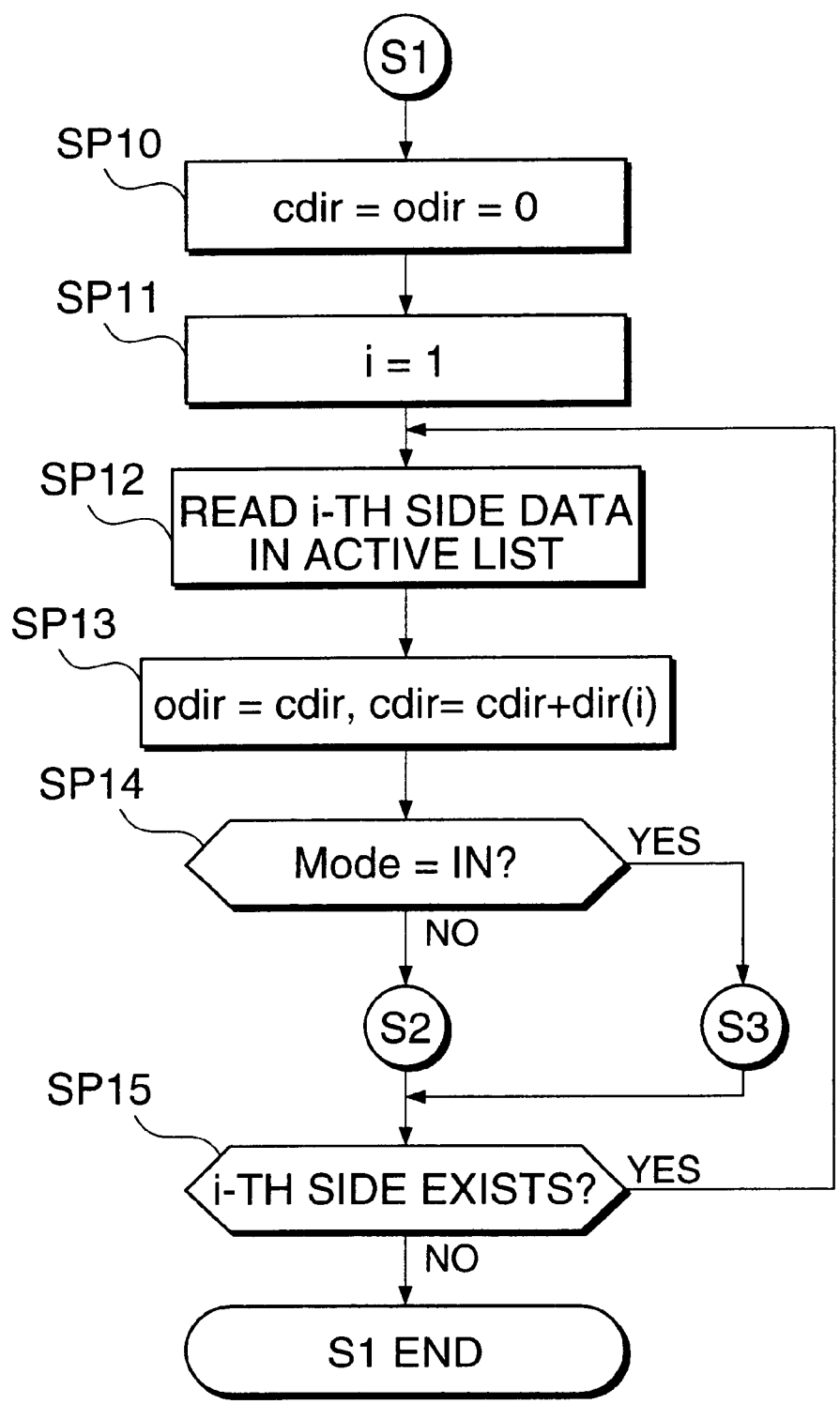
FIG. 13 is a flowchart (No. 2) showing the procedure of the clipping process in the graphics processing apparatus of the present invention.

The processing routine advances to S1 (refer to FIG. 13 for details). In step 10 shown in FIG. 13, each of variables cdir and odir is set to 0. "c" in cdir denotes "current" and "o" in odir denotes "old".

In step 11, a variable i is set to 1. The variable i indicates that the side to be processed is the i-th side. In steps 10 and 11, the setting of the initial values is completed.

In step 12, the i-th side data is read from the active list.

In step 13, by setting odir=cdir, cdir is substituted for odir and, further, the value dir of the read i-th side data is added to cdir.

Figure 17:
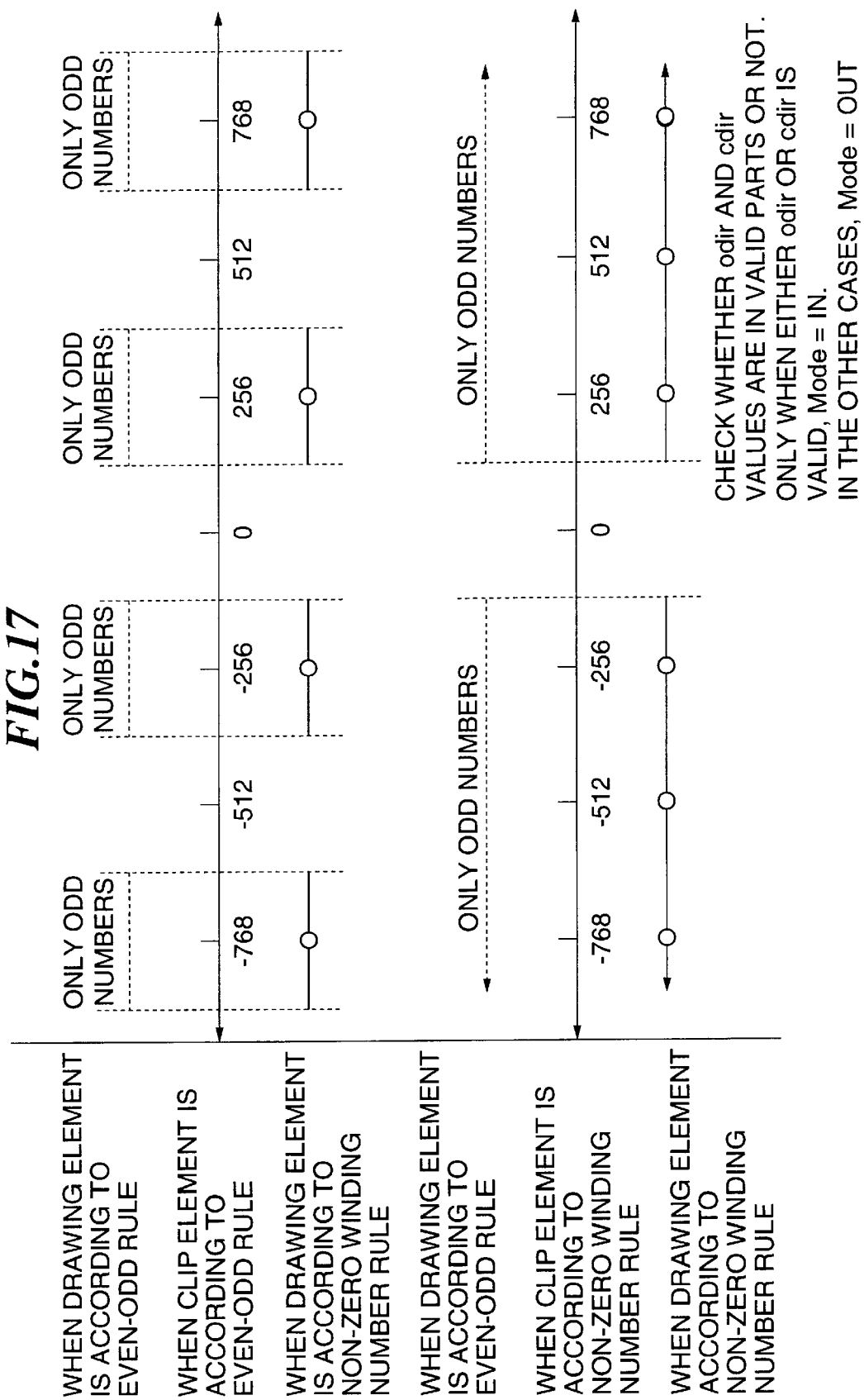
FIG. 17 is a diagram for explaining a mode determination in the clipping process in the graphics processing apparatus of the present invention.

In step 14, the mode is determined from the values of odir and cdir. The mode is determined according to the rule shown in FIG. 17. FIG. 17 shows the rule how the mode is determined on the basis of the both values of odir and cdir. There are a non-zero winding number rule and an even-odd rule as input drawing element filling rules. The mode determination varies whether the drawing element to be processed is according to the non-zero winding number rule or the even-odd rule.

The determination reference shown at the upper stage of FIG. 17 relates to the case where the clip element is according to the even-odd rule and that at the lower stage relates to the case where the clip element is according to the non-zero winding number rule. In each of the cases, the determination reference differs according to the rule of the drawing element (whether the even-odd rule or the non-zero winding number rule). In FIG. 17, when either the odir value or the cdir value is within a solid line area, mode=IN is determined. In the other cases, mode=OUT is determined. In an area indicated by broken lines, only when a specified condition described in the broken line area is satisfied, mode=IN is determined. In the area indicated by broken lines in FIG. 17, the condition of "only odd number" is described. It denotes that only when either the odir value or the cdir value is an odd number in the area indicated by the broken lines, mode=IN is determined. A blank circle in the center part of a solid line in FIG. 17 indicates a part which does not correspond to the solid line. For example, when the clip element at the upper stage in FIG. 17 is according to the even-odd rule and the drawing element is according to the non-zero winding number rule, in the solid line including 256, when either the odir value or the cdir value is within the area range except for 256, mode=IN. When the value is 256, mode=OUT.

For example, when the drawing element is according to the non-zero winding number rule, the clip element is according to the even-odd rule, odir=0, and cdir=1, both of the values are not in the solid line nor the area indicated by the broken lines, Mode=OUT. When the drawing element is according to the even-odd rule, the clip element is according to the non-zero winding number rule, odir=257, and cdir=256, odir and cdir are within the broken line area of only odd numbers. Since only odir satisfies the condition of only the odd number, Mode=IN.

In the case where Mode=IN, the fill is valid between the target side (i) to the next side (i+1) on the current scan line (Y coordinate). On the contrary, when Mode=OUT, the fill is invalid between the target side to the next side on the current scan line. Status=IN denotes that Mode=IN with respect to the side on the previous scan line. Status=OUT denotes Mode=OUT on the previous scan line.

The description of the flow shown in FIG. 13 will be continued. When it is determined in step 14 that Mode= OUT, the routine advances to S2 (refer to FIG. 14 for details). In step 20 (FIG. 14), status information Status of the i-th side is read. When Status is IN, the routine advances to step 21. In the other cases (OUT, INIT), the routine advances to step 23.

The status information of the side is information regarding a vector added to the active list (refer to FIG. 16) constructed by only sides each having an intersection on the target scan line as described above other than Dir, Xs, Ye, and Dx and has the value of INIT, IN, or OUT. Status of a side newly added is set as INIT and, after that, changed according to the flow.

In step 21, the part of Y=Ys to Yc−1 is outputted from the i-th side data to the display list storage unit 83. More specifically, for example, when Ys=10, Ye=20, Xs=3.5, Dx=0.5, Dir=+1 and Yc=15 in the i-th side data, side data of Ys=10, Ye=14, Xs=3.5, Dx=0.5, and Dir=+1 is outputted.

In step 22, in order to delete the part outputted in step 21, the i-th side data in the active list is changed to Ys=Yc and Xs=Xc.

In step 23, the status of the i-th side data is changed to OUT (Status=OUT).

In step 24, whether Ye in the i-th side data is equal to Yc or not is checked. When YES, the side is deleted from the active list in step 25. When NO, (i) is incremented by one in step 26. Then the routine S2 is finished and the program is moved to step 15 shown in FIG. 13.

Figure 15:
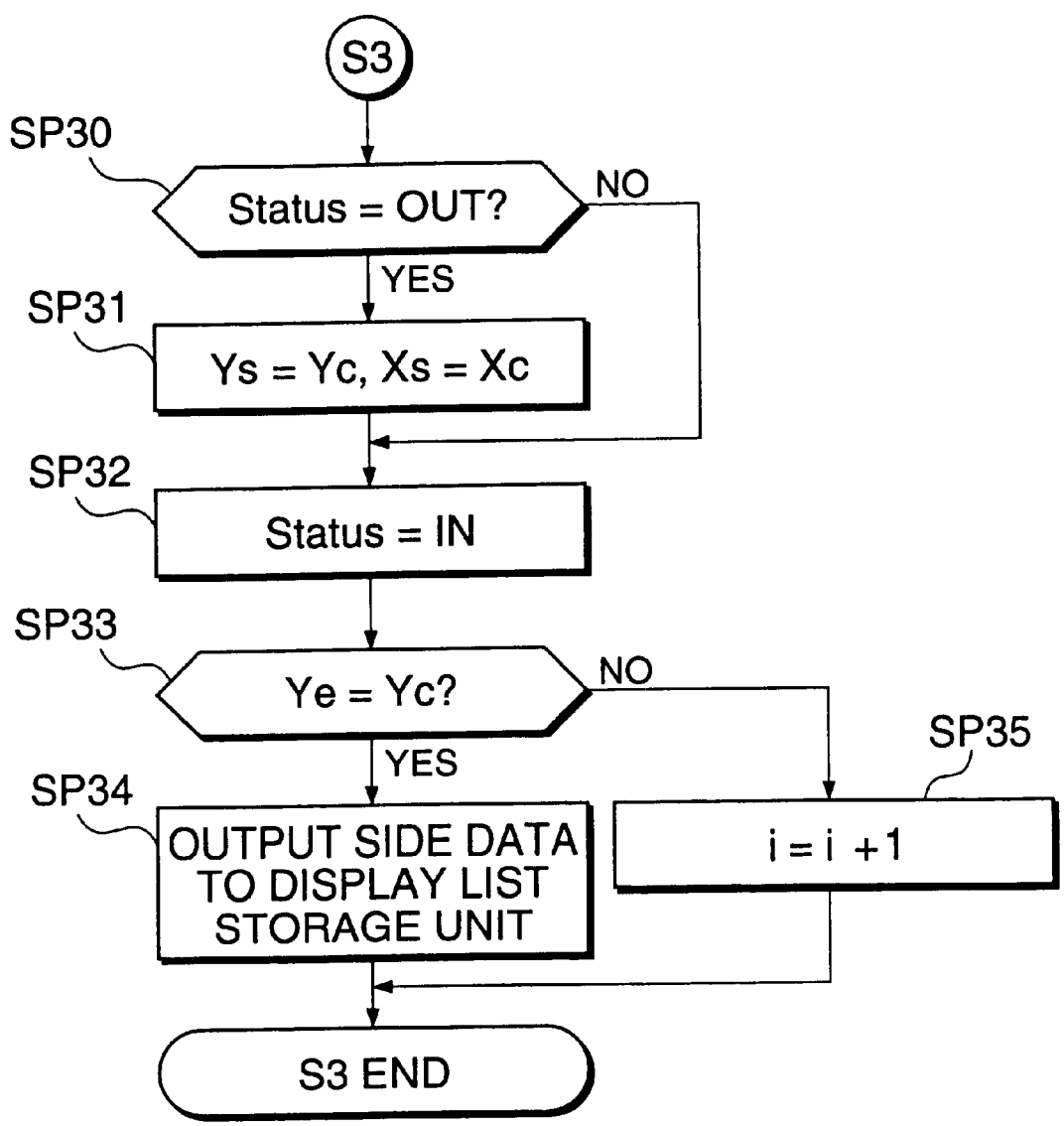
FIG. 15 is a flowchart (No. 4) showing the procedure of the clipping process in the graphics processing apparatus of the present invention.

When it is determined in step 14 shown in FIG. 13 that Mode=IN, the routine advances to S3 (refer to FIG. 15 for details). In step 30 shown in FIG. 15, the status information Status of the i-th side is read. When Status is OUT, the routine advances to step 31. In the other cases (IN, INIT), the routine advances to step 32.

In step 31, the i-th side data in the active list is changed to Ys=Yc and Xs=Xc.

In step 32, Status of the i-th side data is changed to IN.

In step 33, whether Ye in the i-th side data is equal to Yc or not is checked. When YES, the side is outputted to the display list storage unit 83 and deleted from the active list in step 34. When NO, (i) is incremented by one in step 26. Then the routine S3 is finished and the program is moved to step 15.

In step 15 in FIG. 13, whether there is the i-th side in the active list or not is checked. When YES, the routine is returned to step 12. When NO, S1 is finished and the processing routine is shifted to step 5 shown in FIG. 12.

In step 5, whether Yc is equal to Ymax or not is determined. When YES, the process is finished. When NO, Yc is incremented by one in step 6 and the processing routine is returned to step 2. Ymax is the maximum value of the Y coordinate of the end scan line of the side included in the target display list. For example, in the case of the display list shown in FIG. 9, Ymax=14.

After performing the processes described by using the flowcharts, the active list is changed as a part of the progress is shown in FIG. 16. As a result, a new display list which has been subjected to the clipping process shown in FIG. 18 is stored into the display list storage unit 83.

For example, a side of the drawing element shown by A in FIG. 9 crosses a side B of a clip element at Y=9, the fill state changes around the intersection, and the mode is changed from IN to OUT. In S2 (FIG. 14), the side is divided into parts, the first side divided by the intersection is stored in the display list storage unit 83 and Status of the remaining divided side is set as OUT. The state of the side B has been OUT until then (refer to Y=6 in FIG. 16) and the state is held in S2. Since the mode is changed to IN at Y=9, in S3 (FIG. 15), the side information up to Y=8 is deleted and only the side information at Y=9 or larger is used and Status is changed to IN.

In such a manner, the side of a new display list to which the clipping process is performed is obtained.

Figure 18:
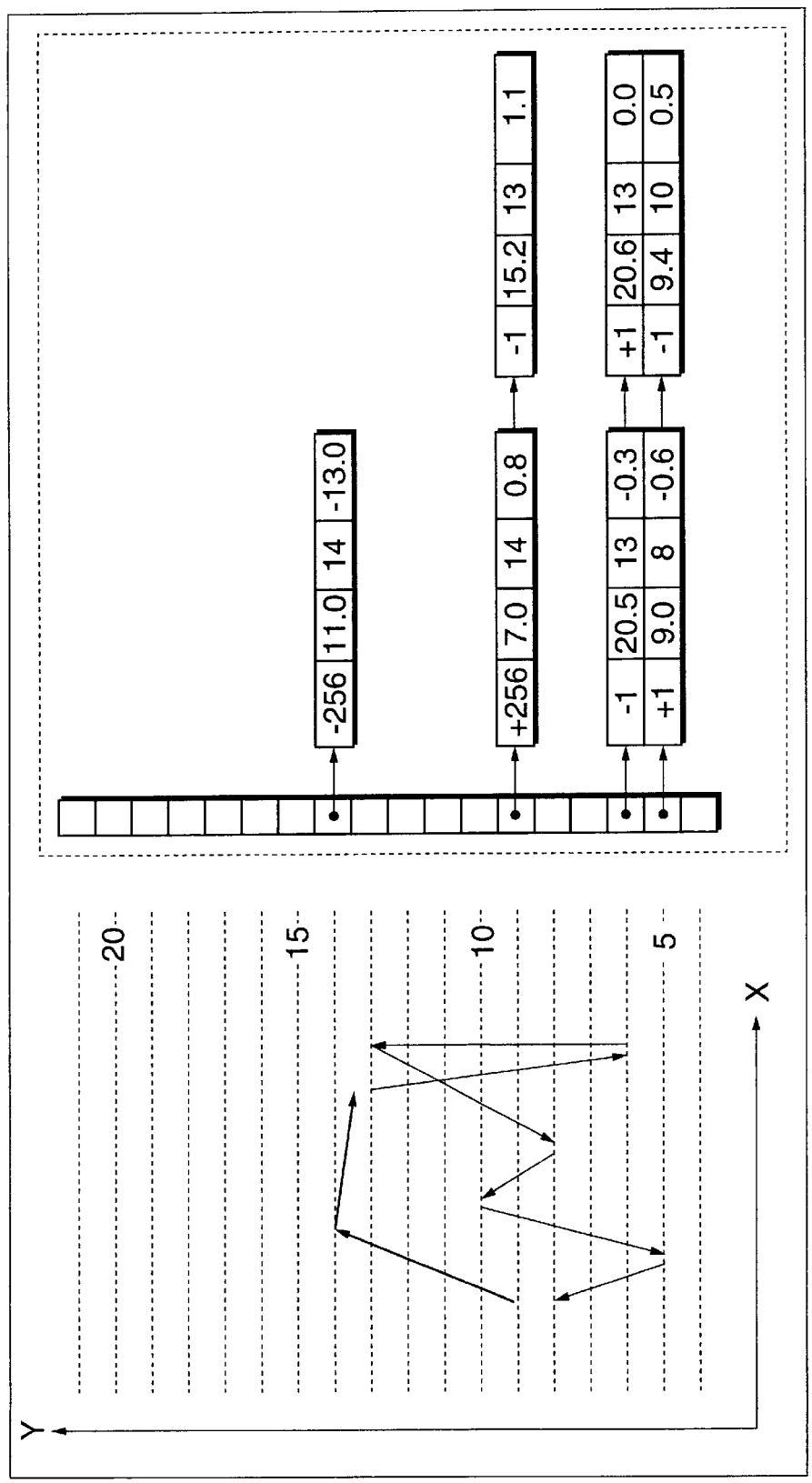
FIG. 18 is a diagram for explaining a display list outputted after the clipping process in the graphics processing apparatus of the present invention.

FIG. 18 shows a new display list created in accordance with the flow of FIGS. 12 to 15 after the overlap is removed from the display list shown in FIG. 9. As understood from comparison between FIGS. 9 and 18, only the display lists related to the side data (drawing elements) of thin solid lines within the area (clipped area) surrounded by thick solid lines are left. A new display list obtained by eliminating display lists related to the vectors in the area out of the thick solid lines is generated as shown in FIG. 18.

As a result of the processes according to the flowchart, even in the case of the display list in which the drawing element is according to the non-zero winding number rule, it is converted to an output according to the even-odd rule. Although the value dir of ±256 is included in the side in the processed display list, 1 is added or subtracted to/from the value and the resultant is outputted.

Although it has been described for simplicity of explanation that the clipping process is performed according to the flow, when some conditions are satisfied, the process can be further simplified. For example, when circumscribed rectangles of the drawing element and the clip element do not have a common area, it is obvious that nothing is outputted as a result of the clipping process.

For example, when it is known that either the drawing element or clip element is a rectangle and the circumscribed rectangle of the other element is included in the graphics element as a rectangle, the clipping process is performed only by outputting a display list of the element which is not the rectangle. Even when the circumscribed rectangle is not included, the clipping process with the rectangle is performed only by restricting the range of a straight line vector to the Y coordinate range of the rectangle in the Y coordinate direction. When all or no sides of the graphics element are between the right and left sides of the rectangle, the process in the X coordinate direction can be omitted. Although the condition is slightly different, the process can be similarly simplified also in the case of a relatively simple figure such as a trapezoid or triangle.

The overlap removal determination unit 9 will now be described in detail.

Figure 19:
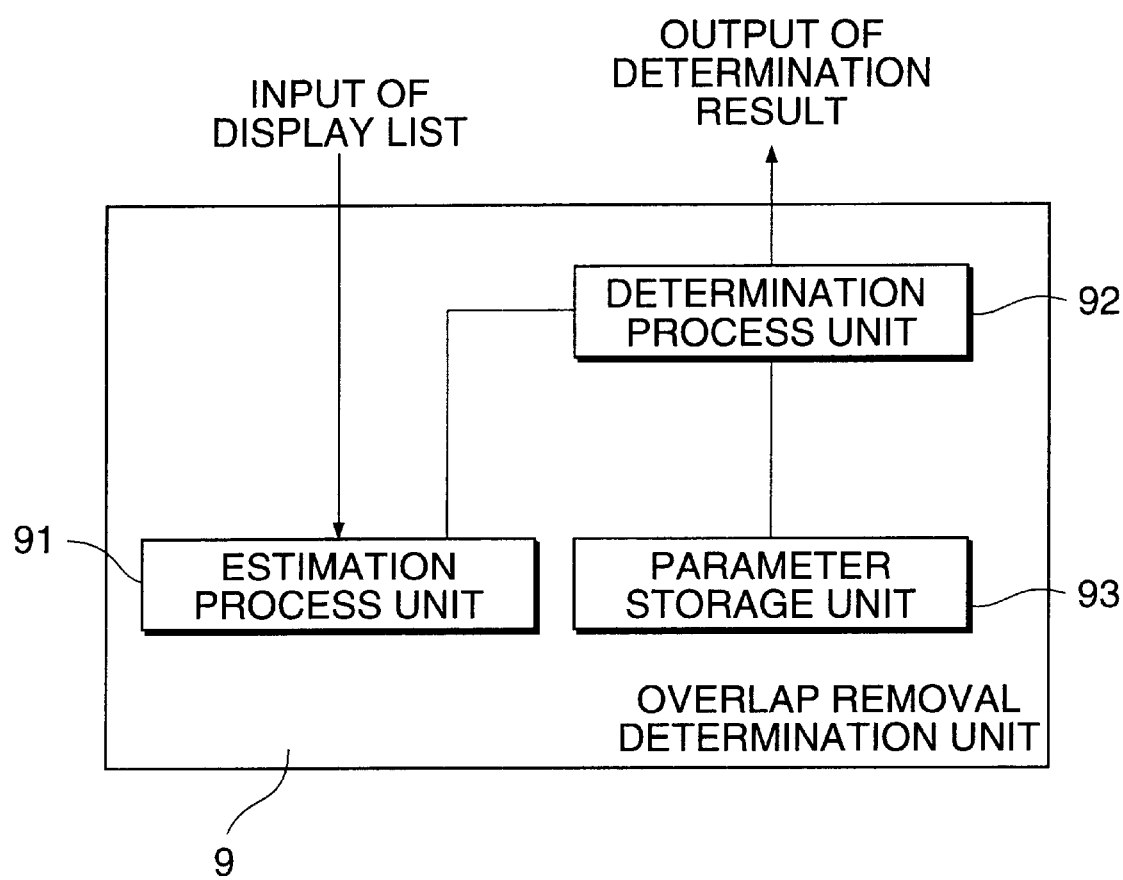
FIG. 19 is a block diagram showing an example of an overlap removal determination unit in the graphics processing apparatus of the present invention.

FIG. 19 is a block diagram showing an example of the overlap removal determination unit 9. In FIG. 19, an estimation process unit 91 estimates the processing time in the display list drawing unit 13 on the basis of the inputted display list. A determination process unit 92 checks to see whether the overlap removing process is necessary or not on the basis of the result of the estimating process in the estimation process unit 91. A parameter storage unit 93 stores processing parameters which are necessary in the estimation process unit 91 and the determination process unit 92.

As described above, display lists of drawing elements of one page are divided into bands and stored in the display storage unit 5. After the above processes are finished, the overlap removal determination unit 9 reads the display list, determines whether an overlap removing process is necessary or not every band, and notifies the overlap removal process unit 10 of the result. The overlap removal process unit 10 performs the overlap removing process to the display list included in the band which is determined that the overlap removal is necessary in accordance with the determination result.

When the display lists are inputted to the estimation process unit 91, the estimation process unit 91 obtains a circumscribed rectangle drawn by the display lists and estimates the drawing time from the area and height by the following equation. (a) and (b) in the following equation are coefficients which are preliminarily obtained, held in the parameter storage unit 93 and supplied to the estimation process unit 91.

[Equation 1]

$$\text{(estimated drawing time)} = a \times \text{(area of circumscribed rectangle)} + b \times \text{(height of circumscribed rectangle)} \quad (1)$$

When the drawing process is executed by H/W or the like, writing of data to the memory unit 14 is usually a bottleneck of the process. The writing to the memory is proportional to the drawing area and there is an overhead such as a memory access mode switching in the writing operation per scan line. In the expression (1) consequently, the area of the circumscribed rectangle obtained by approximating the drawing area is multiplied by a proportional coefficient. Further, the term of multiplying the height of the circumscribed rectangle (=height of the drawing element) corresponding to the number of drawing scan lines by a proportional coefficient is added.

As the area and height of the circumscribed rectangle in the expression (1), in the case of a display list in which the drawing element and the clip element mixedly exist, an AND area of the circumscribed rectangles of the drawing element and the clip element is used.

The expression (1) is an expression of estimating the drawing processing time by the graphics processing apparatus having the construction in which the writing to the memory is a bottleneck. In the case of a construction in which a different part is a bottleneck, it is natural to use an estimation expression according to the construction. In the expression (1), in consideration of the processing amount of accurately obtaining the drawing area from the display list, approximation is performed by using the circumscribed rectangle. Since the drawing to the memory is not necessary in the estimation, although the processing time is rather long, it is also possible to obtain an accurate drawing area by executing a pseudo drawing process. Further, it is also possible to obtain a drawing area more accurate than the circumscribed rectangle by performing a pseudo drawing process at a resolution lower than an actual output resolution.

For example, the shape of a drawing element having the large number of sides in the display list is complicated so that there is the possibility that the difference between the area of a circumscribed rectangle and the actual drawing area is large. In such a case, by performing correction using the number of sides to the expression (1), an estimation value which is more accurate can be obtained.

When the graphics satisfy a certain condition, the area can be obtained more accurately without performing the drawing process. For example, when the element inputted to the display list generation unit 4 is a stroke figure, by integrating values each obtained by multiplying the length and width of each straight line vector after the process of approximation to the straight vector, a drawing area can be obtained in a manner like approximation. When the kind of a line is a broken line, if the ratio of the drawn part of the line to a blank part is known, it is sufficient to perform the correction by using the ratio. Even if the ratio is not known, the drawn area can be obtained more accurately as compared with the circumscribed rectangle.

Figure 5C:
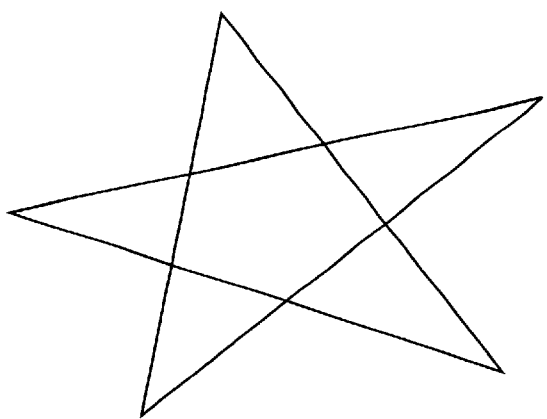
FIGS. 5A to 5C are diagrams showing various polygons.
Figure 5B:
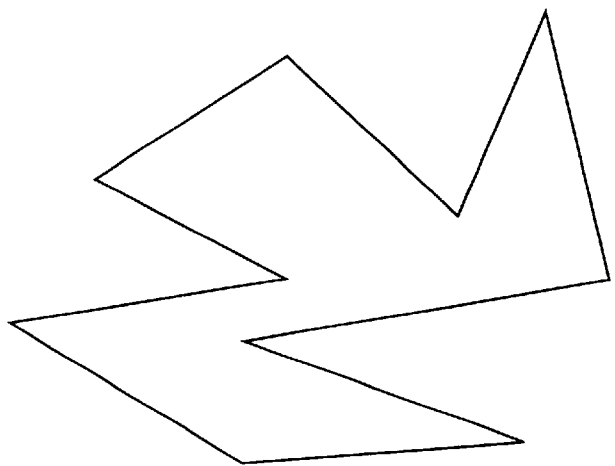
Figure 5A:
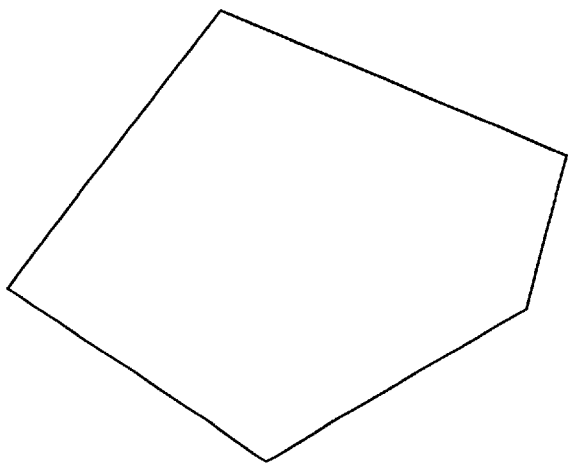

When it can be determined that the element inputted to the display list generation unit 4 is a fill figure (including a fill figure converted from a stroke figure as shown in FIG. 3), does not have a self intersection (refer to FIG. 5C for an example that the element has the self intersection), and is a single figure (for example, a figure in which outer and inner circles are separated like a doughnut is not the single figure), the area can be calculated by, for example, the following expression (2) after the process of approximation to the straight line vector. $(X_i, Y_i)$ in the expression indicate the coordinates at the vertex of a polygon and (n) denotes the number of vertexes of the polygon. $\text{abs}(x)$ denotes the absolute value of x.

[Expression 2]

$$\text{(area of polygon)} = \text{abs}\left(\sum_{i=2}^{n} |(X_i - X_1)(Y_{i+1} - Y_{i-1})|\right) / 2 \quad n: \text{odd number}$$

$$\text{abs}\left(\sum_{i=2}^{n/2} |(X_{2i-1} - X_1)(Y_{2i} - Y_{2i-2}) + (X_{2i} - X_2)(Y_{2i+1} - Y_{2i-1})|\right) / 2 \quad n: \text{even number}$$

The method can also be applied to a case where there is a self intersection when the graphic is divided at the intersection. Even if a figure is constructed of plural separated figures, the method can be applied when there is no common area in the separated figures.

Although the area obtained in such a manner and its approximation value do not coincide with the drawing area in the memory unit 14, the degree of coincidence is much higher as compared with the area of the circumscribed rectangle. Consequently, by giving the area as additional information to a display list at the time of generating the display list and accordingly changing the expression (1), the determination accuracy in the overlap removal determination unit 9 can be improved.

Expression (1) indicates the case where text or graphics is inputted as a drawing element. When an image is included in the drawing command, a display list expressing the outline of the image is processed by the display list drawing unit 13, an image processed by an image processing part which is not shown in FIG. 1 is used, and the inside of the drawing area is drawn with image data which differs for every pixel, reading of the image data may be a bottleneck. In such a case, a flag indicating whether it is an image or not is set as attribute information to each display list and it is necessary to accordingly change the estimation expression and the coefficient.

The estimation process unit 91 obtains estimated drawing time of each display list by the above process, integrates the obtained values with respect to a band to thereby obtain estimated drawing time of the band, and outputs the result to the determination process unit 92.

The determination process unit 92 checks to see an effect of the overlap removing process by comparing estimated drawing time of a partial area with a threshold preliminarily stored in the parameter storage unit 93 and outputs the result of the comparison. When the result is equal to or smaller than the threshold, the overlap removing process is unnecessary. When the result exceeds the threshold, the overlap removing process is necessary. The overlap removal process unit 10 removes the overlap in the display list of the band in accordance with the determination result.

The threshold used for the determining process is preliminarily determined from the printing speed of the output device 15, an error in the estimation expression, and the like. For example, when a printer for outputting data in the longitudinal direction of A4 in 30 seconds is used and the A4 paper in the longitudinal direction is equally divided into 120 bands, each partial area has to be developed within 0.25 seconds. When the maximum estimated error is 0.05 seconds around the estimation value of 0.25 seconds, the threshold is set to 0.20 seconds.

The overlap removal process unit 10 will now be described in detail.

Figure 20:
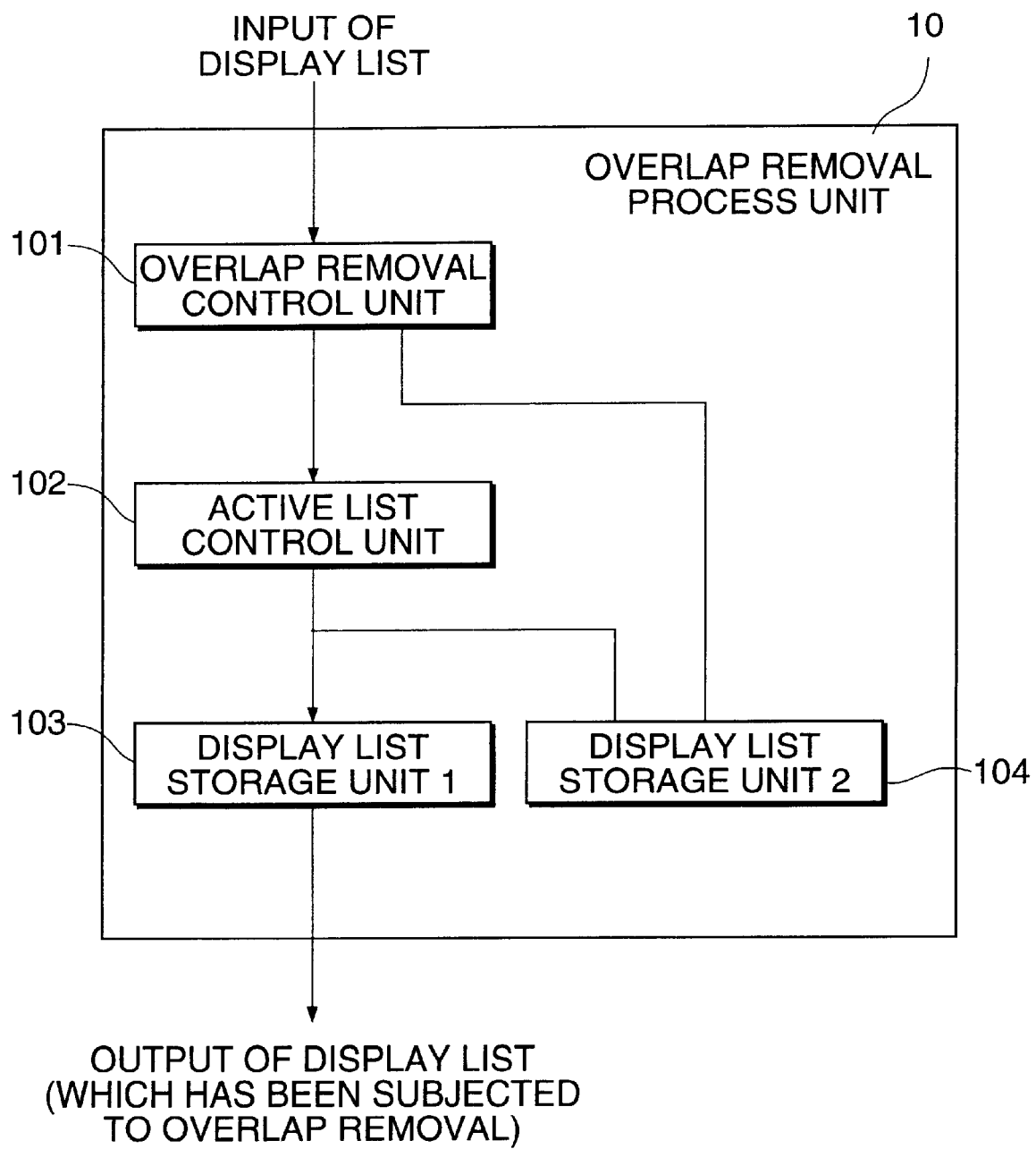
FIG. 20 is a block diagram showing an example of the overlap removal process unit in the graphics processing apparatus of the present invention.

FIG. 20 is a block diagram showing an example of embodying the overlap removal process unit 10. The overlap removal process unit 10 has an overlap removal control unit 101, an active list control unit 102, and a first display list storage unit 103 and a second display list storage unit 104 for temporarily storing a display list.

The overlap removal control unit 101 first takes a display list stored in the display storage unit 5 from the end in accordance with the drawing order and merges it with a display list temporarily stored in the second display list storage unit 104, thereby generating a new display list.

The meaning of taking the display list from the end in accordance with the drawing order will be briefly described. When plural drawing elements are included in general graphics, for example, when a square B is drawn so as to be partially overlaid on a triangle A and further a circle C is drawn with a partial overlay on the square B, display lists of the drawing elements A, B, and C held in the display list storage unit 5 are arranged in accordance with the order of A, B, and C. By first performing a display list process with respect to the drawing element A and, after that, performing a display list process with respect to the drawing element B, the data B is overwritten on the drawing data A. Further, by executing a display list process of C at last, the drawing element C is overwritten on the drawing elements A and B. In such a manner, display lists from the display list of the drawing element as the lowermost layer at the time of printing or on a screen to the display list of the drawing element as the uppermost layer are sequentially arranged and held in the display list storage unit 5.

In the graphics processing apparatus of the present invention, when plural display lists corresponding to such plural drawing elements are stored in the display list storage unit 5, the display lists are taken from the display list storage unit 5 in accordance with the order from the display list positioning in the rear row, that is, the display list related to the drawing element to be displayed on the most front surface. For example, as described above, when the square B is drawn so as to be partially overlaid on the triangle A and the circle C is drawn so as to be partially overlaid on the square B, the display lists are arranged in accordance with the order of A, B, and C and stored in the display list storage unit 5. In this case, in the graphics processing apparatus of the present invention, the display lists are sequentially taken in accordance with the order of C, B, and A.

Figure 21:
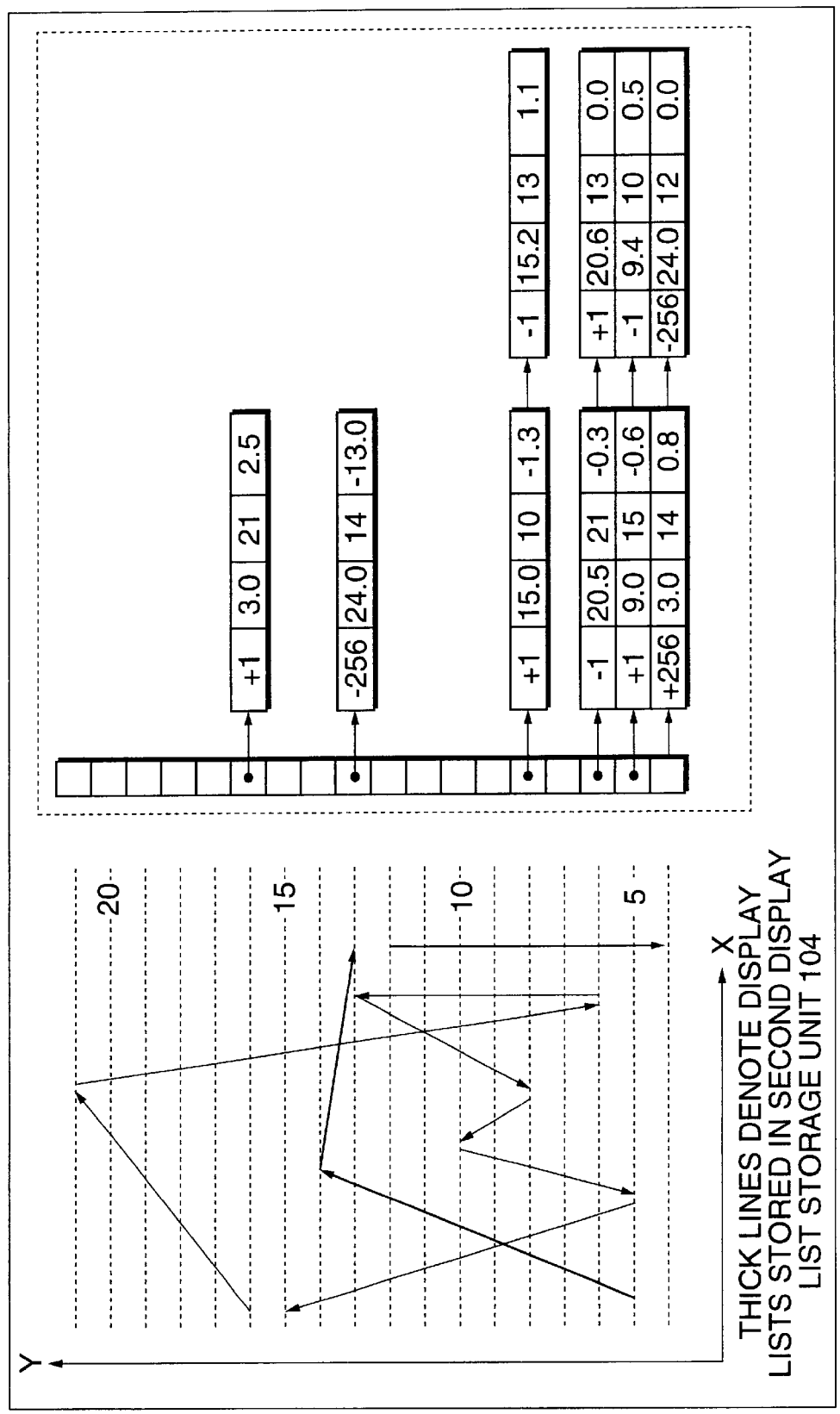
FIG. 21 is a diagram for explaining a display list in which the drawing element and a merged area mixedly exist.
Figure 22:
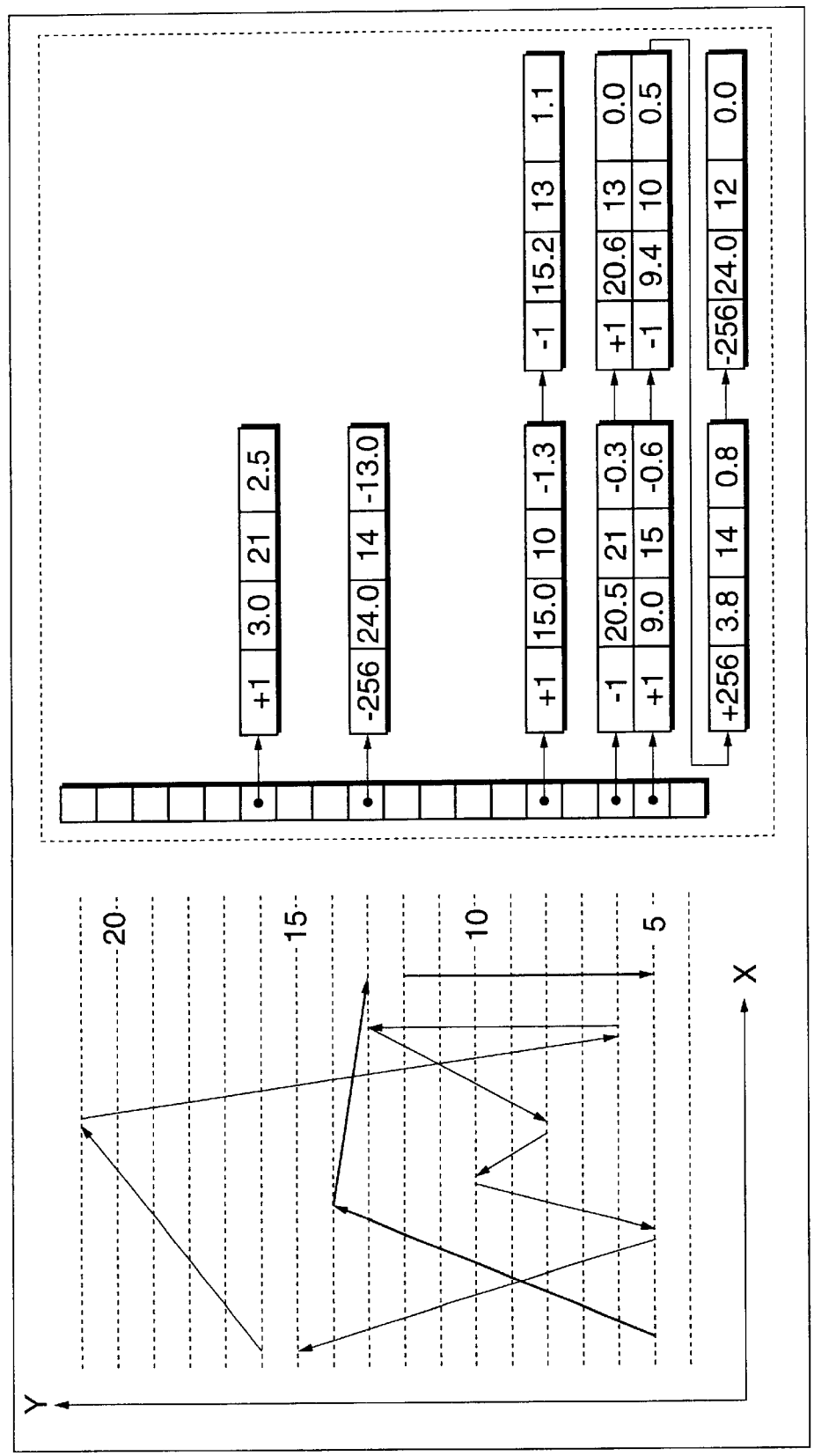
FIG. 22 is a diagram for explaining the clipping in the Y direction of the mixed display list.

When the display list stored in the display list storage unit 5 is taken from the end in accordance with the drawing order and merged with the display list temporarily stored in the second display list storage unit 104 to thereby generate a new display list, due to the necessity of a subsequent process, merging is performed by changing Dir of a vector included in the second display list storage unit 104 to a specific value (for example, ±256). In a manner similar to the case of the clipping process, it is sufficient that the value is at least twice as large as the maximum number of vectors which cross one scan line. When the upper limit is unknown, a large value with an allowance can also be used. In the following, an example of using 256 as the value of Dir will be described on the assumption that 128 or more vectors are not usually in the same scan line. At the time of merging, when the display list temporarily stored in the second display list storage unit 104 is clipped in a range where Y of a display list Y from the display list storage unit 5 exists, the process can be performed at slightly higher speed. FIG. 21 shows an example of the merged display list. FIG. 22 illustrates an example where the display list temporarily stored in the second display list storage unit 104 is clipped within the range where Y of the display list read from the display list storage unit 5 exists, and merged.

The operation of the overlap removal control unit 101 after the merged display list is created is basically the same as that of the clip control unit 81. Since the processing flow is the same as that of the clipping process shown in FIGS. 12 to 15, its description is omitted here. However, the condition of the mode determination in step 14 in FIG. 13 is different. The mode is determined under the condition shown in FIG. 23.

Figure 23:
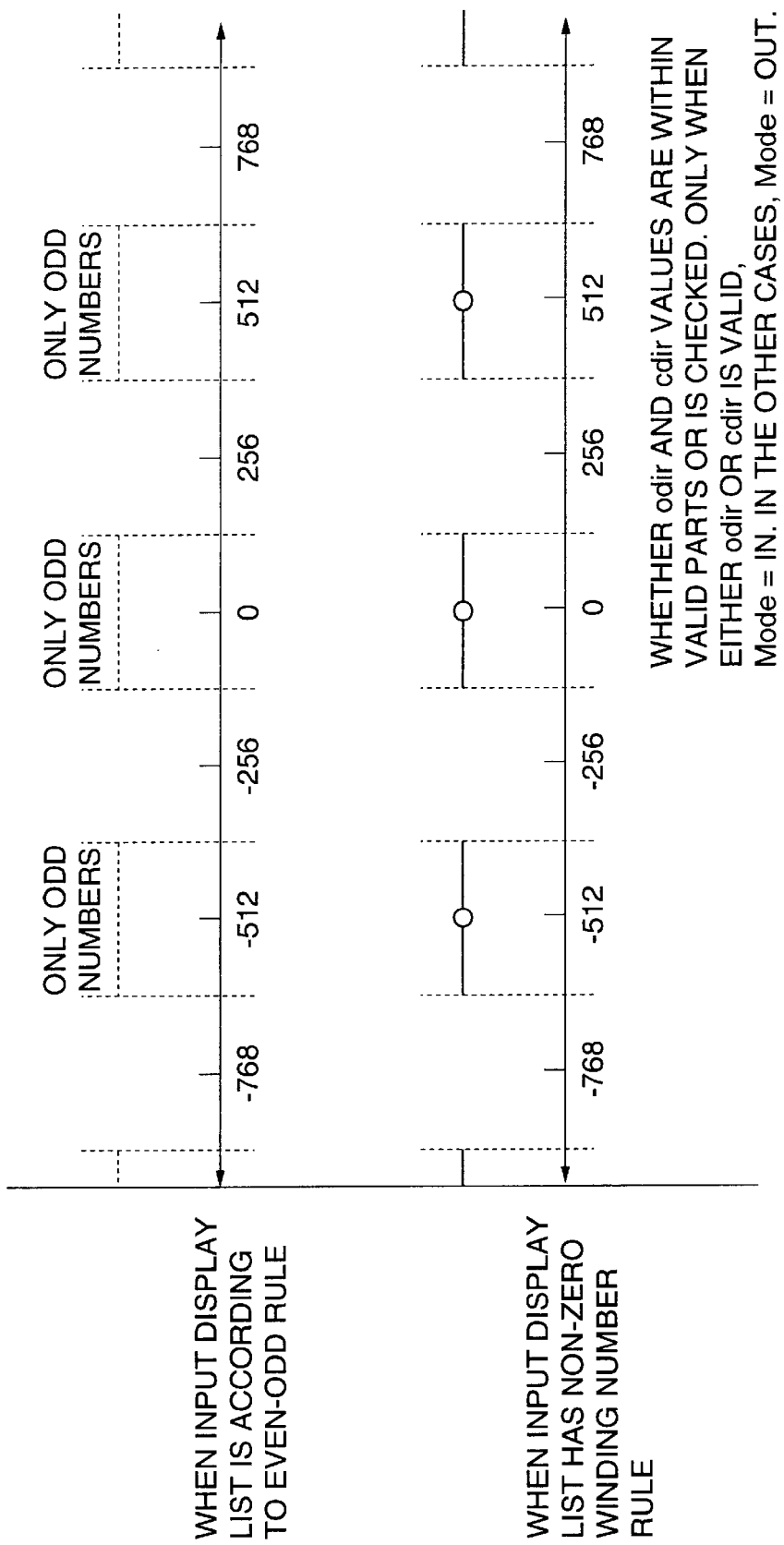
FIG. 23 is a diagram for explaining a mode determination in an overlap removing process in the graphics processing apparatus of the present invention.

Different from the case of the clipping process, in the overlap removing process, only the display list according to the even-odd rule is stored in the second display list storage unit 104 as will be described hereinafter. Consequently, according to the fill rule of the display list inputted, the condition of the upper or lower stage of FIG. 23 is applied to the mode determination.

Figure 14:
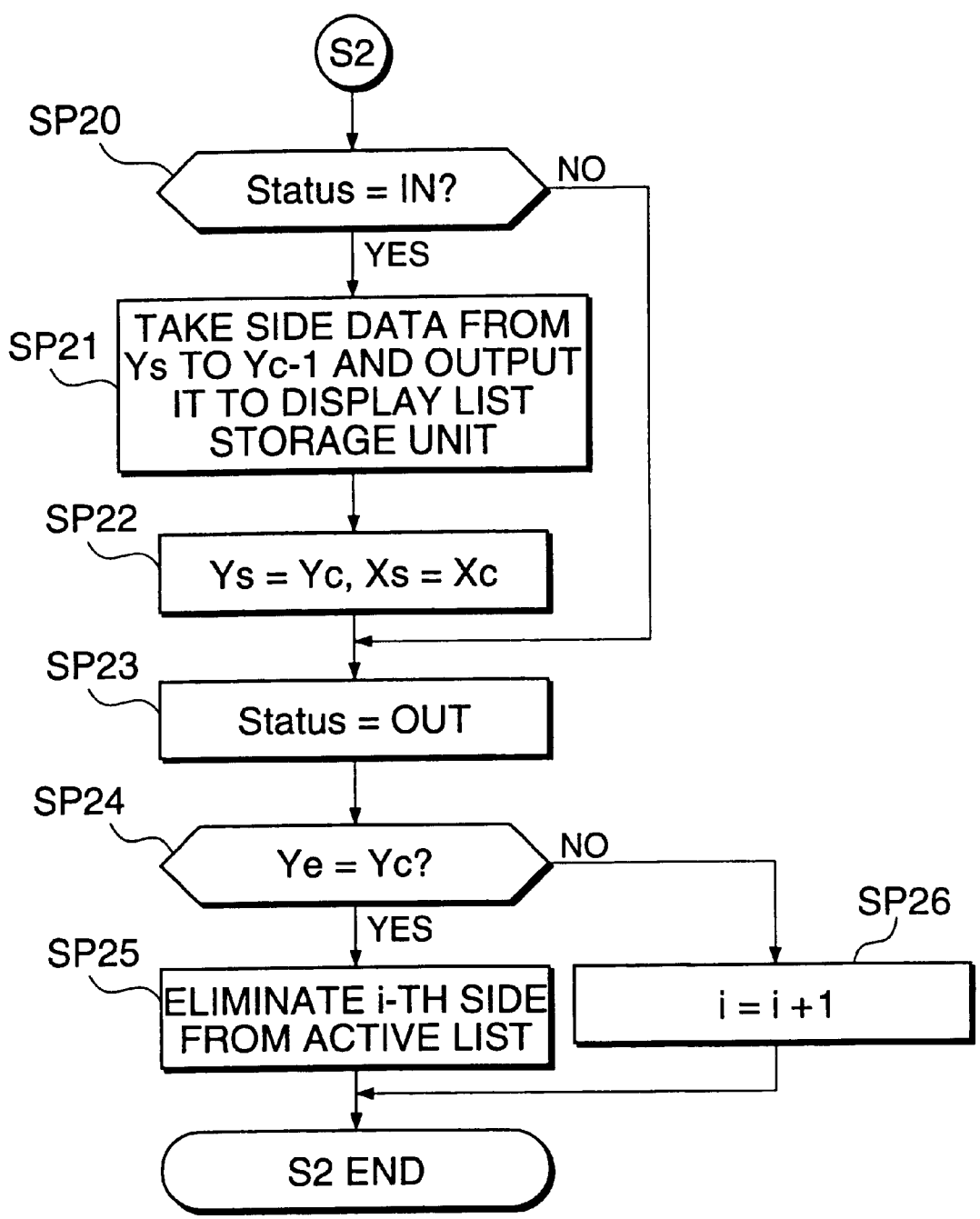
FIG. 14 is a flowchart (No. 3) showing the procedure of the clipping process in the graphics processing apparatus of the present invention.

In the processes corresponding to step 21 in FIG. 14 and step 34 in FIG. 15, the side data taken is outputted to the first display list storage unit 103.

Figure 25:
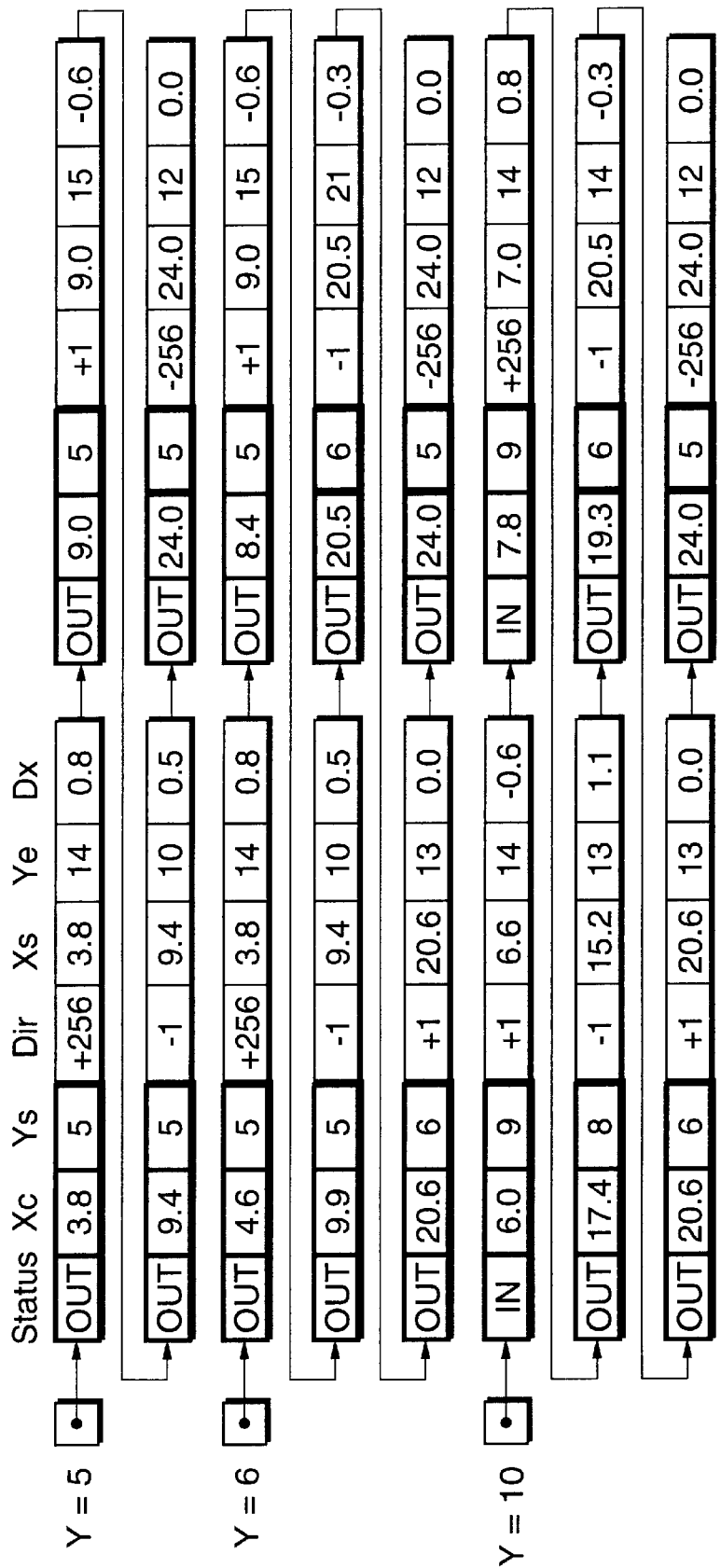
FIG. 25 is a diagram (No. 2) for explaining the active list.
Figure 26:
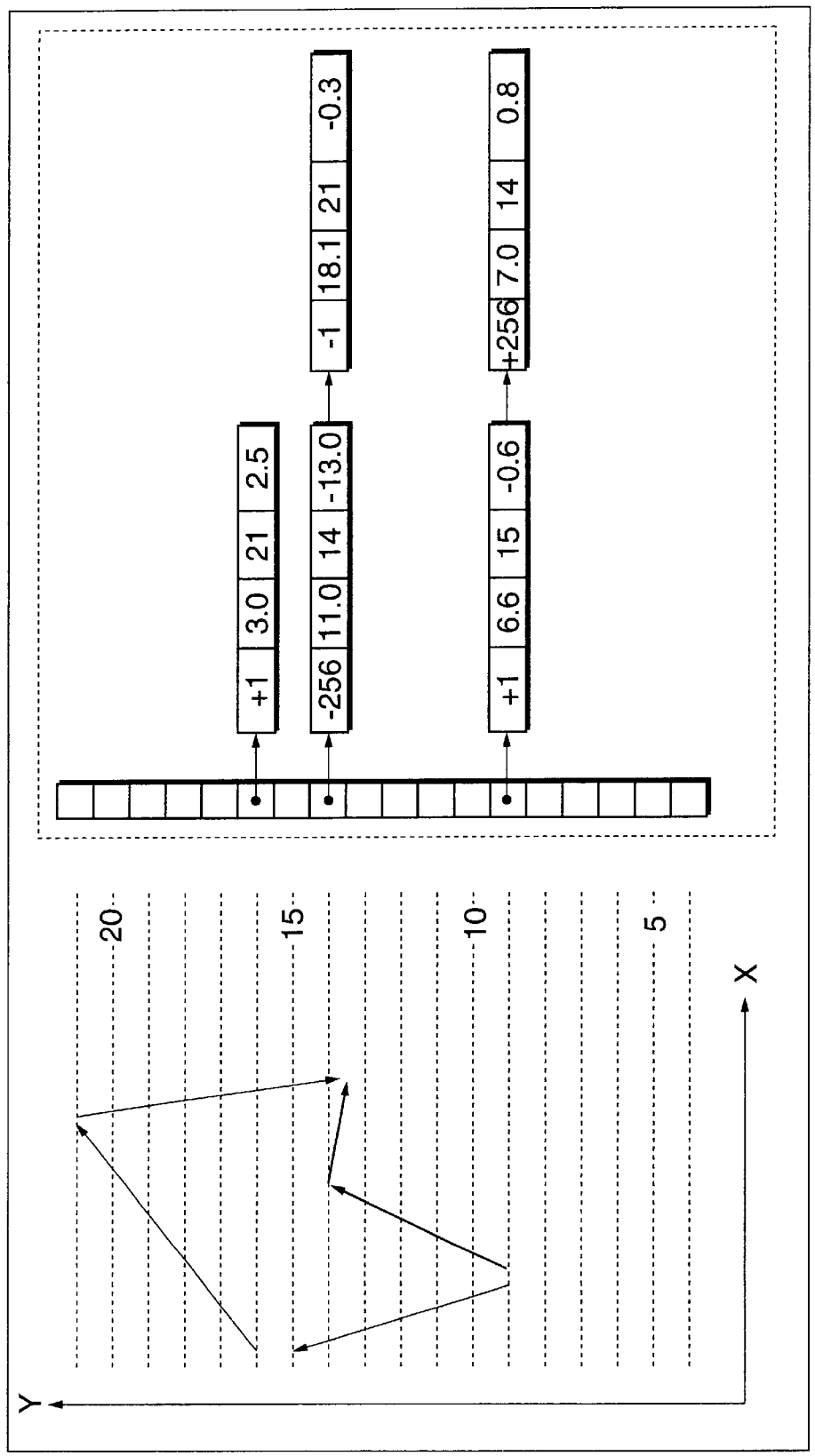
FIG. 26 is a diagram for explaining a display list which has been subject to the overlap removing process in the graphics processing apparatus of the present invention.

When the processes shown in the flowcharts of FIGS. 12 to 15 are performed, the active list is changed as a part of the progress is shown in FIG. 25. As a result, a new display list from which the overlap has been removed as shown in FIG. 26 is stored in the first display list storage unit 103. FIG. 26 illustrates new display lists created in accordance with the flow of FIGS. 12 to 15 by removing the overlaps from the display lists illustrated in FIG. 22. As understood from the comparison between FIGS. 22 and 26, display lists of side data indicated by thin solid lines (for example, constructing the drawing element B) in the area (for example, constructing the drawing element A) surrounded by thick solid lines are eliminated, and new display lists constructed only by display lists related to vectors in the area out of the thick solid lines are generated as shown in FIG. 26.

By the processes according to the flowchart, even if the inputted drawing element is a display list according to the non-zero winding number rule, it is converted to a display list according to the even-odd rule and is outputted.

By the above processes, the removal of the overlaps of the input display lists has been completed. The overlap removal process unit 10 performs a process of generating a merged area display list indicative of a merged area necessary to perform the overlap removing process on the next display list related to a further new drawing element. More specifically, when the drawing element C is newly inputted after the overlap between the drawing element A and the drawing element B is removed in the above process, it is necessary to remove an overlap of the area (of the drawing element A+drawing element B) with the drawing element C. It is therefore necessary to obtain a merged area (=drawing element A+drawing element B) before performing the new overlap removing process. The process will be described hereinbelow.

First, the display list temporarily stored in the second display list storage unit 104 is merged with the inputted display list by the overlap removal control unit 101. At this time, the input display list is not clipped in the range where Y exists.

Figure 24:
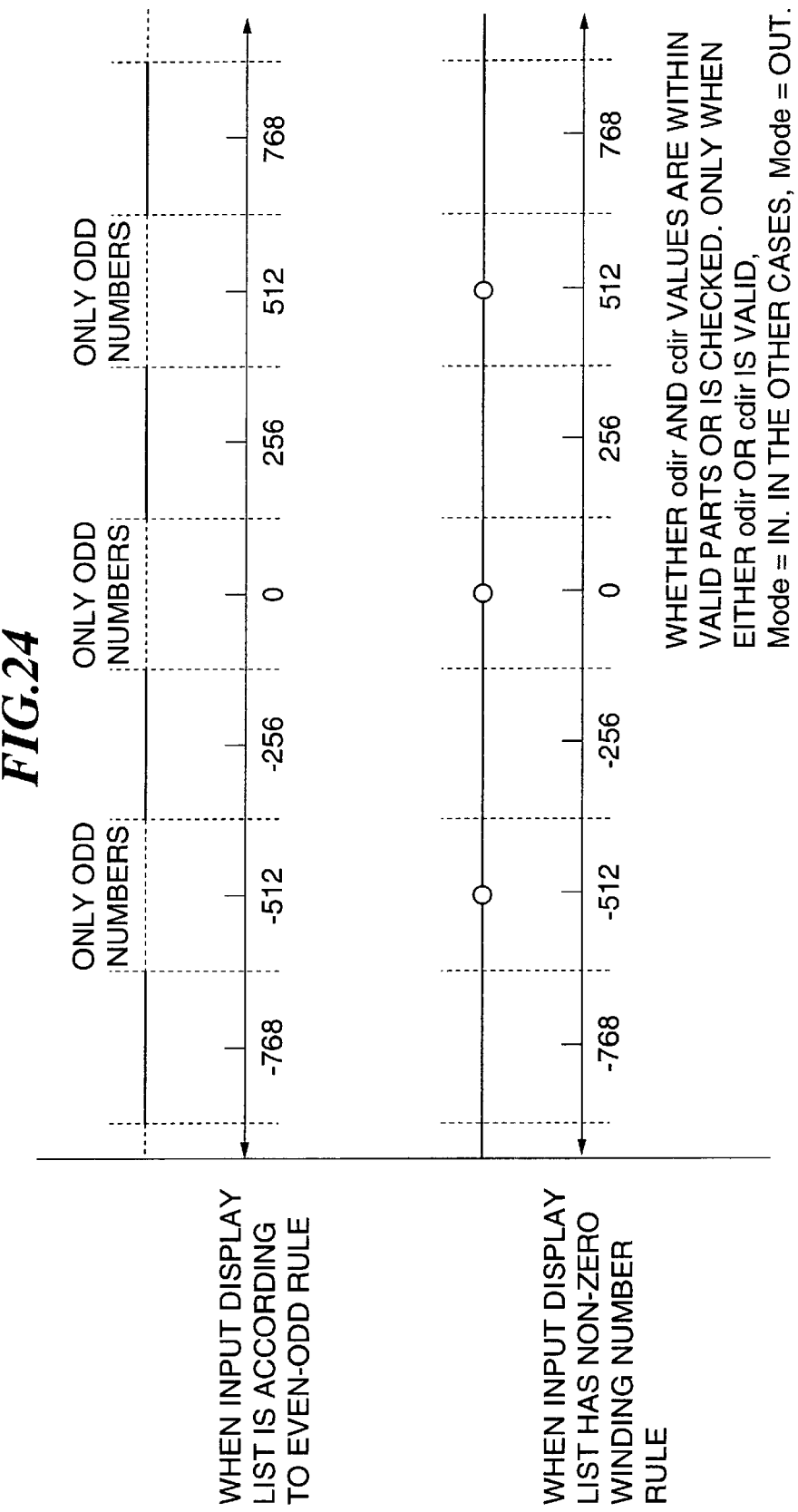
FIG. 24 is a diagram for explaining a mode determination in an overlap removing (merged area generating) process in the graphics processing apparatus of the present invention.

Subsequently, the same process as that described above is performed by the overlap removal control unit 101. The mode determination shown in step 14 in FIG. 13 is, however, performed under the condition shown in FIG. 24 and the destination of the side data in step 21 in FIG. 14 and step 34 in FIG. 15 is changed to the second display list storage unit 104.

Figure 27:
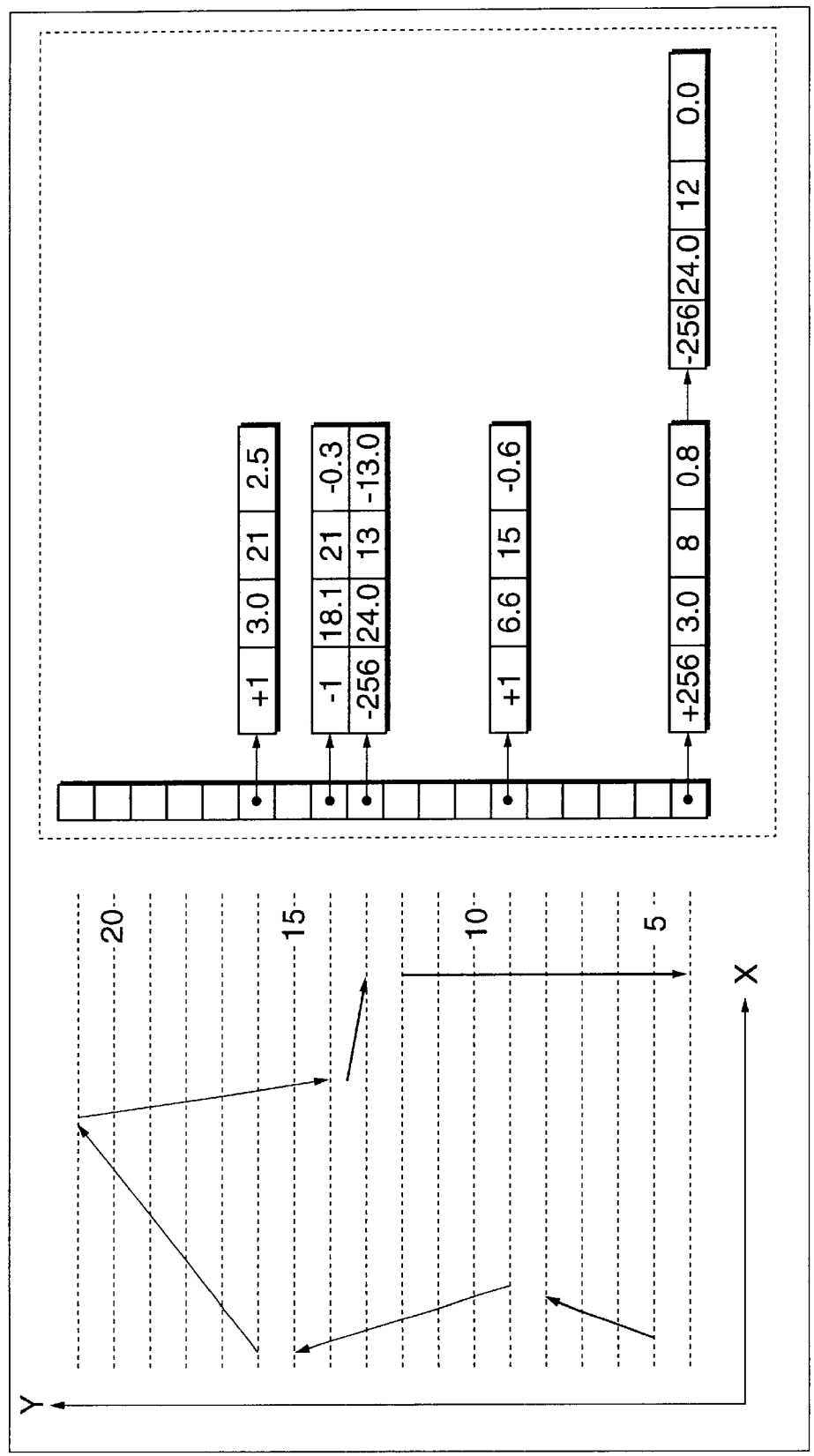
FIG. 27 is a diagram for explaining the display list which has been subject to a merging process in the graphics processing apparatus of the present invention.

As a result, a display list (according to the even-odd rule) shown in FIG. 27 indicative of an area obtained by merging the input display list with the display list originally stored temporarily in the second display list storage unit 104 is generated in the second display list storage unit 104.

The overlap removing process to one drawing element is finished. When a display list drawn in the lower layer is held in the display list storage unit 5, it is inputted to the overlap removal process unit 10 and processes similar to those as described above are repeated. The series of processes are sequentially executed to a new display list taken from the display list storage unit 5, thereby generating a display list from which overlaps of all of drawing elements are removed.

Although the processes in the state where the display list is already stored in the second display list storage unit 104 have been described, when the overlap removal of the last drawing element in the drawing order is performed, naturally, nothing is stored in the second display list storage unit 104. In this case, the input display list is outputted as it is to the first display list storage unit 103 without performing the overlap removing process. The merged area forming process is performed as follows. When the input display list is according to the even-odd rule, it is outputted as it is to the second display list storage unit 104. When the input display list is according to the non-zero winding number rule, the process is performed only by the input display list.

In the process executed to the last drawing element which requires the overlap removing process, the merged area forming process is naturally unnecessary.

Although the overlap removing process is performed to the display lists corresponding to all of drawing elements in the above description for simplicity of explanation, for example, when it can be determined that there is no overlap between the input display list and the merged display list, the process can be simplified by performing only the merged area forming process. When the overlap determination is complicated and, for example, circumscribed rectangular areas of two display lists are compared and there is no overlap, simplified determination in which the overlap removing process is omitted may be performed.

In the embodiment, the overlap removing process is performed on the basis of the determination process result to the display list of each partial area. However, when the purpose of the overlap removing process in the embodiment is to adjust the drawing to the printing speed of the output device 15, the following change can also be considered as a method of shortening the overlap removal processing time.

When it is determined that the overlap removal is necessary, the process is performed in accordance with the drawing order from the last drawing element and the above-mentioned estimation value is updated each time the process of one element is finished. Specifically, the circumscribed rectangular area before the overlap removing process and that after the overlap removing process are obtained. Time corresponding to a reduced amount of the circumscribed rectangular area and height is subtracted from the estimated drawing time which has been obtained in advance. As a result, when the estimated time becomes the threshold value or less, the overlap removing process is stopped at that time point.

When it is clear that the performance of the display list drawing unit 13 is sufficient for the printing speed of the output device 15 even if the overwrite of about N times of the drawing area occurs, it is not necessary to remove the overlaps to attain a single layer. The display lists to be processed are divided into M groups in accordance with the drawing order, the overlap removing process is performed to each group, and the drawing layers are changed to M layers (not a single layer). Since the processing time of the overlap removing process tends to increase at a gradient more than proportional to the increase in the number of target drawing elements, by dividing the display lists into M groups and performing processes to each of the M groups, the processing time can be reduced as a whole.

Another method can also be employed, which subdivides the band to be processed, estimates drawing processing time in the subdivided partial area by the overlap removal determination unit 9, and performs the overlap removing process from, for example, a subdivided area having a large amount of process until the total estimated drawing processing time becomes a threshold or less.

In the case of a graphics processing apparatus capable of dealing with an image, a part of the drawing elements is actually drawn from the lower element and converted into image elements or some partial areas obtained by subdividing the band to be processed are processed and converted into image elements, thereby enabling the drawing processing time of the target band to be reduced to the threshold or less.

The division determination unit 11 will now be described in detail.

Figure 28:
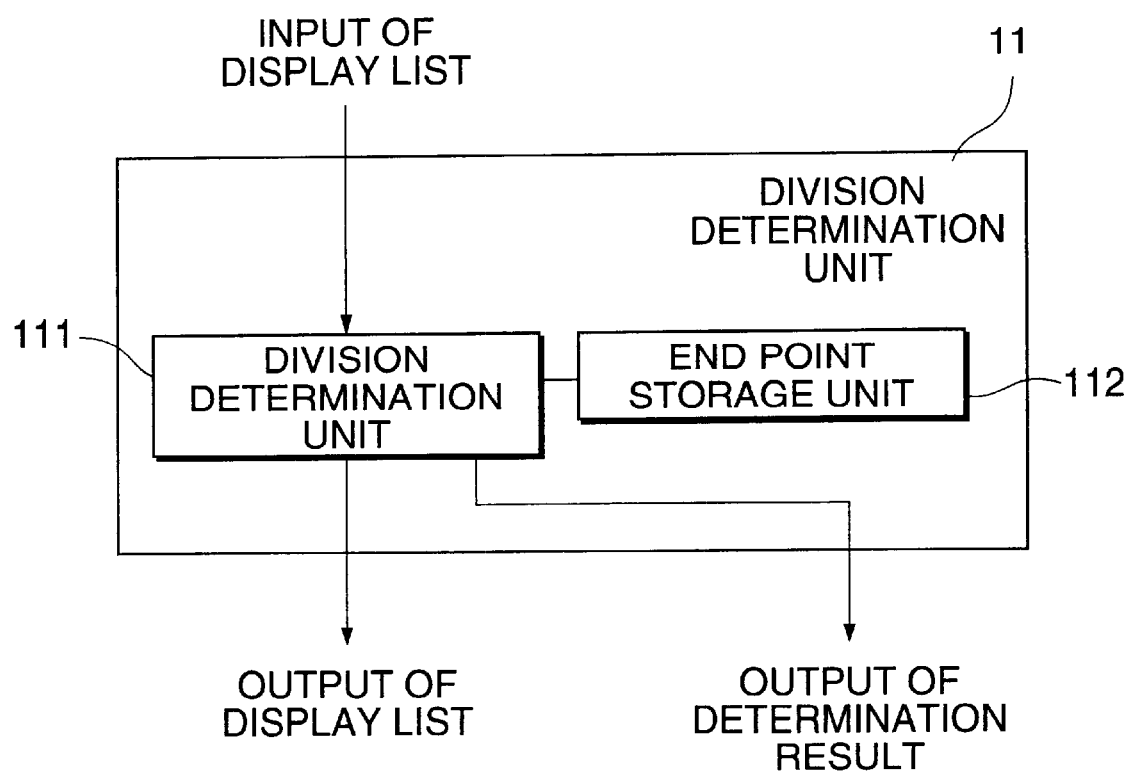
FIG. 28 is a block diagram showing an example of a division determination unit in the graphics processing apparatus of the present invention.

As shown in FIG. 28, the division determination unit 11 has a division determination control unit 111 for controlling the whole division determination and an end point storage unit 112. The operation of the division determination control unit 111 will be described hereinbelow along the flowchart shown in FIG. 29.

First in step 80, a variable (i) is set to 1. In this case, the variable (i) indicates that the side to be processed is the i-th side.

In step 81, the sum of the number of unread sides in the target display list and the number of end points stored in the end point storage unit 112 is checked. When the sum is 2N or smaller, the determination result that division is unnecessary is outputted and the determining process is finished. At the start of the process, the number of end points stored in the end point storage unit 112 is naturally 0.

In step 82, the i-th side information is read from the target display list.

In step 83, the variable Yc is set as the Y coordinate value Ys indicative of the start scan line of the i-th side. As described above, the sides in the display list are stored in ascending order of the start scan lines.

In step 84, all of elements smaller than Yc are deleted from the end point storage unit 112.

In step 85, a Y coordinate value Ye indicative of the end scan line of the i-th side read in step 82 is added to the end point storage unit 112.

In step 86, the number of end points stored in the end point storage unit 112 is checked. When it exceeds 2N, the determination result that the division is necessary is outputted and the determining process is finished. When the number does not exceed 2N, the processing routine advances to step 87.

In step 87, whether unread sides remain in the target display list or not is checked. When no side remains, the determination result that the division is unnecessary is outputted and the determining process is finished. When the unread side remains, the routine advances to step 88.

In step 88, (i) is incremented by one and the control is returned to step 81.

By performing such processes, the determination result such that the division of the display lists to be determined is unnecessary when the number of sides is 2N or smaller in all scan lines and that the division is necessary in the other cases can be obtained. Although it has been described that all of the display lists are checked, when the division is clearly unnecessary such as a case where the total number of sides in the display list is 2N or smaller, the process can be omitted.

The division process unit 12 will now be described.

Figure 30:
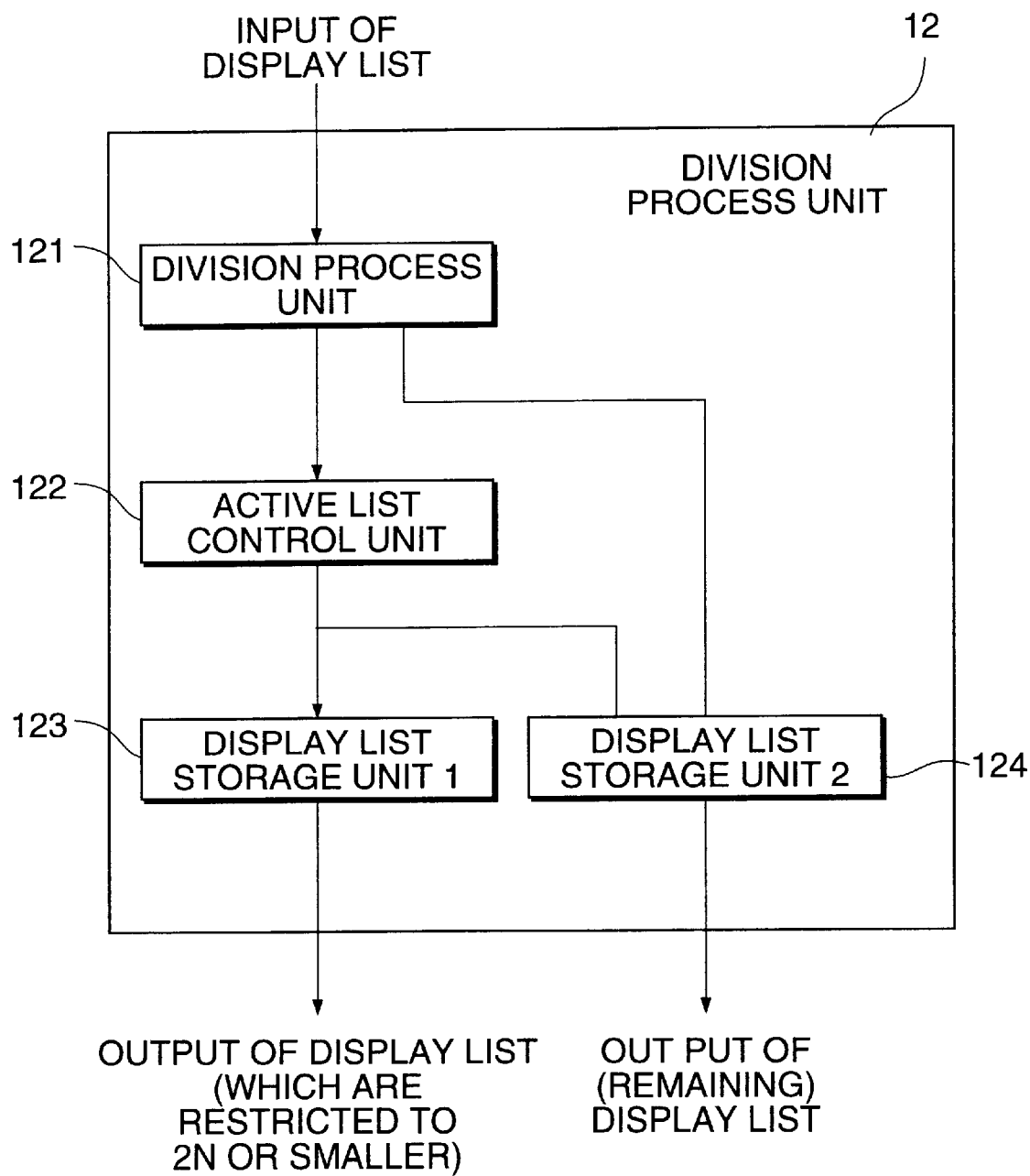
FIG. 30 is a block diagram showing an example of a division processing unit in the graphics processing apparatus of the present invention.

As shown in FIG. 30, the division process unit 12 has a division control unit 121 for controlling the whole dividing process, an active list control unit 122, a first display list storage unit 123 for temporarily storing the display list, and a second display list storage unit 124. The operation of the division control unit 121 in the case of the non-zero winding number rule and that in the case of the even-odd rule will be described along the flowchart.

Figure 12:
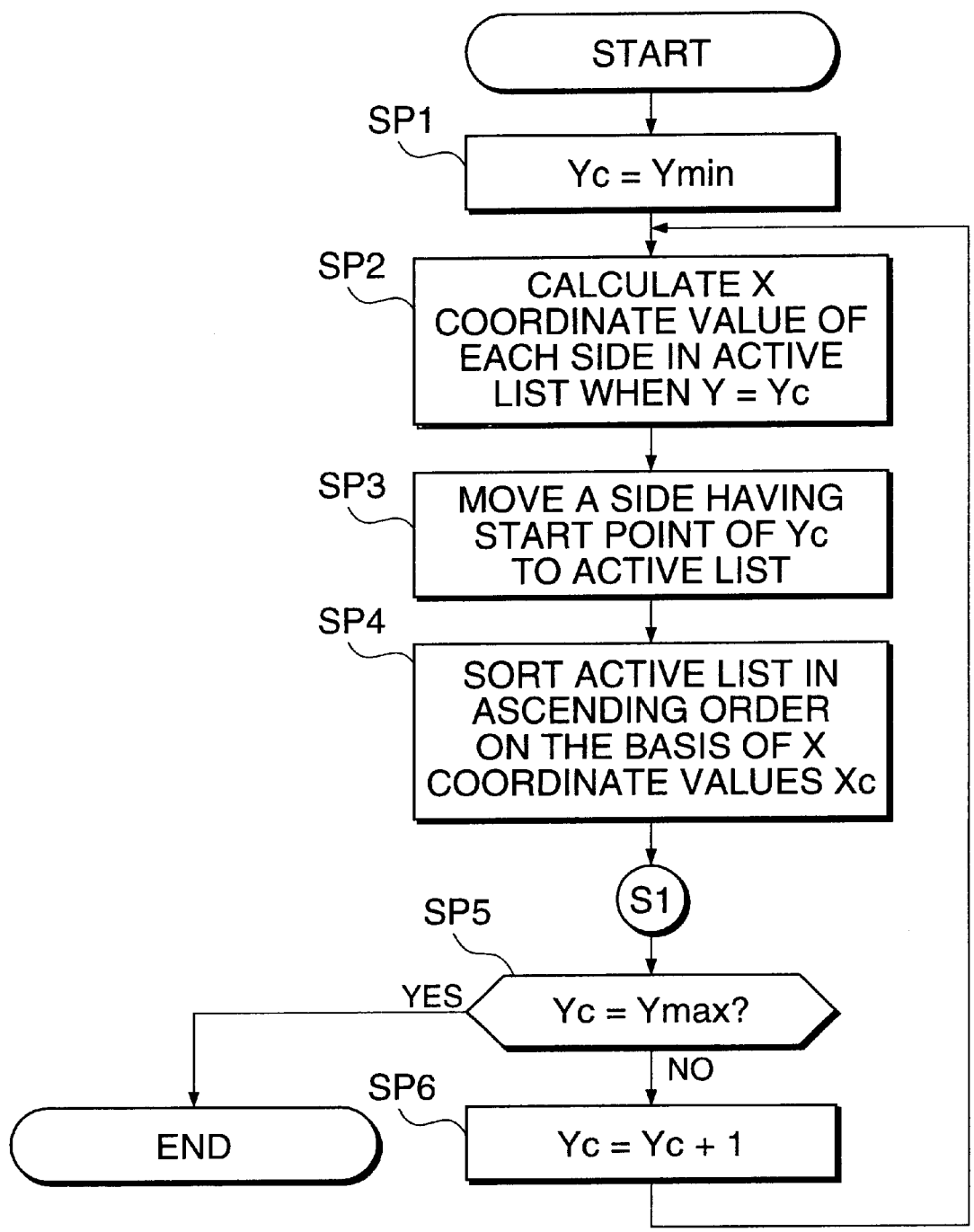
FIG. 12 is a flowchart (No. 1) showing the procedure of the clipping process in the graphics processing apparatus of the present invention.
Figure 31:
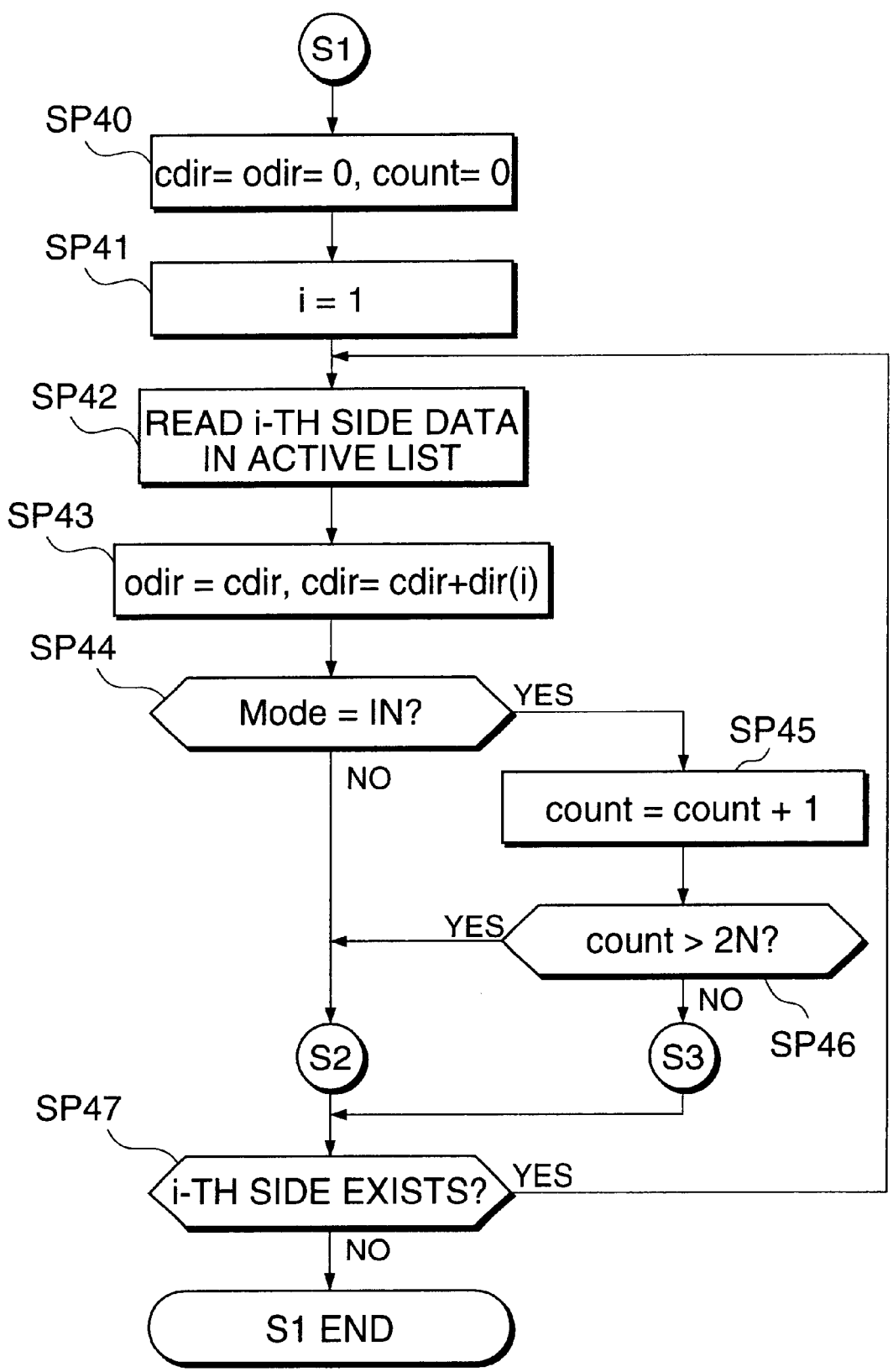
FIG. 31 is a flowchart (No. 1) showing the procedure of a dividing process in the graphics processing apparatus of the present invention.

In the case of the non-zero winding number rule, since the operation of the division control unit 121 with respect to the part of FIG. 12 is the same as that of the clip control unit 81, the description of the part is omitted. A description will be given according to the flow of FIGS. 31 to 33 in place of the flow of FIGS. 13 to 15.

In step 40, each of variables "cdir", "odir", and "count" is set to 0.

In step 41, the variable (i) is set to 1.

In step 42, the i-th side data is read from the active list.

In step 43, by setting odir=cdir, cdir is substituted for odir and the value of dir of the read i-th side data is added to cdir.

In step 44, the mode is determined from the values of odir and cdir. The mode determination is performed according to the rule such that the mode is IN when only either odir or cdir is 0 and the mode is OUT in the other cases. In the case where Mode=IN, the routine advances to step 45. In the case where Mode=OUT, the control is moved to S2.

In step 45, the value of the variable "count" is incremented by one.

In step 46, whether the value of the variable "count" is larger than 2N or not is checked. When the value is larger than 2N, the control is shifted to S2. When the value is equal to or smaller than 2N, the control is shifted to S3.

Figure 32:
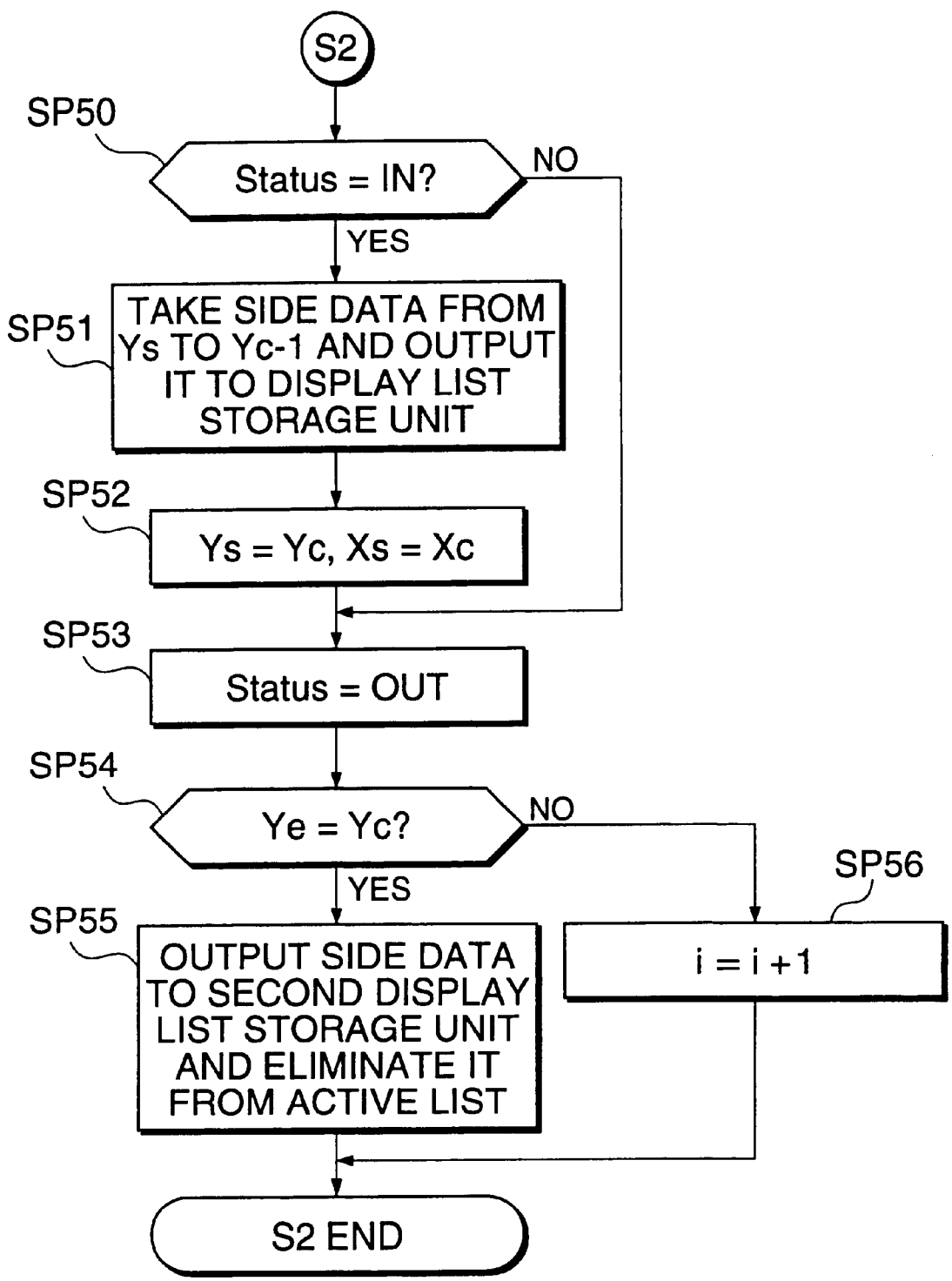
FIG. 32 is a flowchart (No. 2) showing the procedure of the dividing process in the graphics processing apparatus of the present invention.

When the control is shifted to S2, in step 50 shown in FIG. 32, status information Status of the i-th side is read. When the status information Status is IN, the routine advances to step 51. In the other cases (OUT, INIT), the routine advances to step 53.

In step 51, the part of Y=Ys to Yc−1 from the i-th side data is outputted to the first display list storage unit 123.

In step 52, in order to delete the part outputted in step 51, the i-th side data in the active list is changed to Ys=Yc and Xs=Xc.

In step 53, Status of the i-th side data is changed to OUT.

In step 54, a check is made to see whether Ye in the i-th side data is equal to Yc or not. When YES, the side is outputted to the second display list storage unit 124 and deleted from the active list in step 55. When NO, (i) is incremented by one in step 56. Then S2 is finished and the program shifts to step 47 in FIG. 31.

Figure 33:
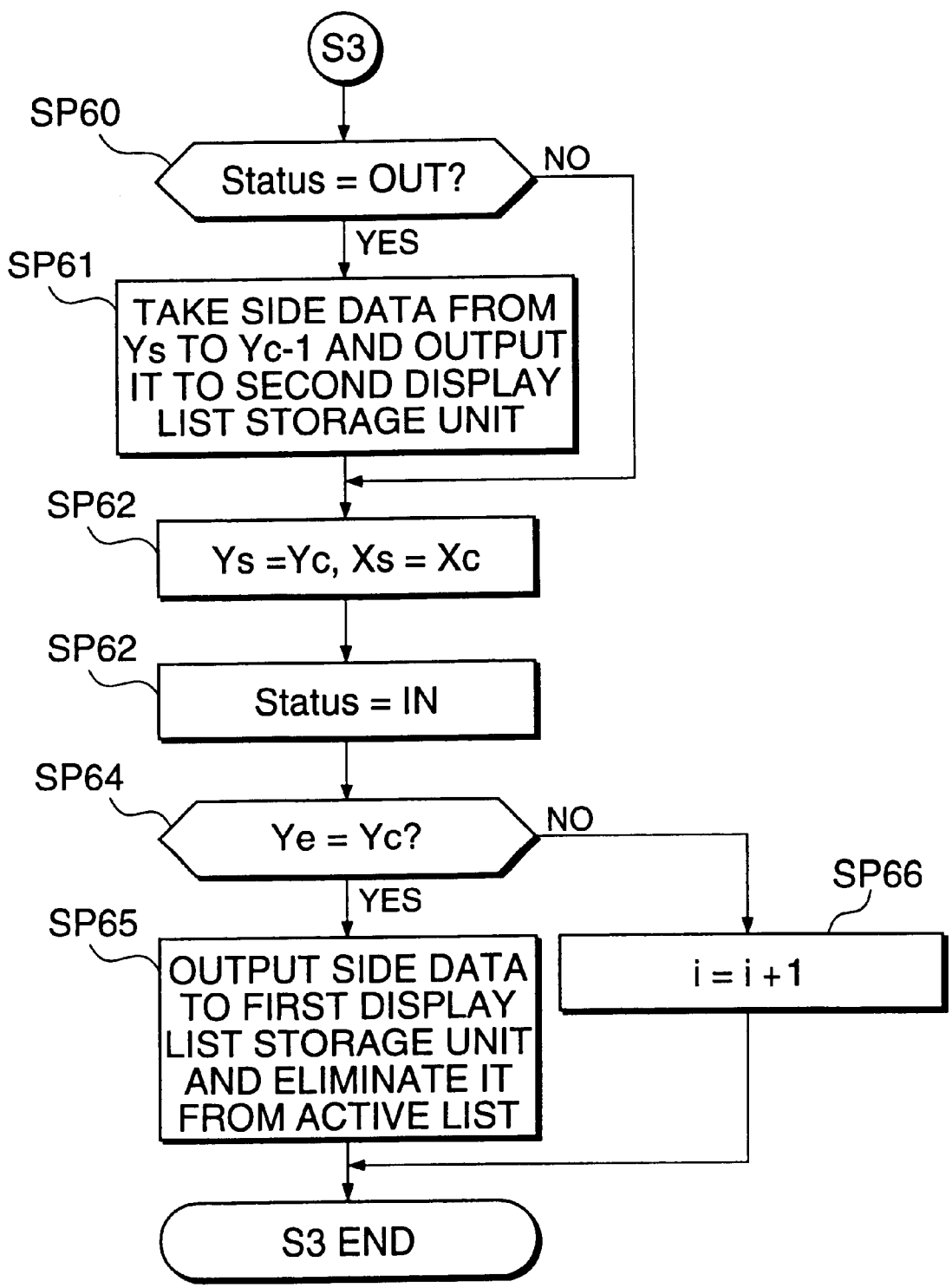
FIG. 33 is a flowchart (No. 3) showing the procedure of the dividing process in the graphics processing apparatus of the present invention.

When the check to see whether "count" is smaller than 2N in step 46 is NO and the control is shifted to S3, the routine advances to step 60 shown in FIG. 33 where the status information Status of the i-th side is read. When Status is OUT, the routine advances to step 61. In the other cases (IN, INIT), the routine advances to step 63.

In step 61, the part of Y=Ys to Yc−1 from the i-th side data is outputted to the second display list storage unit 124.

In step 62, in order to delete the part outputted in step 61, the i-th side data in the active list is changed to Ys=Yc and Xs=Xc.

In step 63, Status of the i-th side data is changed to IN.

In step 64, a check is made to see whether Ye in the i-th side data is equal to Yc or not. When YES, the side is outputted to the first display list storage unit 124 and deleted from the active list in step 65. When NO, (i) is incremented by one in step 66. Then S3 is finished and the routine shifts to step 47 shown in FIG. 31.

In step 47, a check is made to see whether the i-th side exists in the active list or not. When YES, the routine is returned to step 42. When NO, the routine S1 is finished and the program is moved to step 5.

The case of the even-odd rule will now be described. In the case of the even-odd rule, since the operation of the division control unit 121 is the same as that of the non-zero winding number rule with respect to the parts of FIGS. 12, 32, and 33, the description is omitted here. The operation is according to the flow of FIG. 34 in place of that of FIG. 31. A description will be given with reference to FIG. 34.

Figure 34:
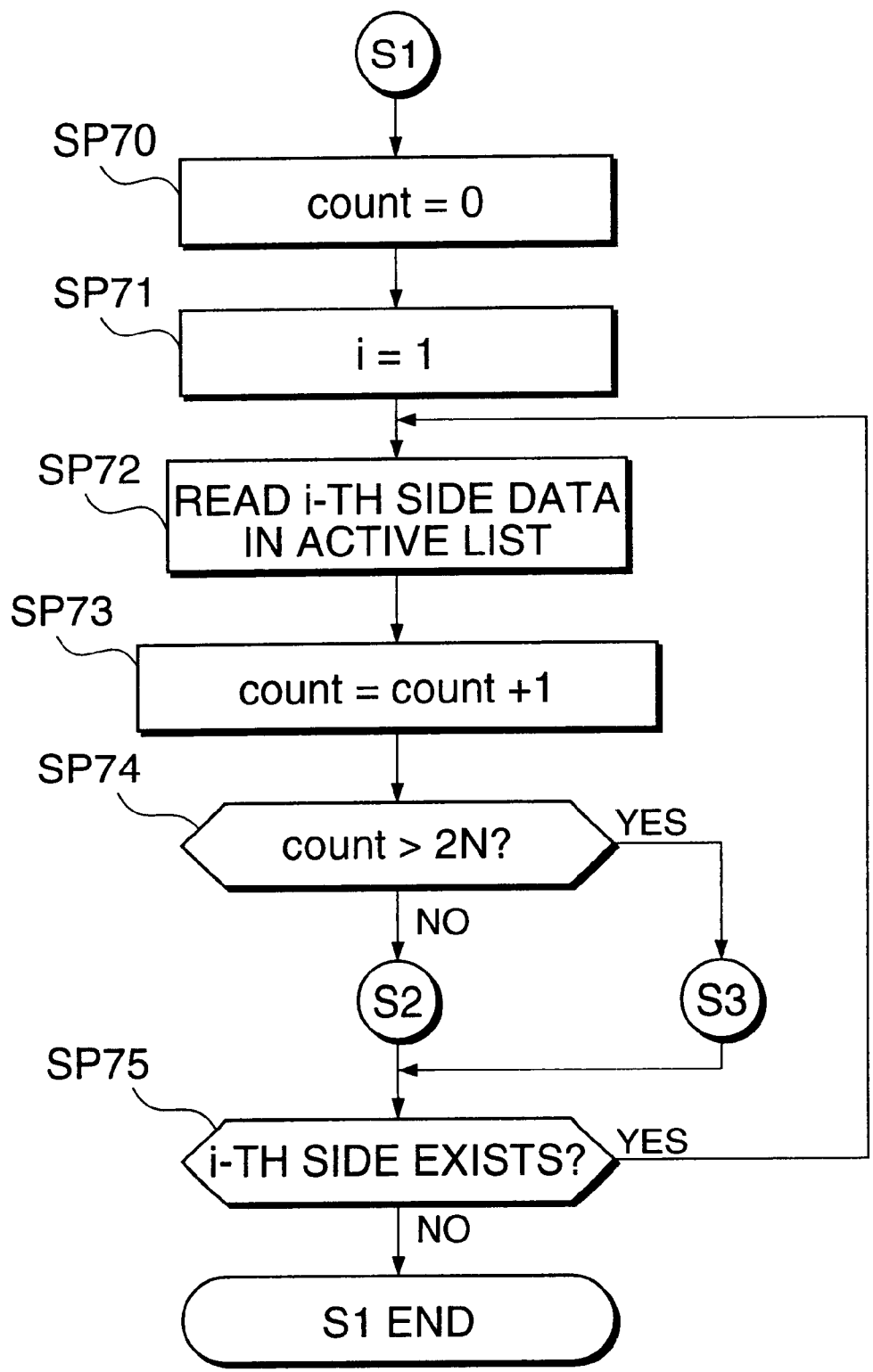
FIG. 34 is a flowchart (No. 4) showing the procedure of the dividing process in the graphics processing apparatus of the present invention.

In step 70 in FIG. 34, the variable "count" is set to 0.

In step 71, the variable (i) is set to 1.

In step 72, the i-th side data is read from the active list.

In step 73, the value of the variable "count" is incremented by one.

In step 74, whether the value of the variable "count" is larger than 2N or not is checked. When YES, the control is shifted to S2. When the value is equal to or smaller than 2N, the control is shifted to S3.

In S2 and S3, the processes same as those in the case of the non-zero winding number rule are performed according to the flow shown in FIGS. 32 and 33 and then the control is returned to step 75 in FIG. 34. In step 75, whether the i-th side exists in the active list or not is checked. When YES, the routine is returned to step 72. When NO, S1 is finished and the routine is shifted to step 5 in FIG. 12.

Figure 35:
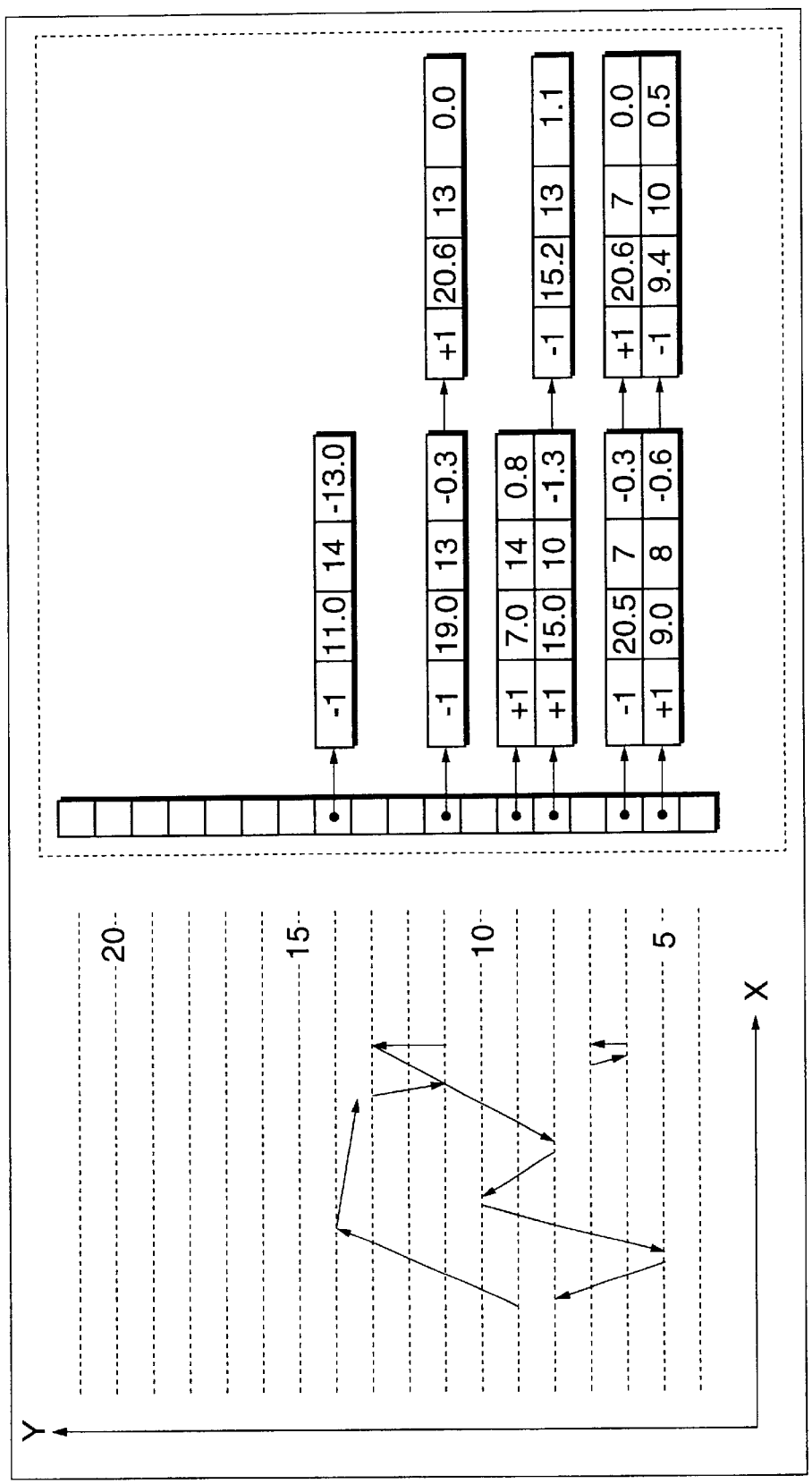
FIG. 35 is a diagram for explaining a display list outputted after the dividing process in the graphics processing apparatus of the present invention.
Figure 36:
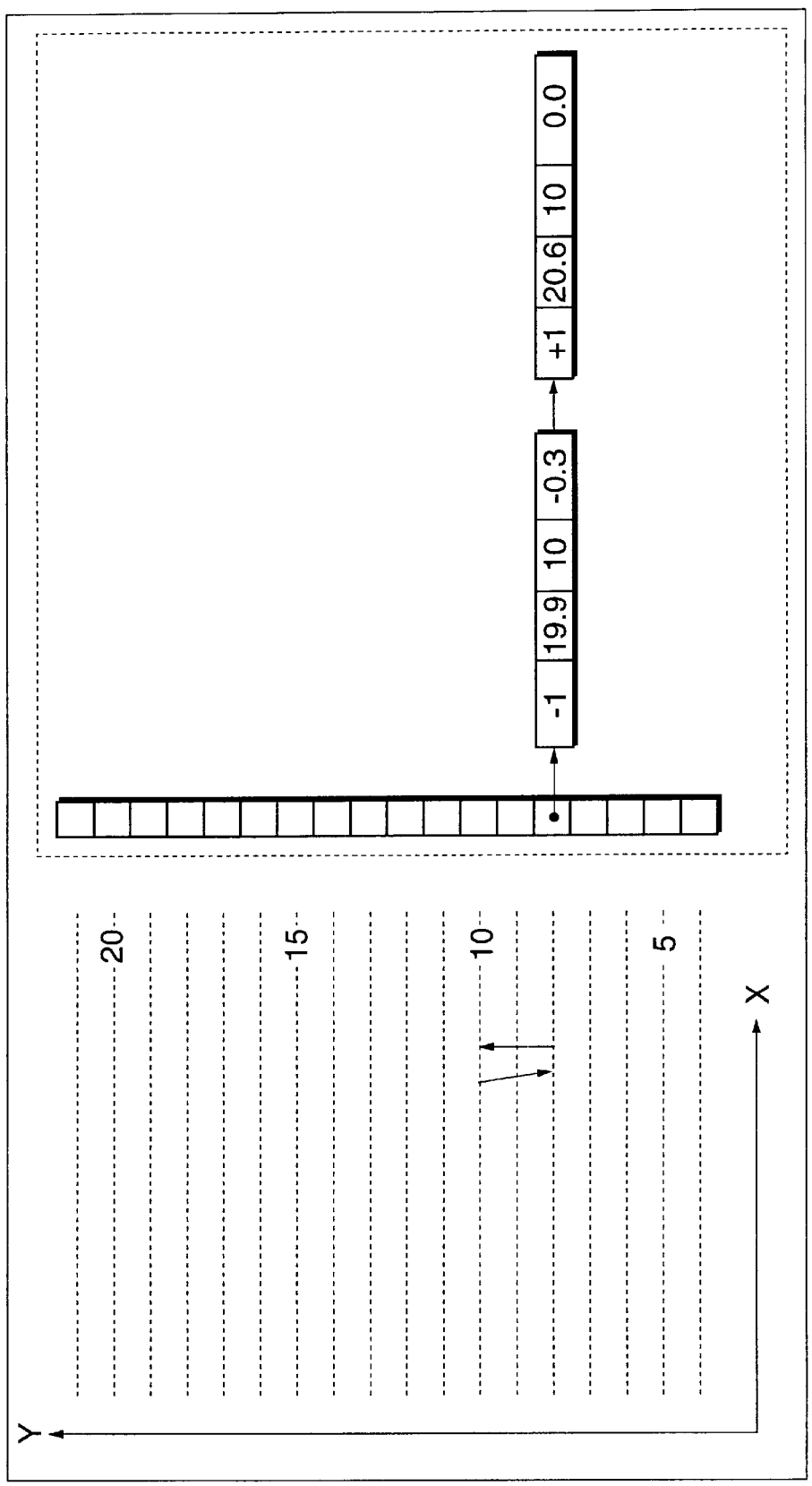
FIG. 36 is a diagram for explaining a display list which is left after the dividing process in the graphics processing apparatus of the present invention.

When the above processes described by using the flowchart are performed, the display lists shown in FIG. 35 are stored in the first display list storage unit 123 and the display lists shown in FIG. 36 are stored in the second display list storage unit 124. FIGS. 35 and 36 relate to an example when the display lists of FIG. 18 are divided by N=2. When the display lists of FIGS. 35 and 36 are synthesized, the display lists of FIG. 18 are obtained. As a result of the processes according to the flowchart, even when the input is a display list of the non-zero winding number rule, it is converted and outputted as a display list of the even-odd rule.

Since the non-zero winding number rule is converted to the even-odd rule, even when it is determined that the division is necessary, there is a case such that the result of the dividing process is stored only in the first display list storage unit 123. Although the display lists of 2N or less are stored in the first display list storage unit 123, there is the possibility that the number of the display lists stored in the second display list storage unit 124 is larger than 2N. Consequently, when a display list is outputted from the second display list storage unit 124, the display list has to be returned to the division determination unit 11 and the checking and dividing operations have to be repeated.

Some changes may be considered in the flows of the clipping process, overlap removing process and dividing process which have been described above. For example, it has been described in the flow of FIG. 12 that Xc is updated and sorted for each of Ymin to Ymax. Since the Status value of the side data in the active list is changed only when the side is added, eliminated, or crossed, a method of preliminarily obtaining the Y coordinate value at which the addition, elimination, or intersection occurs and processing only the scan line can also be employed.

As another method, all of sorting operations can be omitted. Specifically, in the case of moving the side data from the display list to the active list, the intersection with all of side data already registered in the active list is checked. When there is an intersection, the side is divided with respect to the intersection. The first half of the divided side data is registered in the active list and the latter half of the data is returned to the display list. Further, in the event of registering the first half, the data is inserted so as to be in ascending order of Xc. In such a manner, since it is guaranteed that the side data in the active list is always arranged in ascending order, the sorting becomes unnecessary. Since the intersection is checked only with sides registered in the active list, the number of targets is not so large. It is obvious that there is no intersection between two sides in the case such that Xc1<Xc2 and Dx1<Dx2. Consequently, by deleting them, the process can be performed at higher speed.

As obviously understood from FIGS. 11, 20, and 30 and their description, the operation of the active list control unit and that of the display list storage unit in the diagrams are common. It is therefore unnecessary that the units are independently provided. Since the merging process performed by the overlap removal control unit 101 in FIG. 20 and the division control unit 121 in FIG. 30 is the same as that of the merge process unit 7, they can be commonly used. Since the processes of the clip control unit 81, overlap removal control unit 101, and division control unit 121 are substantially the same except for the mode determining condition, the units can be commonly used while setting different parts as parameters.

The operation of the display list drawing unit 13 will now be described in detail.

The graphics which are requested to be drawn are changed by the above-mentioned processes to data in the mixed data display list format or data in the data display list format having only drawing elements in which the number of sides which cross each scan line is restricted to 2N or smaller. The data is inputted together with drawing color data and the like to the display list drawing unit 13. The display list drawing unit 13 draws a polygon on the memory unit 14 on the basis of the input.

The operation of the display list drawing unit 13 will now be described hereinbelow with reference to the flowchart of FIG. 37 in the case of the even-odd rule and using only the drawing elements as an example. After that, the other cases will be described.

First in step 90, the variable Yc indicative of the scan line to be processed is set to the minimum value Ymin of the Y coordinate in the display list.

In step 91, the X coordinate value of an intersection between the current scan line and each side is calculated and Xc is updated by using the DDA 131. The X coordinate value Xc of the intersection of each side can be obtained by {Xc+Dx} by using the previous Xc. If no side is set in the DDA 131, no operation is performed here.

In step 92, when there is a side having Yc as a start point in the inputted display list, the side is set in an available DDA. The DDA has the X coordinate Xc of the intersection with the current scan line, Y coordinate Ye of the end point of the side, change amount Dx in X coordinate with respect to an increase in Y coordinate by one, and direction flag Dir. The data is substituted for the DDA 131 in such a manner that Xc=Xs, Ye=Ye, Dx=Dx, and Dir=Dir.

In step 93, all of Xc values are outputted from the DDA 131 in which sides are set to the sorting unit 132. The sorting unit 132 sorts the Xc values in ascending order and outputs the resultant to the memory drawing unit 133.

In step 94, the sorted X coordinate values are paired from the head by the memory drawing unit 133 and the area in the memory unit 14 corresponding to a horizontal line segment between the values of the two of the pair is filled. Although Xc is outputted as a decimal, the coordinate to be drawn on the memory unit 14 has to be an integer, so that an actual filling operation is performed by using a coordinate value obtained by rounding Xc down or up, rounding off Xc to the nearest integer, or the like. The color of fill is a color designated by the drawing color data in the case of the text or graphics. In the case of an image, a pixel value to be drawn in the coordinate position is read and used.

In step 95, any side ending at Y=Yc is deleted from the DDA 131.

In step 96, Yc is incremented only by one. In step 97, whether or not the Yc value is larger than the maximum value Ymax of the Y coordinate within the range where the target display list exists is checked. When YES, the process is finished. When NO, the routine is returned to step 91 and the process of Y=Yc is continued.

Figure 38:
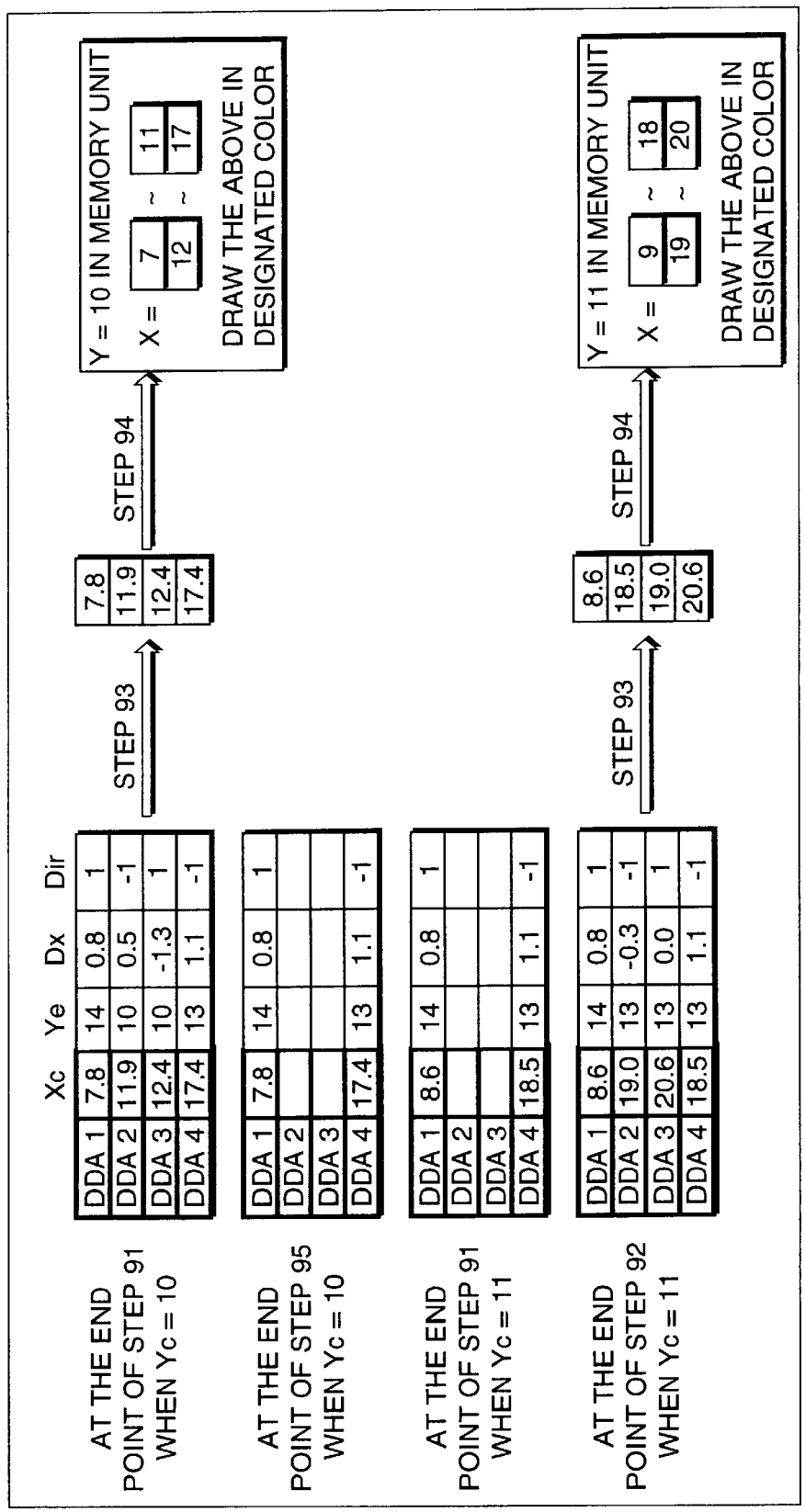
FIG. 38 is a diagram for explaining the display list drawing process in the graphics processing apparatus of the present invention.

FIG. 38 is a diagram for explaining the operation from Yc=10 to Yc=11 when the display lists in FIG. 35 are processed according to the flow. As shown in FIG. 38, intersections of each side with the scan line are obtained by the DDA 131 and sorted and the area between a pair of values is filled. In the example, N=2 and processes are executed by 2N DDAS, that is, four DDAs 1 to 4.

The process of FIG. 38 will be described in association with the processing flow of FIG. 37. The process is progressed from the upper left side in FIG. 38. Four (2N) DDAs 1 to 4 execute calculation of the X coordinate values for four display lists with respect to Yc=10 (corresponding to step 91 in FIG. 37). Further, the DDAs 1 to 4 sort the calculated X coordinate values (step 93) and execute the drawing process (step 94). In the case of the example shown in FIG. 38, the side which ends at Y=10 is determined as a side which ends at the current processing point Y=10 and each of display lists processed by the DDAs 2 and 3 has data of Ye=10. The display lists are consequently deleted from the DDAs. Further, the control is moved to the next line Y=11 and similar processes are executed. By executing the processes from Ymin to Ymax by four (=2N) DDAs 1 to 4, a polygon expressed by the inputted display lists is efficiently drawn on the memory unit 14.

Since each of the drawing element and the clip element has two fill rules of even-odd rule and nonzero winding number rule, when the rules are combined, the display list drawing unit 13 has to correspond to the following six cases.

Figure 37:
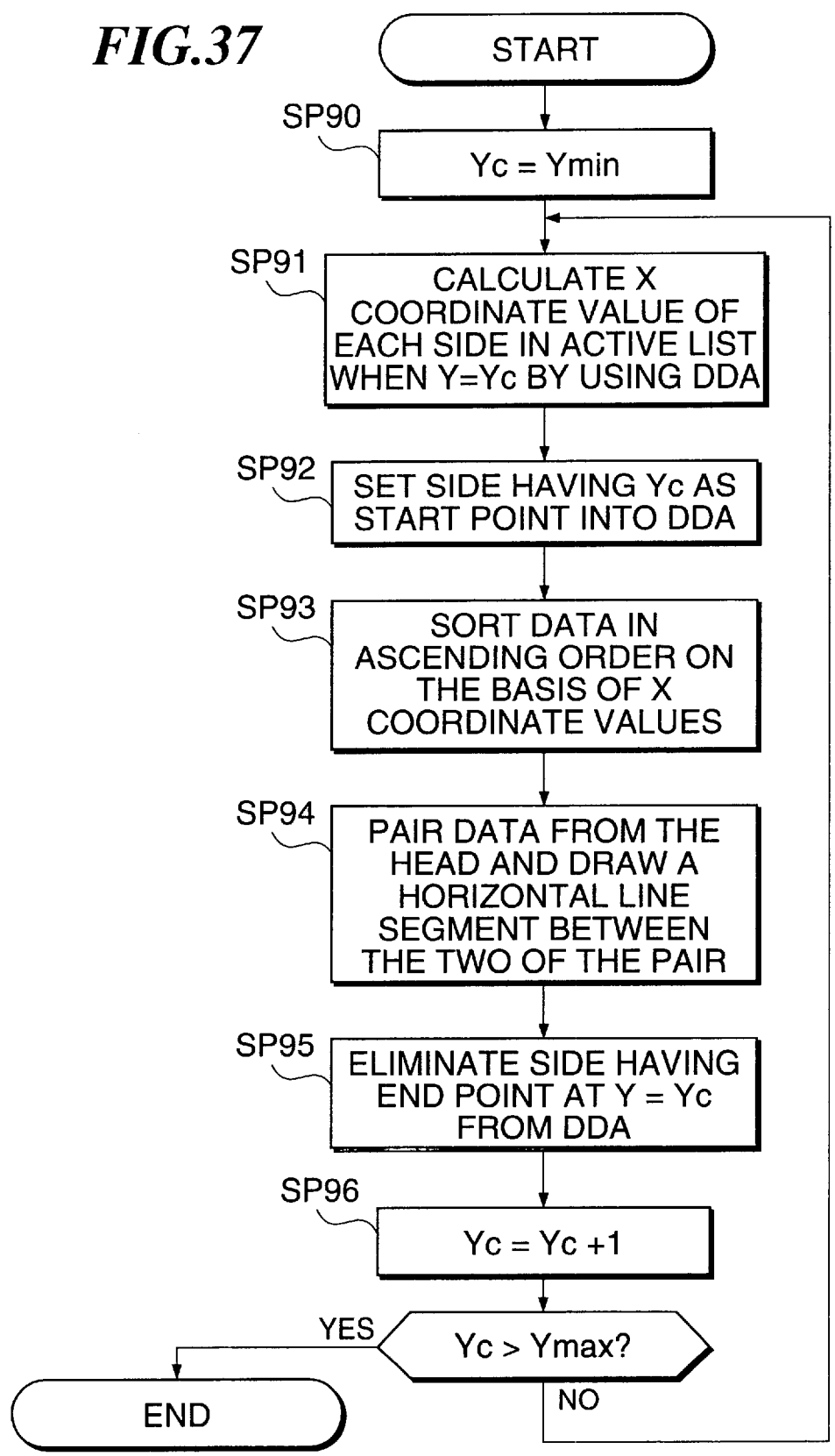
FIG. 37 is a flowchart showing the procedure of a display list drawing process in the graphics processing apparatus of the present invention.

1. only drawing element of the even-odd rule
2. only drawing element of the non-zero winding number rule
3. both of the drawing element and the clip element are according to the even-odd rule
4. the drawing element is according to the even-odd rule and the clip element is according to the non-zero winding number rule 5. the drawing element is according to the non-zero winding number rule and the clip element is according to the even-odd rule
6. both of the drawing element and the clip element are according to the non-zero winding number rule In the case of 2, in step 94 shown in FIG. 37, in stead of pairing the sorted X coordinate value data from the head, the flow is changed in such a manner that a variable for integrating Dir of sides is provided, a side whose value is not zero and a side whose value is zero are paired, and an area between Xc is drawn.

In the cases of 3 to 6, the flow is changed so that the variable for integrating Dir of the sides is provided, sides which are paired under the condition shown in FIG. 17 are determined, and the area between Xc is drawn.

In order to simplify the explanation, it has been described on assumption that the value of Dir is ±1 or ±256. When there is a merit of reducing the number of bits such as a case where the display list drawing unit 13 is constructed by hardware, by using a flag of one bit indicative of the clip element, the determination condition producing the same result as that of FIG. 17 can be made.

Figure 39:
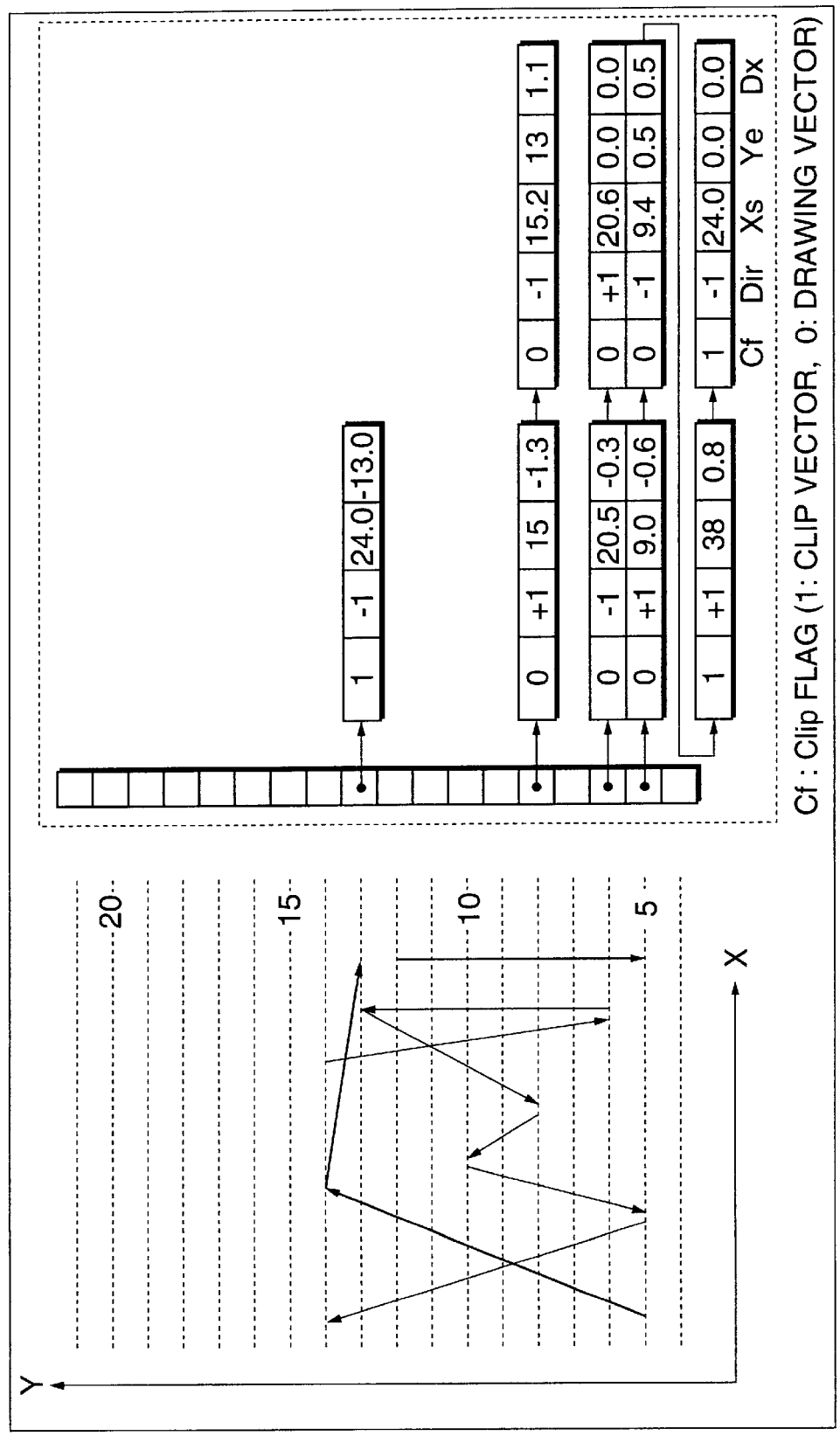
FIG. 39 is a diagram for explaining a modification of the display list.

For example, display lists using flags indicative of the drawing element and the clip element can be used as shown in FIG. 39. Cf=1 denotes that the side is of the clip element. Cf=0 denotes that the side is of the drawing element. In this case as well, whether the state of each side changes or not is checked with respect to an increase in Y coordinate and the drawing element can be taken. Obviously, the overlap removal can be similarly performed.

Figure 40:
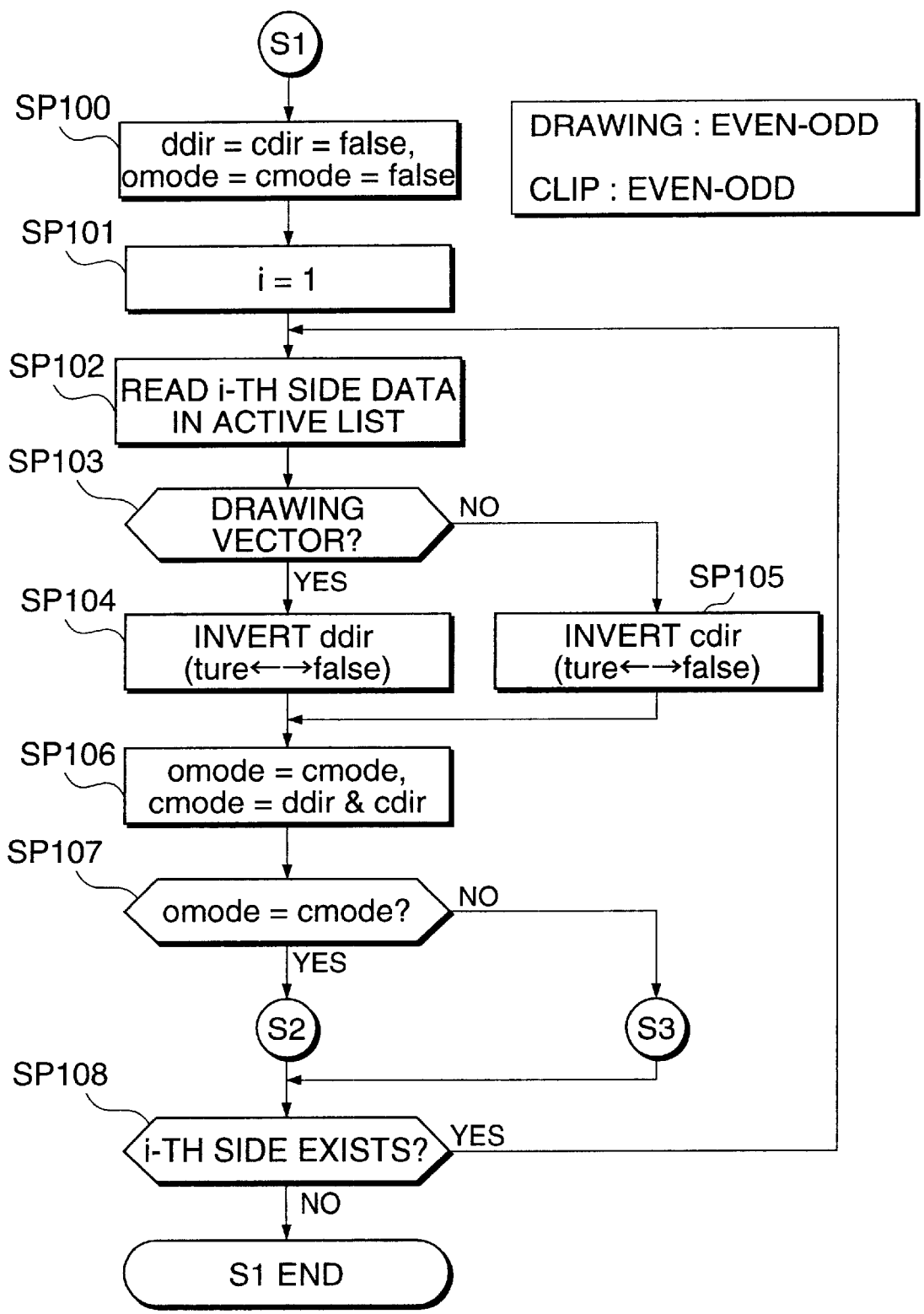
FIG. 40 is a flowchart for explaining a clipping process and an overlap removing process in the modification.

FIG. 40 shows an example of the process S1 (process corresponding to FIG. 13) in the case of using such flags. In the example, both of the drawing and clipping operations are performed according to the even-odd rule. In the drawing, ddir denotes a value of the even-odd rule of the drawing process. When it is true, the subsequent drawing operation is valid. cdir is a value of the even-odd rule of the clipping process. When it is true, the subsequently clipping operation is valid. The flow of FIG. 40 will be described briefly hereinbelow. [step 100]: Initialize as ddir=cdir=false. Similarly, initialize as omode=cmode=false. cmode indicates whether the drawing of the current side (i) is valid or invalid in consideration of clipping (on the right side of the side). omode indicates whether the drawing of the immediately preceding side (i−1) is valid or invalid in consideration of clipping (on the right side of the immediately preceding side, that is, the left side of the current side). Whether the drawing in consideration of the clipping is valid or not is determined by the AND of ddir and cdir. [step 101]: initialize the number (i) of a side to 1. [step 102]: read the i-th side data in the active list. [step 1031]: determine whether the read side data is of the drawing vector or not on the basis of the clip flag Cf. In the case of the drawing vector, the routine advances to step 104. In the case of the clip vector, the routine advances to step 105. [step 1041]: invert ddir. [step 1051]: invert cdir. [step 106]: substitute current cmode for omode and create new cmode from the AND of ddir and cdir. [step 107]: compare cmode with omode. When they coincide with each other, the routine advances to S2 (FIG. 14). When they do not coincide with each other, the routine advances to S3 (FIG. 15). [step 108]: repeat the process of step 102 and subsequent processes until there is no side in the active list.

Figure 41:
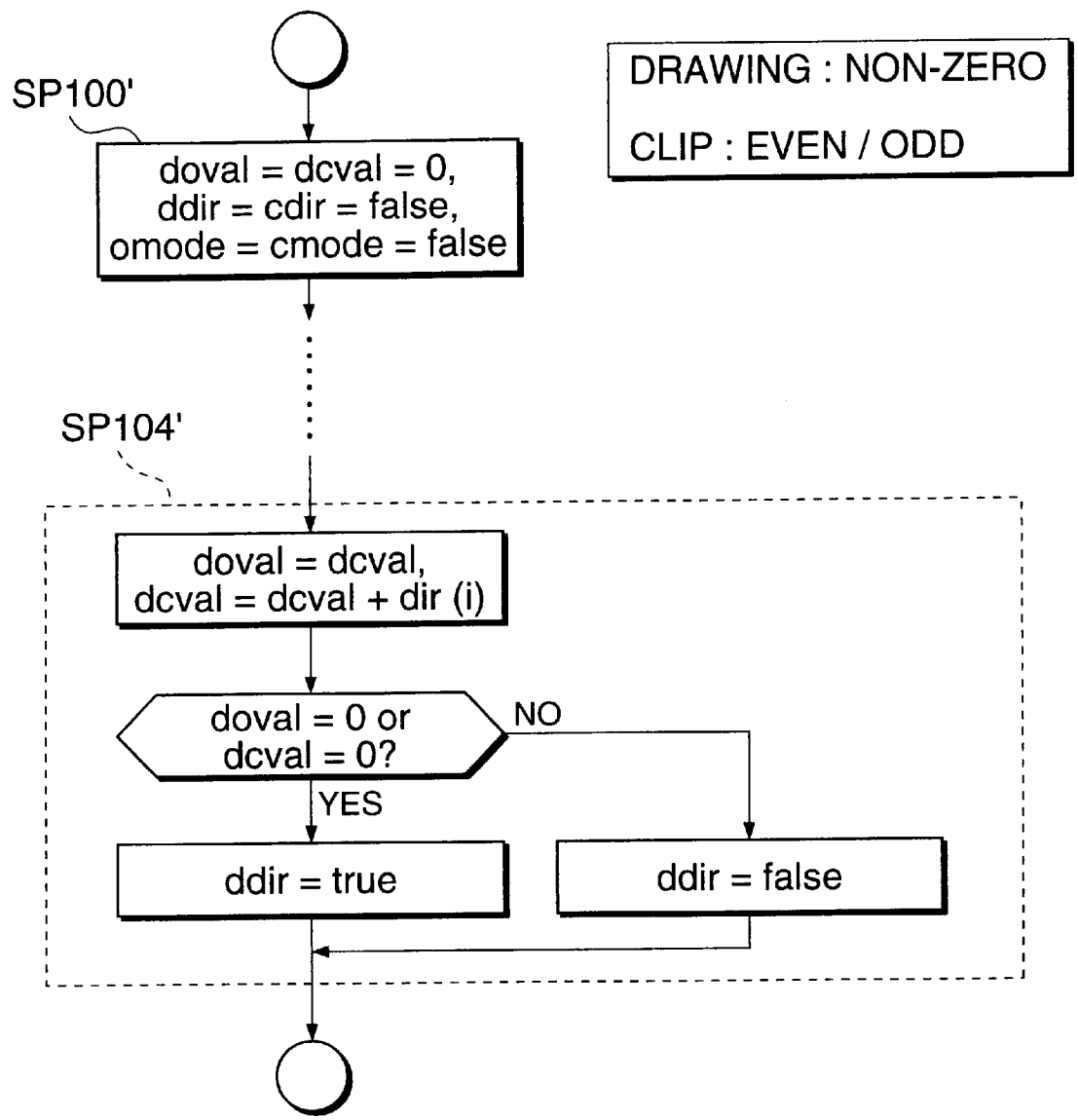
FIG. 41 is a flowchart for explaining the clipping process and the overlap removing process in another modification.
Figure 42:
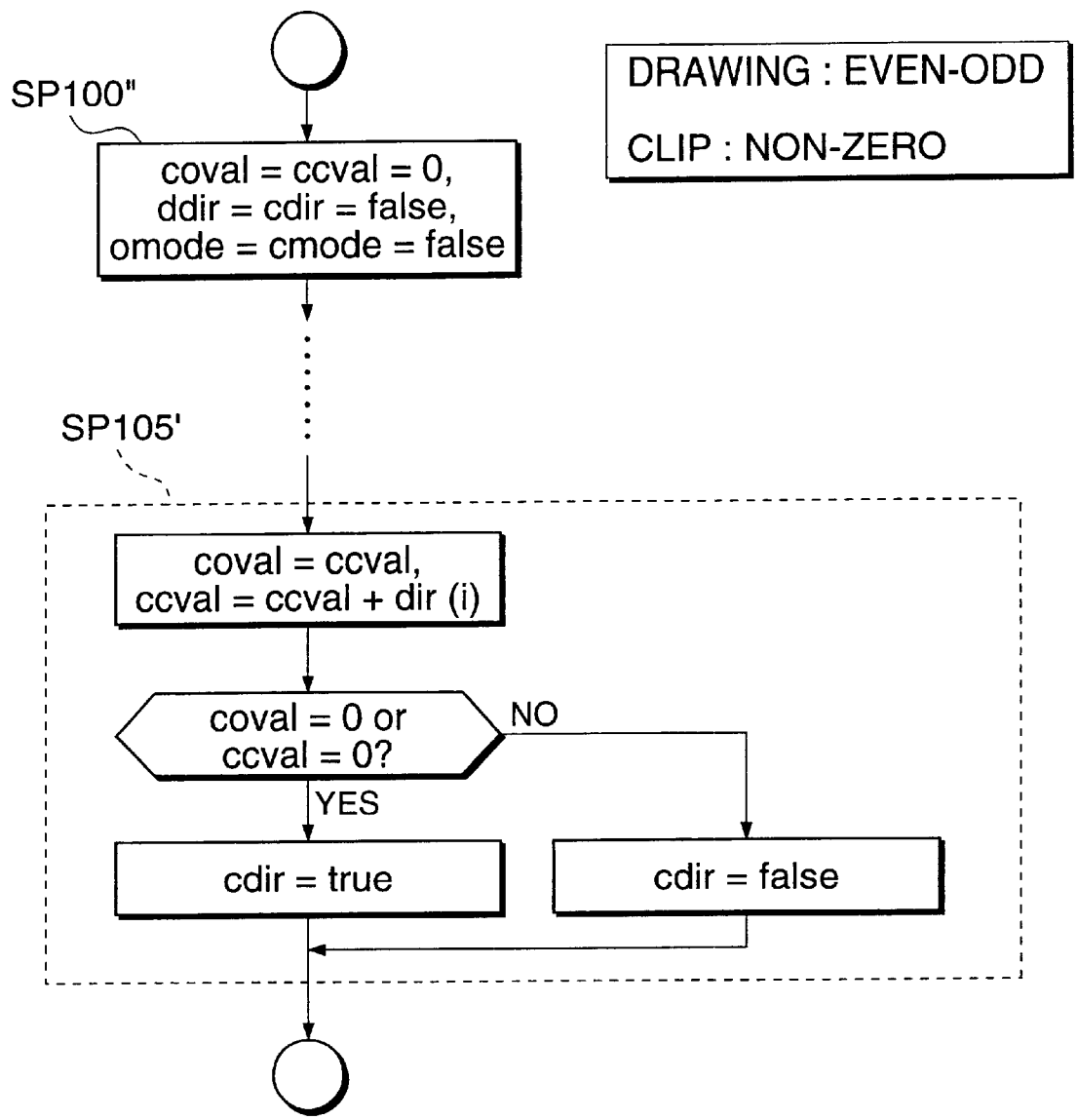
FIG. 42 is a flowchart for explaining the clipping process and the overlap removing process in further another modification.
Figure 43:
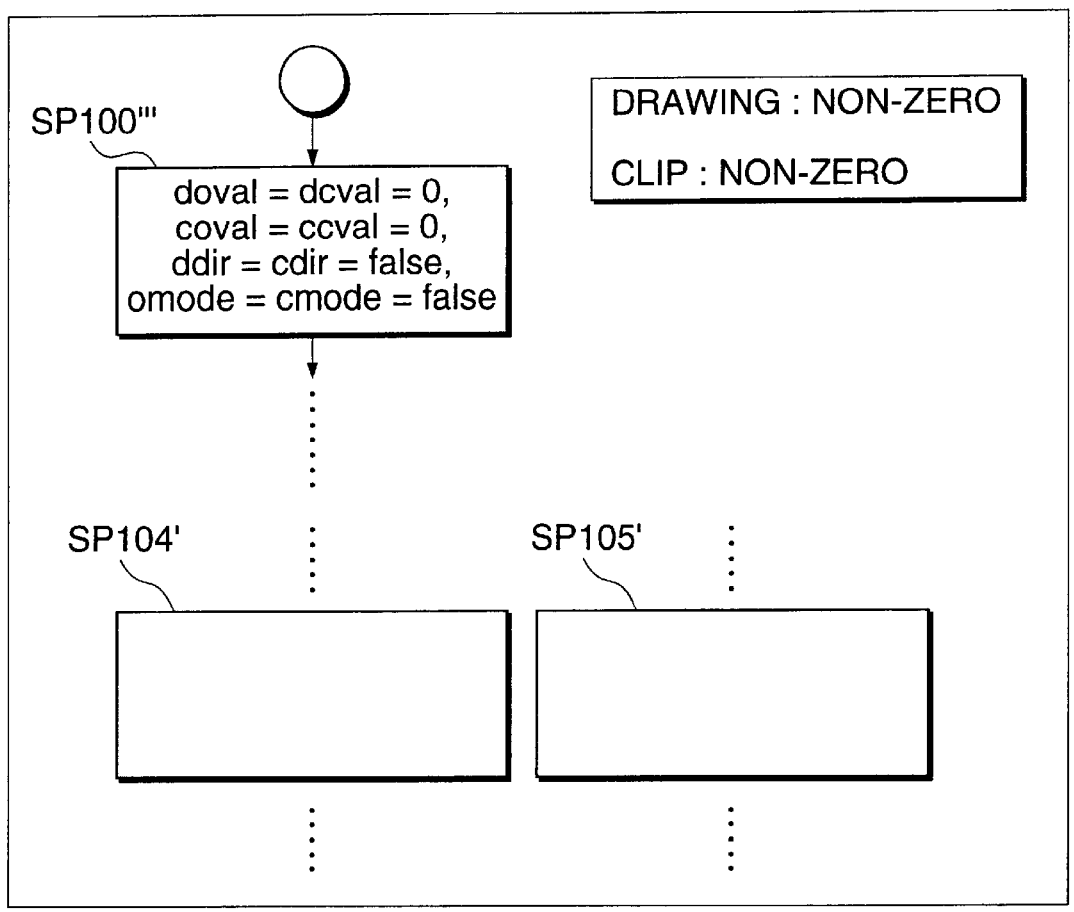
FIG. 43 is a flowchart for explaining the clipping process and the overlap removing process in further another modification.

The above processes relate to the example when the even-odd rule is applied to the drawing and clipping. Obviously, the processes can be performed in the other modes. For example, FIG. 41 shows a case where the non-zero winding number rule is applied to the drawing and the even-odd rule is applied to the clipping. FIG. 42 shows a case where the even-odd rule is applied to the drawing and the non-zero winding number rule is applied to the clipping. FIG. 43 shows a case where the non-zero winding number rule is applied to both of the drawing and clipping.

In FIG. 41, in place of steps 100 and 104 (FIG. 40), step 100' and step 104' are executed. In the diagram, doval denotes an immediately preceding value of the non-zero winding number rule of the drawing element and dcval denotes a current value of the non-zero winding number rule of the drawing element. The operation of the diagram is almost similar to that of FIGS. 13 and 40, so that the detailed description is omitted here.

In FIG. 42, in place of steps 101 and 105 (FIG. 40), step 100" and step 105' are performed. Since the operation of the diagram is substantially the same as that of FIGS. 13 and 40, the detailed description is omitted here.

In FIG. 43, step 100" is executed in place of step 100 (FIG. 40) and steps 104' and 105' are executed in place of steps 104 and 105. In the diagram, coval denotes an immediately preceding value of the non-zero winding number rule of the clip element and ccval indicates a current value of the non-zero winding number rule of the clip element. Since the operation of the diagram is substantially the same as that of FIGS. 13 and 40, the detailed description is omitted here.

Either a drawing element or a clip element is used an element of a new display list by performing the clipping process or is cut as a new side can also be determined by a procedure except for the above-mentioned procedure (FIG. 13 and the like). In short, it is sufficient to set condition to cut it out and cut a side while determining whether the condition is satisfied or not.

Figure 29:
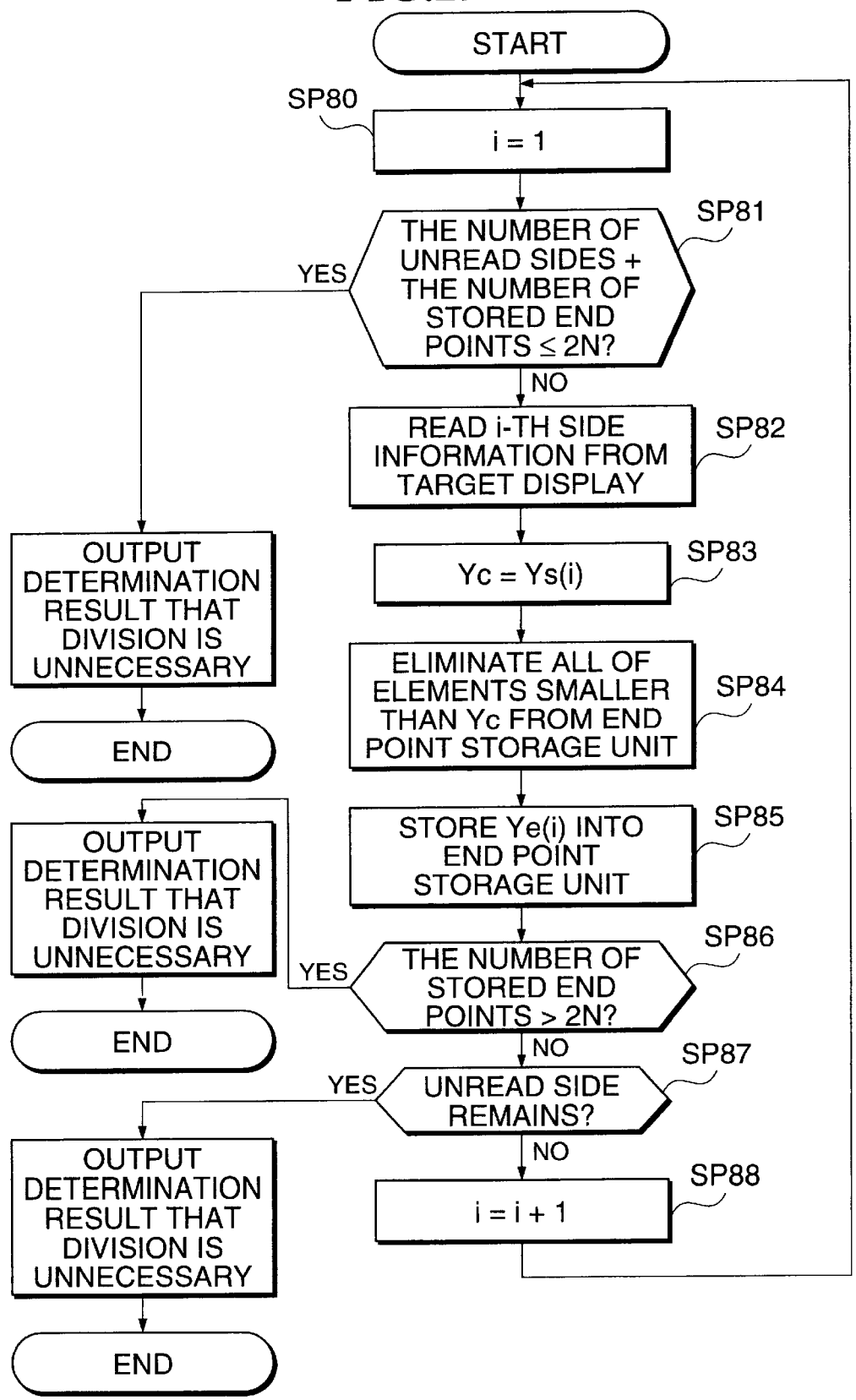
FIG. 29 is a flowchart showing the procedure of a division determining process in the graphics processing apparatus of the present invention.

In the embodiment, the sides (straight line vectors) of a display list are stored in ascending order, side information is sequentially taken, whether the DDA calculation can be executed in parallel or not is determined, and when it cannot be executed, the display list is divided (FIG. 29). It is also possible to sequentially read information of sides each having the start point on a scan line for every scan line and determine whether the display list has to be divided or not.

Figure 44:
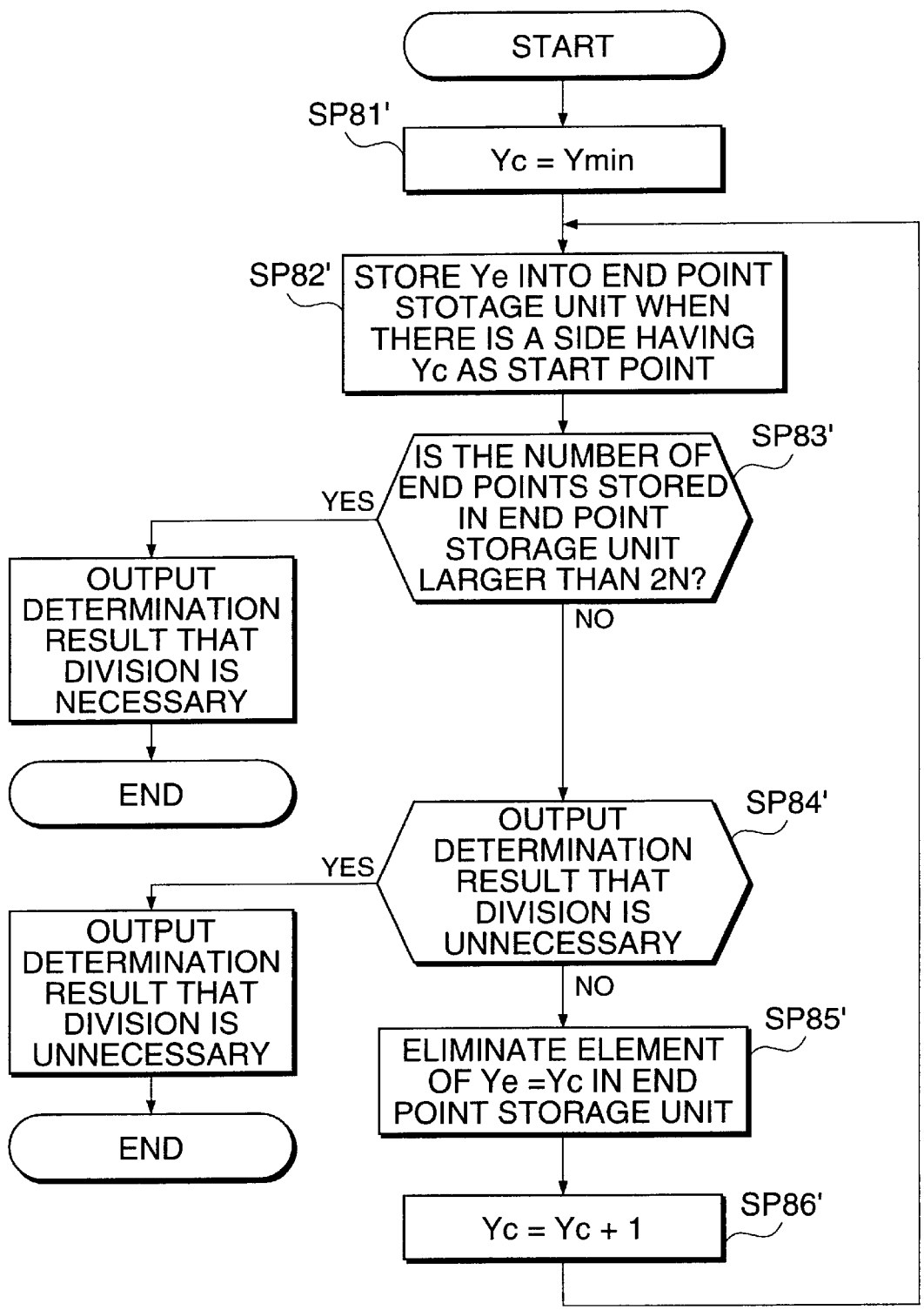
FIG. 44 is a flowchart for explaining a division determining process in another modification.

The process of such a determining procedure is shown in FIG. 44. The process of FIG. 44 will be briefly described. Since the details of the process can be easily understood from the chart, they are omitted. [step 81']: set Yc indicative of a target scan line to Ymin. Ymin is the minimum value in the range where Y of the display list to be determined exists. [step 82']: When there is a side having Yc as the start point in the display list to be determined, the scan line Ye on which the side ends is stored in the end point storage unit 112. [step 83']: check the number of end points stored in the end point storage unit 112. When it exceeds 2N, the determination result that the division is necessary is outputted and the determining process is finished. When it does not exceed 2N, the routine advances to step 84'. [step 84']: check whether Yc is equal to Ymax or not. When Yc is equal to Ymax, the determination result that the division is unnecessary is outputted and the determining process is finished. Ymax is the maximum value in the range where Y of the display list to be determined exists. When Yc is not equal to Ymax, the routine advances to step 85'. [step 85']: delete all of elements in the end point storage unit 112 at Ye=Yc. [step 86']: increment the value of Yc by one and return to step 82'.

By executing such processes, when the number of the sides in the display list to be determined is equal to or smaller than 2N, the determination result that the division is unnecessary is obtained. In the other case, the determination result that the division is necessary is obtained. Although all of the display lists are subjected to the determining process, for example, in the case where the division is clearly unnecessary such as a case where the total number of sides in the display list is equal to or smaller than 2N, the process can be omitted (FIG. 29).

According to the present invention as described above, the high-speed graphics processing apparatus having the overlap removing part for removing the overlap of the drawing elements expressed in the display list format, capable of storing data of a small memory amount even in the case where the resolution is higher as compared with an edge list and removing an overlap by a small amount of processes without performing any special preparation can be realized. Further, the high-speed graphics processing apparatus can be realized which minimizes the overlap removing process and can deal with even a case where a clip element and a drawing element mixedly exist by comprising the determination part for determining whether the overlap removing process is necessary or not and the clip process part for clipping the display list in which the clip element and the drawing element mixedly exist and converting it to a display list having only drawing elements.

In the present invention, by providing the determination part for determining whether or not the number of sides crossing all of scan lines is equal to or smaller than 2N (=the number of DDAs) from the display list, the clip process part for clipping the display list in which the clip element and the drawing element mixedly exist, thereby converting the display list to a display list having only drawing elements, the division part for dividing the display list of the drawing element to plural display lists so that the number of sides which cross all of scan lines is equal to or smaller than 2N, 2N DDAs (N is 1 or larger), and the sorting part capable of sorting inputs outputted from the DDAs, even when the clip element and the drawing element mixedly exist in the drawing command, after executing the process of converting the display list into a display list having only drawing elements and the process of dividing the display list into display lists of 2N or less which is the number of DDA parts, the position information calculating process based on the converted display list is executed by the 2N DDA parts which can perform a parallel process. Thus, the high-speed graphics processing apparatus which can control and store the drawing data in a small area and can control and store divided graphics in an area as small as possible even when the clip element and the drawing element mixedly exist can be realized.

What is claimed is:

1. A graphics processing apparatus for drawing graphics, comprising:

a display list generation part that converts vector information describing a drawing element or a clip element of graphics into straight line vector information obtained by approximating a polygon to a shape of vectors constructing the drawing element or clip element, sorts the straight line vectors included in the straight line vector information on the basis of vector start scan line coordinate values, and generates a display list constructed of information including the direction and gradient of each of the straight line vectors and the number of scan lines the straight line vector crosses or data equivalent to the above information;

a merge process part that merges a display list indicative of the drawing element with a display list indicative of the clip element for restricting a drawing area of the drawing element which are generated by the display list generation part, thereby generating a display list in which the drawing element and the clip element mixedly exist;

a display list storage part that stores the display list;

a determination part that checks to see whether or not the number of the straight line vectors which cross a scan line is equal to or smaller than 2N (N is an integer of 1 or larger) in all of scan lines on the basis of the display list;

a clip process part that clips the drawing element by the clip element with respect to the display list in which the clip element and the drawing element mixedly exist, thereby converting the display list to a display list having only drawing elements;

a division process part that divides the display list having only the drawing elements converted by the clip process part so that the number of straight line vectors which cross all of the scan lines becomes equal to or smaller than 2N, thereby generating a plurality of display lists;

an overlap removal part that generates a new display list obtained by removing an overlap of drawing areas from a plurality of display lists having the overlap in the drawing areas; and a display list drawing part having 2N DDA units that each calculate the coordinate value of an intersection between each scan line and the straight line vector on the basis of the display list, a sorting part that sorts output values from the DDA units, and a memory drawing part that obtains position information of a start point and an end point of a drawing line segment from the data sorted by the sorting part and fills a memory area between the start and end points.

2. A graphics processing apparatus for drawing graphics, comprising:

a display list generation part that converts vector information describing a drawing element or a clip element of graphics into straight line vector information obtained by approximating a polygon to a shape of vectors constructing the drawing element or clip element, sorts straight line vectors included in the straight line vector information on the basis of vector start scan line coordinate values, and generates a display list constructed of information including the direction and gradient of each of the straight line vectors and the number of scan lines which are crossed or data equivalent to the above information;

a merge process part that merges a display list indicative of the drawing element with a display list indicative of the clip element for restricting a drawing area of the drawing element which are generated by the display list generation part, thereby generating a display list in which the drawing element and the clip element mixedly exist;

a determination part that checks to see whether or not the number of the straight line vectors which cross a scan line is equal to or smaller than 2N (N is an integer of 1 or larger) in all of scan lines on the basis of the display list;

a clip process part that clips the drawing element by the clip element with respect to the display list in which the clip element and the drawing element mixedly exist, thereby converting the display list to a display list having only drawing elements;

a division process part that divides the display list having only the drawing elements converted by the clip process part so that the number of straight line vectors which cross all of the scan lines becomes equal to or smaller than 2N, thereby generating a plurality of display lists; and a display list drawing part having 2N DDA units that each calculate the coordinate value of an intersection between each scan line and the straight line vector on the basis of the display list, a sorting part that sorts output values from the DDA units, and a memory drawing part that obtains position information of a start point and an end point of a drawing line segment from the data sorted by the sorting part and fills a memory area between the start and end points.

3. A graphics processing apparatus for drawing graphics, comprising:

a display list generation part that converts vector information describing a drawing element or a clip element of graphics into straight line vector information obtained by approximating a polygon to a shape of vectors constructing the drawing element or clip element, sorts the straight line vectors included in the straight line vector information on the basis of vector start scan line coordinate values, and generates a display list constructed of information including the direction and gradient of each of the linear vectors and the number of scan lines crossed or data equivalent to the above information;

a merge process part that merges a display list indicative of the drawing element with a display list indicative of the clip element for restricting a drawing area of the drawing element which are generated by the display list generation part, thereby generating a display list in which the drawing element and the clip element mixedly exist;

a display list storage part that stores the display list;

a clip process part that clips the drawing element by the clip element with respect to the display list in which the clip element and the drawing element mixedly exist, thereby converting the display list to a display list having only drawing elements;

an overlap removal part that generates a new display list by removing an overlap of drawing areas from a plurality of display lists having the overlap in the drawing areas;

a display list drawing part that draws graphics expressed by the display lists; and an overlap removal determination part that estimates processing time of drawing the display list by the display list drawing part and determining the execution effect of the overlap removing process by the overlap removal part on the basis of the estimated drawing processing time.

4. A graphics processing apparatus for drawing graphics, comprising:

a display list generating part that converts vector information describing a drawing element or a clip element of graphics into straight line vector information obtained by approximating a polygon to a shape of vectors constructing the drawing element or clip element, sorts the straight line vectors included in the straight line vector information on the basis of vector start scan line coordinate values, and generates a display list constructed of information including the direction and gradient of each of the straight line vectors and the number of scan lines crossed or data equivalent to the above information;

a display list storage part that stores the display list;

a clip process part that clips the drawing element by the clip element with respect to the display list which expresses the clip element and the drawing element;

an overlap removal part that generates a new display list by removing an overlap of drawing areas from a plurality of display lists having the overlap in the drawing areas;

a display list drawing part that draws graphics expressed by the display lists; and an overlap removal determination part that estimates processing time of a process of drawing the display list by the display list drawing part and determines an effect of executing the overlap removing process by the overlap removal part on the basis of the estimated drawing processing time.

5. The graphics processing apparatus according to claim 3, wherein the merge process part sets a value indicative of a vector direction in a display list related to a straight line vector constructing the drawing element and a value indicative of a vector direction in a display list related to a straight line vector constructing the clip element so as to be different from each other in the mixed display list to be generated.

6. A graphics processing apparatus according to claim 3, wherein the merge process part obtains at least one of or both of a common Y coordinate range and a common X coordinate range from circumscribed rectangles of the display list indicative of the drawing element and the display list indicative of the clip element and generates a mixed display list constructed by a straight line vector restricted within the common coordinate range.

7. A graphics processing apparatus according to claim 3, wherein the determination part reads the straight line vectors included in the display list in accordance with the order from the smaller start scan line coordinate value, holds an end scan line coordinate value of the straight line vector, discards the end scan line coordinate value held when the start scan line coordinate value of the read straight line vector is larger than the end scan line coordinate value which has already been held, then with respect to the display list, outputs a determination result that the number of end scan line coordinate values is not equal to or smaller than 2N at the time point when the number held becomes larger than 2N and outputs a determination result that the number of end scan line coordinate values is equal to or smaller than 2N at the time point when the sum of the number of straight line vectors which are not yet read and the number of end scan line coordinate values held becomes equal to or smaller than 2N.

8. The graphics processing apparatus according to claim 3, wherein a converting process to a display list having only the drawing elements by the clipping process by the clip process part is performed under the conditions that a) the display list is determined by the determination part that a scan line which is crossed by the straight line vectors larger than 2N exists (where N is an integer of 1 or larger) and b) the display list is a display list in which the drawing element and the clip element mixedly exist.

9. The graphics processing apparatus according to claim 3, wherein a process of dividing a display list so that the number of straight line vectors which cross all of scan lines becomes equal to or smaller than 2N (where N is an integer of 1 or larger) and thereby generating a plurality of display lists in the division process part is executed under the conditions that c) the display list is determined by the determination part that a scan line which is crossed by the straight line vectors larger than 2N exists and d) the display list is comprised of only drawing elements.

10. A graphics processing apparatus according to claim 1, wherein the overlap removal part sequentially takes a display list corresponding to a drawing element in an upper layer to be displayed or printed on the most front face and then a display list corresponding to a drawing element in a lower layer from the display list storage part and performs the overlap removing process on the basis of the taken display lists corresponding to the plurality of drawing elements.

11. A graphics processing apparatus according to claim 3, wherein the overlap removal part sequentially takes a display list corresponding to a drawing element in an upper layer to be displayed or printed on the most front face and then a display list corresponding to a drawing element in a lower layer from the display list storage part and performs the overlap removing process on the basis of the taken display lists corresponding to the plurality of drawing elements.

12. The graphics processing apparatus according to claim 4, further comprising an area division part that divides an output area of the display list into partial areas, wherein a process is performed for every partial area, determination by the overlap removal determination part is performed for every partial area obtained by the division of the area division part, and whether the overlap removing process is performed or not is determined for every partial area.

13. The graphics processing apparatus according to claim 3, wherein the overlap removal determination part obtains an estimated value of drawing time in the display list drawing part on the basis of a result of the process by the overlap removal part, and when the estimated value of the drawing time based on the obtained process result is equal to or smaller than a predetermined threshold value, a new overlap removing process by the overlap removal part is not performed.

14. The graphics processing apparatus according to claim 4, wherein the overlap removal determination part obtains an estimated value of drawing time in the display list drawing part on the basis of a result of the process by the overlap removal part, and when the estimated value of the drawing time based on the obtained process result is equal to or smaller than a predetermined threshold value, a new overlap removing process by the overlap removal part is not performed.

15. The graphics processing apparatus according to claim 3, wherein the process by the overlap removal part is executed for every partial area in a plurality of partial areas obtained by dividing a drawing area to be processed.

16. The graphics processing apparatus according to claim 4, wherein the process by the overlap removal part is executed every partial area in a plurality of partial areas obtained by dividing a drawing area to be processed.

17. The graphics processing apparatus according to claim 2, wherein the memory drawing part changes a method of calculating position information of a start point and an end point of a line segment to be drawn from the sorted data on the basis of conditions of the display list to be processed such that the display list to be processed is a display list comprising of only drawing elements or a mixed display list in which the drawing element and the clip element mixedly exist and a fill rule of the drawing element and the clip element in the display list to be processed is an even-odd rule or non-zero winding number rule.

18. A graphics processing apparatus according to claim 3, wherein the clip process part has a part that determines at least whether the shape of a graphics element is a rectangle or not, and the clipping method is changed according to the result of the determination by the determination part.

19. A graphics processing apparatus according to claim 4, wherein the clip process part has a part that determines at least whether the shape of a graphics element is a rectangle or not, and the clipping method is changed according to the result of the determination by the determination part.

20. A graphics processing method of drawing graphics, comprising:

a display list generating step of converting vector information describing a drawing element or a clip element of graphics into straight line vector information obtained by approximating a polygon to a shape of vectors constructing the drawing element or clip element, sorting straight line vectors included in the straight line vector information on the basis of vector start scan line coordinate values, and generating a display list constructed of information including the direction and gradient of each of the straight line vectors and the number of scan lines which are crossed or data equivalent to that information;

a merging step of merging a display list indicative of a drawing element with a display list indicative of a clip element for restricting a drawing area of the drawing element which display lists are generated in the display list forming step, thereby generating a display list in which the drawing element and the clip element mixedly exist;

a determining step of determining whether the number of straight line vectors which cross a scan line is equal to or smaller than 2N (N is an integer of 1 or larger) in all of scan lines on the basis of the display list;

a clipping step of clipping the drawing element by the clip element with respect to the display list in which the clip element and the drawing element mixedly exist, thereby converting the display list to a display list having only drawing elements;

a division processing step of dividing the display list having only the drawing elements converted by the clipping process so that the number of straight line vectors which cross all of the scan lines becomes equal to or smaller than 2N, thereby generating a plurality of display lists;

a sorting step of sorting output values from 2N DDA units that each calculate the coordinate value of an intersection between each scan line and the straight line vector on the basis of the display list; and a memory drawing step of obtaining position information of the start point and the end point of a drawing line segment from the data sorted in the sorting step and filling a memory area defined by the start and end points.

* * * * *